US006966154B1

(12) United States Patent
Bierwirth

(10) Patent No.: US 6,966,154 B1
(45) Date of Patent: Nov. 22, 2005

(54) EARTHQUAKE PROTECTION CONSISTING OF VIBRATION-ISOLATED MOUNTING OF BUILDINGS AND OBJECTS USING VIRTUAL PENDULUMS WITH LONG CYCLES

(75) Inventor: Friedhelm Bierwirth, Gladbeck (DE)

(73) Assignee: PLANdesign International LLC, (KN)

( * ) Notice: Subject to any disclaimer, the term of this patent is extended or adjusted under 35 U.S.C. 154(b) by 0 days.

(21) Appl. No.: 09/485,468

(22) PCT Filed: Aug. 13, 1998

(86) PCT No.: PCT/EP98/05158

§ 371 (c)(1),
(2), (4) Date: May 17, 2000

(87) PCT Pub. No.: WO99/09278

PCT Pub. Date: Feb. 25, 1999

(30) Foreign Application Priority Data

Aug. 13, 1997 (DE) ................................ 197 34 993

(51) Int. Cl.[7] .............................................. E04B 1/98
(52) U.S. Cl. .................. 52/167.4; 52/167.1; 52/167.8; 52/741.1; 33/391
(58) Field of Search .................. 52/167.1, 167.4, 52/167.7, 167.8, 167.6, 741.1; 33/391–392, 33/394, 397–399, 400–403

(56) References Cited

U.S. PATENT DOCUMENTS

| | | | | |
|---|---|---|---|---|
| 3,110,464 A | * | 11/1963 | Baratoff et al. | |
| 3,997,976 A | | 12/1976 | Li ............................. | 33/391 |
| 4,328,648 A | * | 5/1982 | Kalpins ....................... | 52/167 |
| 4,496,130 A | * | 1/1985 | Toyama ....................... | 248/585 |
| 5,452,549 A | * | 9/1995 | Medeot et al. ............. | 52/167.8 |
| 5,964,066 A | * | 10/1999 | Mori ........................... | 52/167.1 |

FOREIGN PATENT DOCUMENTS

JP          06264960         9/1994

* cited by examiner

Primary Examiner—Jeanette E. Chapman
(74) Attorney, Agent, or Firm—Cantor Colburn LLP

(57) ABSTRACT

The invention relates to an earthquake protection system that is entirely immune to seismic activity. According to the inventive method buildings and other objects are supported by Virtual Pendulums ($P_v$) designed as QuakeProtect Modules (56). Although requiring only little height for installation, these earthquake protection modules allow a freedom of movement for the load bearing support points of the supported structure as if they were the oscillating ends of long pendulums with long cycles of their own. As the result of which the supported object is efficiently isolated from the considerably higher frequent earthquake ground oscillations. The functional behavior of the system is not affected by the extent of the base acceleration or the frequency of the ground oscillation. Even in an earthquake of greatest magnitude the supported object will remain still. The system can be configured for any load and any conceivable ground oscillation amplitudes.

The invention describes four different examples of solutions that apply the inventive method, variants and devices derived therefrom for various applications. Additionally are described devices needed to provide support against wind forces and to center a supported object under wind loads and during ground oscillations, and as well devices for the isolation of vertical ground oscillations.

30 Claims, 70 Drawing Sheets

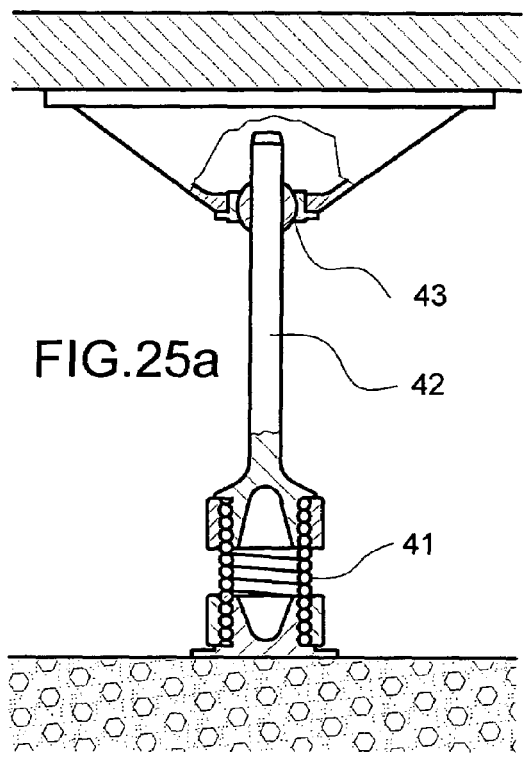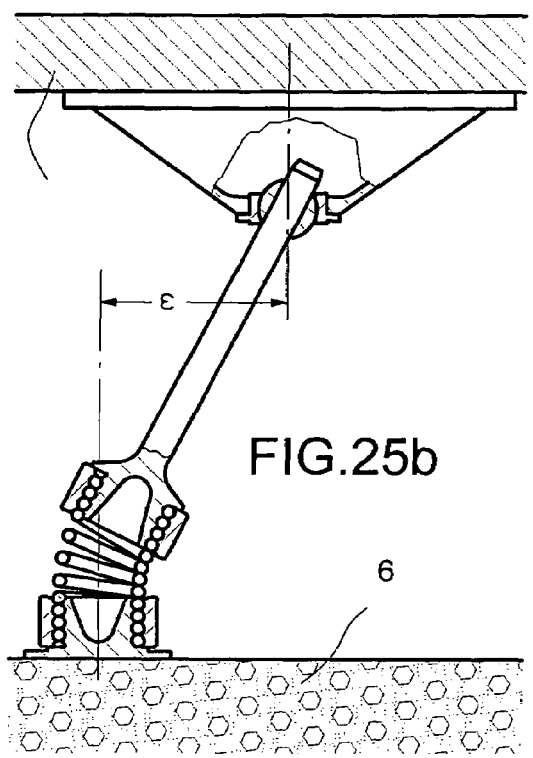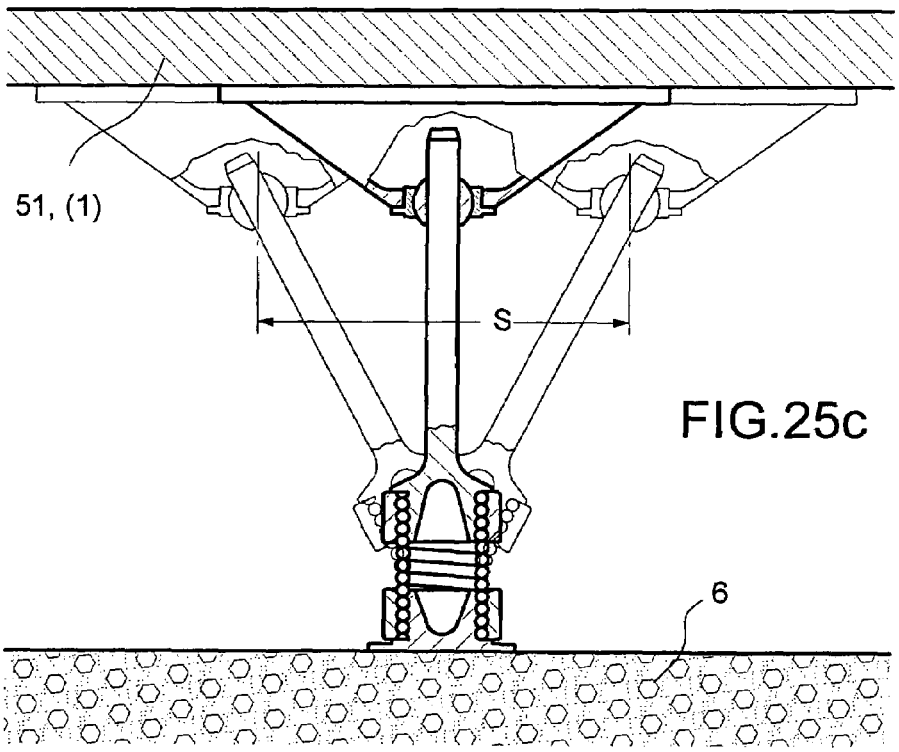

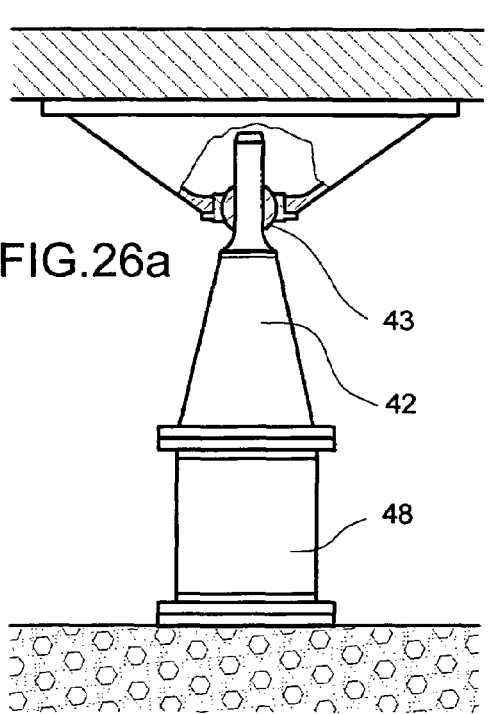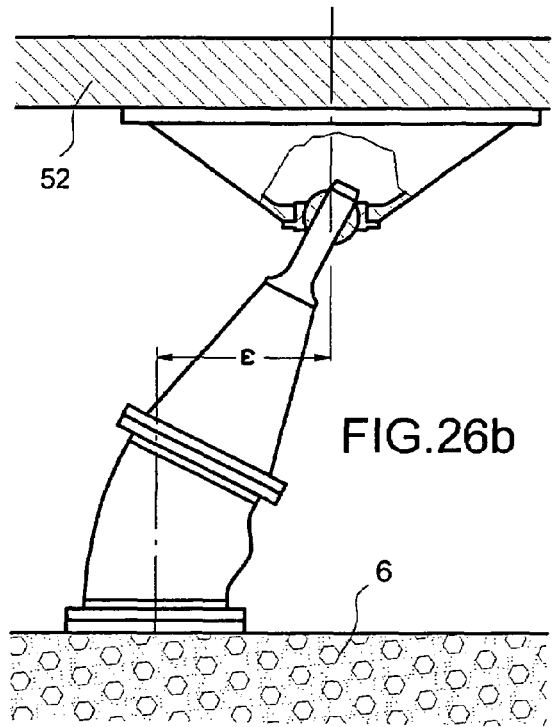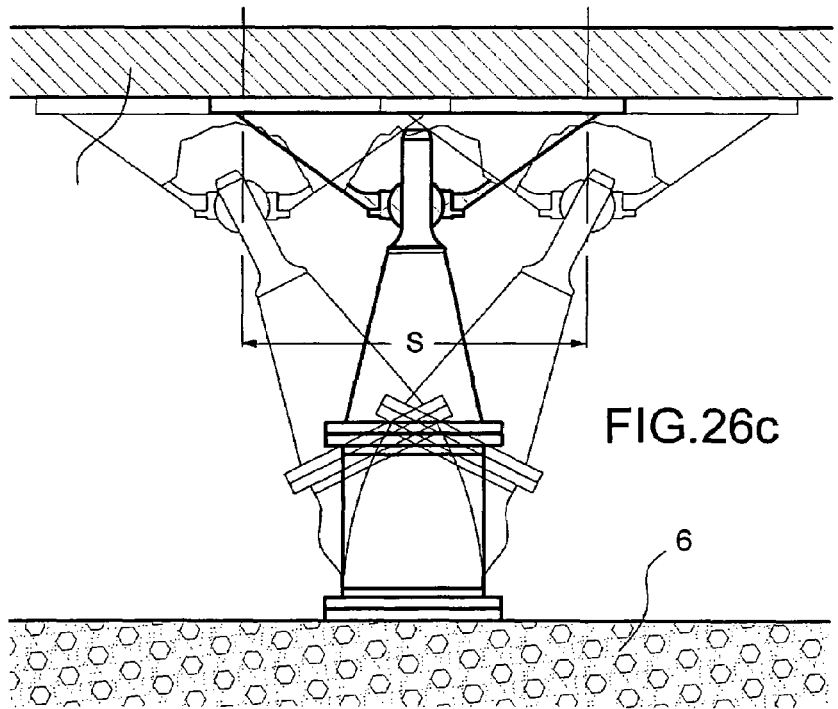

EARTHQUAKE PROTECTION CONSISTING OF VIBRATION-ISOLATED MOUNTING OF BUILDINGS AND OBJECTS USING VIRTUAL PENDULUMS WITH LONG CYCLES

1 FIELD OF THE INVENTION

1.1 General Application

The invention at hand refers to a principle and corresponding earthquake protection devices with the purpose to prevent damages to buildings and any kind of structure or object, that would be caused by dangerous base movements in the event of strong earthquakes.

The load bearing devices according to the invention, novel Modules, are relatively simple support structures, each supporting one support point of a building or an object, e.g. substituting a load bearing column.

These QuakeProtect Modules, based on the principle of a „Virtual Pendulum", can be designed for a number of different applications from the support of lightweight to the heaviest of objects.

QuakeProtect Modules are based on an innovation to create "virtual" pendulums and are advantageous for following applications: For the seismicly immune support of any kind of building or structure, such as mobile homes, homes, apartment and office buildings, shopping centers, parking structures, hospitals, high rises, towers, bridges, elevated highways, storage tanks, silos, cable railway towers, electricity masts, street lighting poles, interior lighting, pipe lines, industrial, chemical and nuclear facilities, and other objects, to protect them from horizontal earthquake movements and accelerations and the resulting damaging forces and destructive impacts.

Especially for the protection of important facilities such as nuclear and chemical facilities with dangerous agents, where damage could lead to catastrophic consequences, seismic protection is of great significance.

The system is also well suited for bridges. It solves all the problems that known systems haven't provided a solution for so far.

The application of the system is as well advantageous for industrial facilities with sensitive production processes, such as in the microchip production.

The protection of the supported objects is increased to such a degree that the protected building or facility just remains standing still, even in an earthquake of maximum possible magnitude, with no damages as a result.

This extended protection would also be very valuable for hospitals, that cannot be evacuated fast enough in an earthquake and could function undisturbed even during an earthquake and its aftershocks, being able to take care of victims. Even surgery would not be disturbed during the earthquake and its aftershocks.

The application of the invention at hand reduces to a great degree the consequences of liquefaction, which may occur in certain grounds, since it reduces the reactive effect of the mass of the building onto the ground during ground vibrations to extremely low values.

The impact of a close explosion on an object that is supported according to the invention at hand is lessened as well.

Suspended objects, such as interior lighting, which could potentially cause fire or drop from the ceiling, can also be protected by being suspended from Virtual Pendulums.

In addition objects on top of poles and masts, which are also vulnerable in earthquakes, can be protected by a design according to the invention.

The reduction of oscillations of towers, high masts and industrial chimneys by actively controlled or passively moved masses on top of them, can also be advantageously realized by means of Virtual Pendulums.

QuakeProtect Modules based on Virtual Pendulums are a base isolation system, a compact, passively working, load bearing device, typically to be installed in the foundation of a building, or its 1st floor. The System prevents the transmission of vibrations and shocks from the ground to the supported object. It virtually "disconnects" a building from any ground movements.

Additionally, the system has following characteristics: It is self-centering. It does not allow horizontal displacements through lesser forces caused by wind and storms. For tall buildings vertical stiffness of the device does not allow any vertical displacement between building and foundation. For buildings with a low aspect ratio an optional feature can be incorporated to absorb also vertical movements. If necessary, it can be designed for any magnitude of displacements. The device can be designed for zero maintenance.

Although of compact dimensions the QuakeProtect Modules allow the supported object great displacements in all directions and possess a long natural period. The maximum accelerations impacting the supported structure are reduced to values <0.01 g. This is mathematically determined and the system can be designed accordingly. Model tests on a shake table already confirmed these expectations.

In extremely strong earthquakes, which occur from time to time in certain areas, the protection provided by available isolation systems and conventional design methods according to building codes is not sufficient. The destruction can be considerable.

On the other hand, in the case of an earthquake protection system based Virtual Pendulums, the invention at hand, the magnitude of an earthquake, the displacement and the oscillation frequency of the ground do not influence the performance of the system and the effective motionlessness of a building supported by these new QuakeProtect Modules with long natural period.

1.2 Retrofitting of Existing Buildings

The retrofitting of existing buildings with QuakeProtect Modules is also possible. For steel frame buildings this would be relatively easy to accomplish.

To retrofit the old building stock of masonry structures is principally possible as well. With conventional means such a measure obviously necessitates a considerable effort.

To rationalize the retrofitting effort for such cases a revolutionary new retrofitting technology with new machines, equipment and procedures is under development. This will make it possible to execute the retrofitting process in a highly mechanized fashion. This innovation is applicable for buildings built on regular ground and even on rock.

2 BACKGROUND

The shift of continental plates, a phenomenon of geophysics, causes earthquakes to occur again and again.

2.1 Worldwide Problem through Earthquakes

Since earthquakes often cause many death casualties and great economic damages, an improvement of earthquake savety is very desirable. It should be possible to come to a solution to defuse this serious problem. In this century alone about 1.6 Million people died in earthquakes, with damages in the order of Trillions of Dollars. Worldwide there are more than forty countries which are threatened by earthquakes.

This danger is taken its sting of terror now by means of mechanical physics: Applied physics defuses the threat of geophysics.

3 STATE OF THE ART 3.1 Building Codes for Earthquake Safety

The building codes in earthquake regions usually refer to a reference design earthquake magnitude, which has a statistical probability for a certain number of years, and which accordingly determines the necessary strength of the building structure.

Increasingly, the designs of buildings provide for elastic deformations in certain areas of the structure, as a result of which the forces, that are to be transmitted through the structure, are locally reduced since the partial mass of the building above those elastic areas stays behind, in relation to the initiating movement, and consequently reducing the peak values of accelerations.

In case an earthquake exceeds the reference values of the building code, buildings will be damaged or destroyed and people may be injured or killed, as the earthquakes of recent years have shown.

It can therefore be stated, that these methods of computation and dimensioning are inadequate to provide building and life safety or damage control in stronger earthquakes.

The building codes use reference earthquakes for the structural analysis that allows for a margin of safety for the expected forces. The assumptions in regards to the performance of the building and its structural parameters have a high degree of uncertainty. The accelerations determined by such reference earthquakes are often exceeded in actual earthquakes, sometimes considerably.

To provide for structural integrity in an extremely large earthquake is technically not feasible, thus conventionally designed structures would fail in such an event.

The opinion, that the destructive results of the forces of earthquake movements could be eliminated through increasing the strength of a structure or through application of elastic and damping elements, has not proven to be realistic.

Also the idea, that some form of added damping could prevent destruction caused by strong earth movements, seems rather hopeless.

The computation methods of the seismic building codes use simplified models for representing structural load assumption. These simplified methods only give results of limited accuracy. Also it is difficult or even impossible analytically to predetermine, which part of the structure will fail first and initiate a collapse of the structure.

These computation methods to determine the seismic safety of buildings in earthquake regions only can provide sufficient structural integrity for regularly or relatively often occuring earthquakes of low or medium size magnitude.

It can be concluded that these methods are not sufficient to design and build earthquake proof buildings.

The extensive destruction worldwide also in recent earthquakes, the enormous material damages, the loss of thousands of lives point to the necessity to further pursue the goal of the improvement of seismic protection.

3.2 Evaluation of Conventional Methods for Earthquake Safety

The center of gravity of a building is usually situated above its base. Thus the movement of the base must be transferred to the center of gravity of the building through the frame of the building. The force to be transmitted through the structure as shear is the reaction of the inertia of the mass, which is the product of the mass and the acceleration acting upon the mass.

All building materials, being accelerated beyond a certain value, will reach and exceed the limits of their strength, and therefore experience damage in the form of yielding cracks.

It is therefore impossible to realize complete earthquake safety, if a structure is rigidly connected with the base. Any structure, which by its foundation is rigidly connected to the base or allows only for little movability, will fail at a certain magnitude of earthquake and its resulting accelerations.

The expectation to reduce the damaging impact of strong earthquake movements through friction and damping appears to be hopeless in the events of strongest earthquakes.

Only a limited portion of the destructive energy, that is transferred to the building through the earthquake movements, can be dissipated, or better to say can be converted into heat through dampening. In really strong earthquakes dampening and friction cannot prevent the destructive impact of the earthquake.

Modern solutions such as flexible steel frame designs, which sustained expensive damage in the Northridge quake, and base isolation systems, so far are capable of absorbing or dissipating a certain percentage of the energy, that the earth's movement transfers to the structure of a building. Recent studies of the U.S. Geological Survey and the California Institute of Technology (CalTech) express the concern, that also these kinds of buildings could possibly be damaged or even collapse in the case of a really big earthquake, if close enough to the epicenter.

In an earthquake therefore, that exceeds the values that are implied by the building codes, destruction and danger for human life still occurs. Therefore these design methods are not sufficient to build seismically truly safe buildings.

3.3 Base Isolation of Building Structures

The effort to increase seismic safety for buildings brought about a great number of new solutions, expressed in patent publications.

Among the technical solutions for protection of buildings against earthquake damages are devices, that, additionally to structural designs according to seismic building codes, separate the building from the foundation by means of movable bearings or supporting elements with joints.

This group of technical solutions, which are categorized as base isolation, has particular significance, that they allow the building a limited movabilitiy relative to the base. All these solutions transfer shear forces through friction and damping forces, which can become critical in earthquakes with high frequencies and great displacements. These solutions do not transfer any or only limited vertical tension forces and are therefore not suitable for high rises and towers.

One example of base isolation is the support a building through blocks consisting of alternating horizontal layers of metal sheets and rubber (U.S. Pat. Nos. 4,527,365; 4,599, 834; 4,593,502). These blocks have vertically a high load bearing capacity and allow horizontal movement of the upper layer relative to the lower layer of the isolation block, although the movability of the block is of limited extent.

With increasing shift away from its middle resting position a stiffening of the block occurs, because of the increase of the steepness of the block's spring rate, and therefore an increase of the shifting force follows, which impacts the building structure. In extreme cases it can result in damages to the structure and the interior.

These blocks have the disadvantage of a limited horizontal displaceability. If a displacement exceeds the range limit the building would be threatened. Furthermore these elastomeric blocks can sustain only little vertical tension loads. If their limit is exceeded, they might tear.

The support of a building through such horizontally elastic blocks can reduce the acceleration peaks through springiness and damping. But still the transfer of the earth movement to the building occurs to a certain degree. Exceeds the horizontal oscillation amplitude of the ground the lateral displaceability of the steel-elastomeric blocks, the speed of the ground movement is fully transferred to the supported object and the blocks could possibly shear off between the steel sheets.

In the case of great ground motion amplitudes the transferred movements to the building can be considerable, and the movements of the building in the upper stories can increase, comparable to the movement of a whip.

With another kind of base isolation the building frame is supported at the base by rolling or gliding elements, which can move between two concave plates or between a plane and a concave plate. Therefore the points that support the building move as if suspended from pendulums (U.S. Pat. Nos. 4,644,714; 4,881,350). These devices don't transfer any tension loads and are not capable to absorb forces caused by torsion moments of the building.

In the case of support of the building by rolling elements, there are problems concerning the resulting high Hertz' pressures in the points of contact. This solution puts high demands on the material and the contact surfaces of the involved parts. Also is it not possible for this example of a base isolation system to transfer uplift vertical forces.

It is also possible to position supporting elements between plane plates, whose curvature radius of their surfaces that touch the plates is greater than the height of the supporting elements. (DPA Offenlegungsschrift 2021031). Therefore the upper plate is lifted when the supporting elements are caused to move through an earthquake, which results in a movement as if suspended from a pendulum.

The maximum possible displacements of these solutions may not be sufficient already in medium earthquakes. The natural oscillations of these solutions are too close to the possible natural earthquake oscillations, that a sufficient discoupling of the oscillations does not occur, but resonance possibly can occur and tension loads cannot be transferred.

In another example of base isolation, supporting points of the building structure are suspended from pendulums. (U.S. Pat. Nos. 1,761,321; 1,761,322; 2,035,009; 4,328,648). The lengths of these pendulums are limited by practical aspects. The decoupling of the system's natural oscillation from the natural earthquake oscillation is not sufficient.

The movement characteristics of the system and the natural period of oscillation are determined by the geometry of the pendulum. The difference of the natural oscillation of the supported structure from the oscillation of the ground determines the movement characteristics of the mass of the building that is suspended from the pendulums.

If an object or a building is suspended by pendulums as shown in the example of FIG. 2, FIG. 3 or FIG. 4, then this object or building performs a motion according to the dynamics of a mathematical pendulum. Because of the gravity of the earth and possible additional accelerations, the mass of the object or building 1 results as a force in the lower linkage point 3 of the pendulum 2, proportional to the mass distribution to the supporting points. The pendulums 2 are supported at an upper linkage point 4 by an adequately designed load-bearing structure 5. The joints 3 and 4 are either ball and socket joints or universal joints and allow the pendulum swinging movements about two axes in relation to the load-bearing structure and also relative to the suspended object. The movement characteristics of the examples can be reduced to the model of a mathematical pendulum.

All quoted solutions are systems, which are able to oscillate, and whose natural oscillation frequencies are close to the stimulating earthquake frequencies. In the case of great earthquake amplitudes a resonance of the structure in the frequency range of the earthquake is possible. This could cause additional problems, which could threaten the building.

If, close to its resonance frequency, the building experiences also a tilting moment in relation to its vertical axis, the stories of the building further away from the ground experience an increase of accelerations and resulting loads.

Even with highly elastic bearings between the building and its foundation, and its resulting horizontal flexibility, there won't be truly satisfactory results in the case of really strong shaking, if the discoupling of the frequencies is not sufficient.

The possible closeness of resonance frequency and the possible frequencies of the earthquake response spectrum could cause great amplification of amplitudes in the upper parts of the building.

Consequently, it is possible, that such base isolated buildings would be forced into increased vibrations by such frequencies.

Structural damage might result to the building, and additionally damage to the interior, caused by movable objects, which could also endanger people.

3.4 Comparison of the New Solution to the State of the Art

Seismic safety on the level of perfection

In a truly large earthquake, a 'Big One', protection by the above mentioned systems and all other conventional design methods according to building codes might be insufficient or might even fail. Destruction and the number of death victims could be catastrophic. Earthquakes have ocurred with hundreds of thousands of victims.

Known base isolation systems allow a movability of the supported structure in relation to the base in a relative narrow range. With increasing amplitudes the impulse reduction decreases. In a huge earthquake failure is possible.

Distinguished from the known earthquake protection systems, the system according to the innovation at hand is neither a roller bearing nor a sliding or an elastomeric device, that absorbs or dissipates energy, but a no-impact-transferring device, that allows displacements freely in any direction. The solution according to the innovation totally prevents the transfer of ground movements to the supported building, no energy is transmitted to the structure.

The innovation, as defined by the claims, distinguishes itself by the fact that horizontal oscillations of the base, caused by an earthquake, are not transferred to the structure. The supported object cannot follow the earthquake induced oscillating movement of the ground and therefore remains in its resting position, it does not move. Earthquake damages are effectively prevented.

The earthquake frequencies and the natural frequency of the Virtual Pendulum supported structure are so greatly dissonant, that the movement of the ground cannot be transmitted to the supported structure. The principle of the innovation is fully effective at all earthquake frequencies. From the supported mass, kept in its motionless middle position, no reaction forces, caused by accelerations, impact the building structure. As a result there are no damages to the building or the interior, even in the strongest possible earthquakes.

On the other hand, elastomeric bearings and friction sliding bearings still transmit considerable shear forces to the super structure, which could become critical in certain cases. Even if the building does not sustain any structural damage, the damage to the interior of the building can still be considerable.

As base isolation bearing with elastomeric blocks, roller, ball or sliding elements cannot sustain vertical tension loads, QuakeProtect Modules on the other hand based on the principle of a Virtual Pendulum are fully capable of transfering all vertical tension loads.

The earthquake protection system according to the innovation is a perfect base isolation system, a compact, passively working load bearing device, installed in the basement or the first floor of a building. It allows displacements freely in all directions relative to the base and at the same time provides adequate resistance forces against wind loads.

The perfect performance of the earthauke protection modules is not influenced by the level of impulse, the magnitude of the earthquake, the accelerations of the base, the displacements and the frequency of the earthquake oscillation, whether harmonic or disharmonic. The result is always the same: the building remains standing still, it does not move. Virtually zero forces impact the structure. All claims are mathematically confirmed.

The innovative QuakeProtect Module on the other hand is not an energy absorbing device, but a no-impact-transferring device, that allows displacements freely. It is able to reduce accelerations of the supported object, which an earthquake causes, to almost zero (less than 0.01 g), independently of the magnitude of the earthquake and independently of the frequency and amplitude of the ground motion. Consequently there occurs no transduction of energy to the building induced by ground movements. The shear forces, impacting the structure, are reduced to insignificant values.

Even strongest earthquakes would cause no damages to the structure, the facade or the interior. A person inside the building might not even notice, that an earthquake just took place.

The protection of the building is so complete, that independently of the magnitude of the earthquake no forces of destructive power can be transmitted to the building. With this new method it is possible to realize a behavior of motionlessness of the supported object, to virtually remain in its resting position, even if the ground moves with great displacements and high accelerations.

Elastomeric bearings and friction sliding bearings have limited stiffness towards vertical tension forces. If an earthquake produces high vertical accelerations, it might result in damages to the bearing and to the supported structure, or even a separation from its foundation might occur, with serious consequences following. These problems prohibit the application of these isolators for taller structures. A tall building experiences uplift forces at its base because of wind and because of tilting caused by an earthquake.

QuakeProtect Modules based on Virtual Pendulums on the other hand solve this problem of uplift, since they rigidly anchor the building to its foundation, even during great ground displacements.

A building protected this way does not experience any "whiplash" effect that a tall building inevitably experiences in an earthquake. No bursting of windows, no lethal projectiles flying throughout the room.

By virtue of its design principle, a high rise supported by this technology is as stable and rigid as a conventionally designed steel frame structure. Additionally there is the advantage, that the structure is not forced into any movement by the ground motions and therefore does not experience any deformations with exterior or interior damages. Such protected high rises are perfectly earthquake safe.

With the method according to the invention to support buildings and objects through support devices that realize a movability for the load bearing support point as if the support point were the end of a pendulum with a long period, it is possible to realize a „Virtual Pendulum". Earthquake safety is elevated to the level of perfection.

Maximum possible displacements for known isolators may not be sufficient in great earthquakes. If these displacement limits are exceeded the building can be damaged or destroyed.

Even close to the epicenter of strong earthquakes, where great ground displacements can occur, that would overpower all existing protection systems, the system according to the innovation provides safety, since it can be designed for greatest displacements.

The system according to the invention realizes this level of protection by limiting the horizontal accelerations that can be transmitted from the base to the building to insignificant values of less than 0.01 g.

With these abilities and system characteristics the here described earthquake technology offers unique advantages in comparison to existing technologies.

It is no method and system known that makes a comparable behavior possible.

This new revolutionary principle represents a breakthrough in the worldwide efforts to find a complete solution to the threat of earthquakes.

4 SUMMARY OF THE INVENTION

The invention represents a base isolation system. It is a compact, passively working, load bearing device, which is to be installed in the foundation or the first floor of a building. The system prevents the transmission of vibrations and shocks of the ground onto the supported object.

The protected building is completely isolated from horizontal movements of the ground by novel support devices, which dissonantly discouple the natural oscillations of the supported object from the natural oscillation of the base.

Earthquake damages are effectively prevented. The principle of the Virtual Pendulum is effective at all earthquake frequencies and all base accelerations, and the devices can be designed for any necessary oscillation amplitudes.

These load bearing devices, according to the principle of the Virtual Pendulum, can be designed for any necessary displacements, for any vertical loads and can be designed maintenance free. The devices are suitable for the earthquake protection of objects of any kind by decoupling them from ground oscillation. They can also be used to retrofit already existing objects.

The above defined task is solved with the new solution of a support structure, consisting of QuakeProtect Modules, that supports the building or object. These protection modules are rigidly connected to the ground either through a common foundation or through individual foundations for each protection module. The modules support the structure at several points, rigidly connected, and allow the structure at the connecting points a movability in all directions, with great oscillation amplitudes possible and a low effective returning force, which in turn causes only minimal accelerations.

The invention represents a load-bearing support system, immune against earthquakes, to support structures of any kind, such as buildings, bridges, towers, industrial facilities and nuclear power plants or any kind of object. The system is positioned between the foundation and the supported structure and prevents that any dynamic forces caused by alternating horizontal ground movements and accelerations impact the structure in order to protect it from earthquake damages.

For the damping or elimination of vertical ground oscillations, mechanical, hydro pneumatic or visco elastic spring systems with a very low spring rate can be applied in combination with Virtual Pendulums as base isolation support devices.

4.1 Task and Goal

The goal of this solution is to provide a method and devices for earthquake protection to isolate the supported building or object from the movement of the ground to such a degree, that, independently of the magnitude of an earthquake, no damaging forces are transmitted to the building.

To realize resonancelessness of a building when the ground oscillates, the natural frequency of the supported building must be separated from the ground oscillation frequency to such a degree, that both oscillation systems are effectively decoupled. Consequently the horizontal acceleration forces and the shear forces caused by ground movements are not transmitted to the building structure.

If the frequencies of the earthquake oscillation and the natural frequency of the oscillation of the support system with the supported structure differ by a factor of 20 and higher, then it is not to be expected that the considerably higher frequency of the ground oscillation would incite an oscillation of the supported structure. In any case could an oscillation of the supported structure with a period of 20 seconds and more never cause any damage at all. Such an inert response of the building and the resulting low accelerations are physiologically hardly perceivable.

4.2 Deduction to Solve the Task

The initial considerations to begin with are the foundation for the deduction of the desired solution of the given task.

The beginning point of the analysis is the suspension of a mass from a pendulum.

FIG. 5 The mass 1 has the effect of a mass in a point at the lower end of the pendulum. If the mass 1 at the lower end 3 of the pendulum 2 is moved from its static resting position by the distance e, it experiences a lift of h, since the pendulum 2 with the length l describes a circle with the lower end 3 of the pendulum around the upper suspension point 4, with a radius of r=l. Since all movements can occur about two axis, in any direction, the lower end of the pendulum, the joint point of the suspended mass, describes a concave sphere, seen from above.

The lift h of the mass 1 results in an increase of potential energy of the mass. When the force, that caused the movement e of the mass 1 and the lift of h, disappears, the suspension force Z of the pendulum and the force resulting from earth gravity and from the mass (m·g) results in a returning force R, which brings back the mass 1 at the end of the pendulum to its stable resting position.

The same relations occur, if not the mass 1 is moved from its stable resting position, but if the upper suspension point 4 of the pendulum 2 is moved by the load-bearing structure 5 through lateral movement of the base 6. Hereby the pendulum experiences an angled position because of the inertia of the suspended mass, and the mass therefore is lifted. The then resulting movement of the mass occurs according to the oscillation characteristics of the pendulum.

The circular frequency of the oscillation is $$\omega = \sqrt{\frac{g}{l}} \tag{1}$$

g  gravitational acceleration
l  pendulum length

Thus the oscillation characteristics of the pendulum is only determined by the length of the pendulum.

The frequency of the pendulum is $$f = \frac{\omega}{2\pi} = \frac{\sqrt{\frac{g}{l}}}{2\pi} \tag{2}$$

The oscillation of the pendulum is only determined by the pendulum length.

The period is $$T = \frac{1}{f} = \frac{2\pi}{\omega} = \frac{2\pi}{\sqrt{\frac{g}{l}}} \tag{3}$$

A great pendulum length therefore results in a low oscillation frequency and a long period.

If the frequency of the pendulum and the frequency of the base are very different, if they are dissonant, both movements are considerably decoupled.

For example, if the upper suspension point of the pendulum is moved by the horizontal oscillation of the base because of an earthquake, with earthquakes usually having a dominant frequency between 0.5 Hz and 2 Hz, and the pendulum with great length having a very low frequency, compared to the stimulating frequency of the base, then the mass cannot follow the movement of the base. The mass remains almost motionless. When the mass begins to move with a very low speed according to the long period of its own natural oscillation, the reversal movement of the upper suspension point of the pendulum occurs with considerable higher frequency through the base, before the suspended mass has moved even slightly from its initial position. This reversal occurs repeatedly during continuing oscillation, with the effect, that the mass remains standing still, almost on the same position.

To get the desired greatest dissonance in frequencies the pendulum must have a great length. Though the realization of a pendulum of great lengths is quite impractical.

The here so far considered pendulum, which is suspended from a joint at its upper end, is a stable, load-bearing element, because it tends to return to its initial stable attitude or resting position at its lowest altitude of its center of gravity.

The realization of a so called "Virtual Pendulum", with a low physical height, but effectively performing with the characteristics of a pendulum of great length and therefore long period, is based on the principle, that the action of stable load-bearing elements, lifting the suspended mass, and unstable load-bearing elements, lowering the supported mass, are coupled in such a way, that the stabilizing, lifting effect slightly but sufficiently predominates.

Under the influence of gravitational acceleration the mass suspended from a stable load-bearing element seeks the position of its least potentional energy, within the boundaries of its movability.

If a mass is guided in its movability by a pendulum, any displacement from its resting position increases its potential energy. Accelerated by earth gravity it will return to its original resting position.

The attitude of the mass is called stable.

In contrast, if displaced from its initial position within the boundaries of its movability a mass decreases its potential energy, accelerated by earth gravity it continues to decrease its potential energy.

The attitude of the mass is called unstable.

By coupling and superimposing both influences, the stable mass displacement and the unstable mass displacement, through the appropriate choice of the geometry of the coupling elements, an only slightly lifting movement results, which only slightly increases the potential energy of the mass. The displaced pendulum returns slowly to its original resting position, resulting in a long natural period of the system.

This represents the action of a long pendulum.

If, according to the present invention, there is no actual physical long pendulum, but there is a device effectively simulating the action of a long pendulum with a long period, despite its relatively small actual physical dimensions, it is hereby defined as a „virtual" pendulum with a long period.

Although the so called Virtual Pendulum has a low physical construction height, it behaves with the characteristics of a long pendulum with a long natural oscillation period.

If with a certain available room height for installation, which determines the length l of the pendulum 2, the lift h becomes too great, then must an adding of an overlapping negative value, a lowering, result in a lesser lift, which is the desired goal. This can be accomplished by coupling a stable, hanging pendulum and an unstable, standing pendulum in an appropriate manner. If horizontally displaced, the coupled standing and hanging support elements and their respective positive and negative vertical displacements add up to a resulting vertical displacement.

Because the vertical displacements of both support elements occur harmonicly over the horizontal displacement, since resulting from circular functions, the difference (the overlapping) of both vertical displacements occurs harmonicly as well over the horizontal displacement.

FIG. 6 illustrates this correlation. The point of mass 3 of the stable pendulum 2 with the length l experiences the lift h when horizontally displaced by e.

$$h = l\left[1 - \cos\left(\arcsin\frac{e}{l}\right)\right] \quad (4)$$

The upper end of the standing, unstable pendulum 7 with the length $l_s$ is vertically lowered by the amount s when horizontally displaced by $e_s$ $$s = l\left[1 - \cos\left(\arcsin\frac{e_s}{l_s}\right)\right] \quad (5)$$

When the vertical movements of both support elements are added, a lift by the amount $h_{res}$ results.

The relations of α:β and e:$e_s$ are influenced by the kind of coupling used and by the freely choosable relation of l:$l_s$ By the adding of the vertical displacements of the stable and unstable pendulums the result as described in FIG. 6 comes about.

The coupling of the stable and unstable pendulums can be done in different ways. Through different lever influences to the lifts and lowerings proportionally transmitted values on the supporting elements or the coupling elements can be used to define suitable load bearing support points, which experience through the coupling of the proportional lifts and lowerings of both kind of pendulums the desired lift.

FIG. 7 The horizontal displacement $e_p$ of the chosen load support point, which is the lower end of the Virtual Pendulum, is a function of or approximately proportional to the displacement e of the hanging, stable pendulum.

As well are the lift and the overlapping lowering of the load bearing support point, the lower end point of the Virtual Pendulum, are a function of or proportional to the lift or the lowering of the points of mass of the hanging, stable and the standing, unstable pendulums.

The lift $h_p$ of the point of mass of the Virtual Pendulum, as a function of the displacement out of the middle resting position, represents, in first approximation, a circle. If swinging around two axes the point P describes the locus of a concave sphere, if seen from above.

The radius ρ is the length $l_p$ of the Virtual Pendulum.

FIG. 8 The supporting element 2 is a stable, hanging pendulum with the length $l_h$ and the supporting element 7 is an unstable, standing pendulum with the length $l_s$.

If the hanging pendulum, supporting element 2, moves about the angle α, the free movable end of the pendulum experiences the lift h. If the standing pendulum, supporting element 7, moves about an angle of β, the free movable end of the pendulum is lowered by the amount of s. The free movable end of the hanging pendulum, supporting element 2, describes a concave spherical surface, if seen from above. The free movable end of the standing pendulum, supporting element 7, describes a convex spherical surface, if seen from above.

FIG. 9 According to the invention at hand the free movable end of the hanging pendulum, supporting element 2, and the standing pendulum, supporting element 7, are coupled through a coupling element 8. With the coupled oscillation of both pendulums, the part of the coupling element 8, which is closer to the standing pendulum, supporting element 7, is lowered during oscillation. The part of the coupling element 8, which is closer to the hanging pendulum, supporting element 2, will be lifted during oscillation.

Anywhere on the coupling element 8 with the length c a point P, which is the load bearing support point of the supported object, dividing the length of the coupling element 8 by the ration of a:b, experiences only a small lift during the oscillation of both supporting elements in any direction, within the range of expected horizontal displacements.

This is determined by the proper choice of the relative dimensions of $l_s, l_h$, c and by the ratio of a to b. With shorter length $l_h$ of the hanging pendulum, supporting element 2, and the same pendulum swing e, the end of the hanging pendulum, experiences a greater lift h. A greater length $l_s$ of the standing pendulum, supporting element 7, at the same pendulum swing e of the pendulum, results in a lesser lowering s.

Point P on the coupling element 8, dividing the length c by a ratio of a:b, should be positioned in such a way, that the lift of point P through a pendulum swing e of the hanging pendulum, supporting element 2, is always positive but remains minimal. If the coupling element 8 is hindered through a suitable bearing to rotate around the vertical axis H, the same conclusions are valid, when the oscillations of the supporting elements 2 and 7 also occur in other directions, as illustrated in FIG. 10, which shows the view from above.

FIG. 10 The coupling element 8 rotates around the axis Q in its bearings B, which are rigidly connected to the supported mass and is therefore hindered to rotate around the vertical axis H. The free end of the hanging pendulum, supporting element 2, describes a concave sphere K, seen from above. The standing pendulum, supporting element 7, describes a convex sphere V, seen from above. If the free end of the hanging pendulum, supporting element 2, swings by an amount e in any direction, the point P of the coupling element 8 and thus the axis Q is lifted in the same way as if the swining occurs in the direction of the X-axis.

Also the bearing point connecting the coupling element 8 with the supporting element 7 experiences the same lowering, when the pendulums, the supporting elements 2 and 7, swing in any direction, as in the direction of the X-axis. Therefore, the point P on the coupling element 8 experiences a lift with the oscillation of the coupled pendulums in any direction.

As shown in FIG. 9, point P moves like the free end of a hanging long pendulum with the length $l_v$. It represents the free end of a Virtual Pendulum of great length.

FIG. 11 With a displacement e of the coupling element 8 in FIG. 9 from its resting position and a lift $h_p$ of point P the length of the virtual pendulum is according to FIG. 9

$$l_v = \frac{e^2 + h_p^2}{2 h_p} \quad (6)$$

The circular frequency of the Virtual Pendulum is $$\omega = \sqrt{\frac{2g \cdot h_p}{e^2 + h_p^2}} \quad (7)$$

The oscillating frequency of the Virtual Pendulum is $$f = \frac{1}{2\pi} \sqrt{\frac{2g \cdot h_p}{e^2 + h_p^2}} \quad (8)$$

The period of the Virtual Pendulum is $$T = 2\pi \sqrt{\frac{e^2 + h_p^2}{2g \cdot h_p}} \quad (9)$$

The maximum speed of the point P of the free end of the Virtual Pendulum is $$v_{max} = \sqrt{\frac{2g \cdot h_p}{1 + \left(\frac{h_p}{e}\right)^2}} \quad (10)$$

The maximum acceleration of the free end of the Virtual Pendulum and herewith of the supported object is $$a_{max} = \frac{2g \cdot h_p}{e + \frac{h_p^2}{e}} \quad (11)$$

With nearly the same functionality, the supporting elements 2 could also be designed as ropes to economize mechanical links, if the supporting elements 2 are exclusively subjected to tension loads.

FIG. 12 shows a variant of the principle.

Besides the choice of the ratios of $l_h$ to $l_s$ and a to b, also the choice of the angle γ of the effective lever b of the coupling element 8, and also introducing an angle relating to the effective lever a, determines the lift of point P and therefore the effective length of the Virtual Pendulum.

The dimensions can be chosen in such a way, that the effective length $l_v$ of the Virtual Pendulum is a multiple of the height of the earthquake protection device. Through this it is possible to determine, that the oscillation frequency of the Virtual Pendulum and the mass m it supports is significantly lower than the oscillation frequency of the base 6 caused by horizontal movements of an earthquake.

This results in a decoupling of the position of the by Virtual Pendulums supported object from the horizontal movements of the ground. The maximum accelerations that would affect the building, or any supported object, can be deduced from the performance of a mathematical pendulum according to equation (11).

Proper design and dimensioning allow a reduction of this maximum acceleration to such a low value, that it becomes physiologically imperceptible. This effectiveness is independent of the magnitude of horizontal accelerations, that the base 6 experiences because of an earthquake.

The nearly complete motionlessness of a building, supported by Virtual Pendulums of effective great length and long period, is not influenced by the magnitude of the earthquake.

FIG. 13 corresponds in its fundamental principle to the solution according to FIG. 9 and FIG. 12. Here though is the lever with the effective length b separated from the lever with the length a and is hinged at a higher position to the load support element $W_L$, proportionately supporting the mass m.

With this solution the hanging, stable pendulum 2 and the standing, unstable pendulum 7 with their respective lengths $l_h$ and $l_s$ occupy a greater portion of the available room height. Therefore, with the same maximum angle available for the swing of the bi-axially hinged support elements 2 and 7, the system has a greater displacement capability in relation to the available room height for installation.

The coupling element 8 is connected to the coupling element $8_b$ through the coupling support $8_a$, which has 1-axis hinges on each end. The coupling element $8_b$ is hinged to the support element $W_L$ and is supported, bi-axially hinged, by the standing, unstable pendulum 7. The behavior corresponds to the diagrams of FIG. 9 and FIG. 12.

Figure 17:
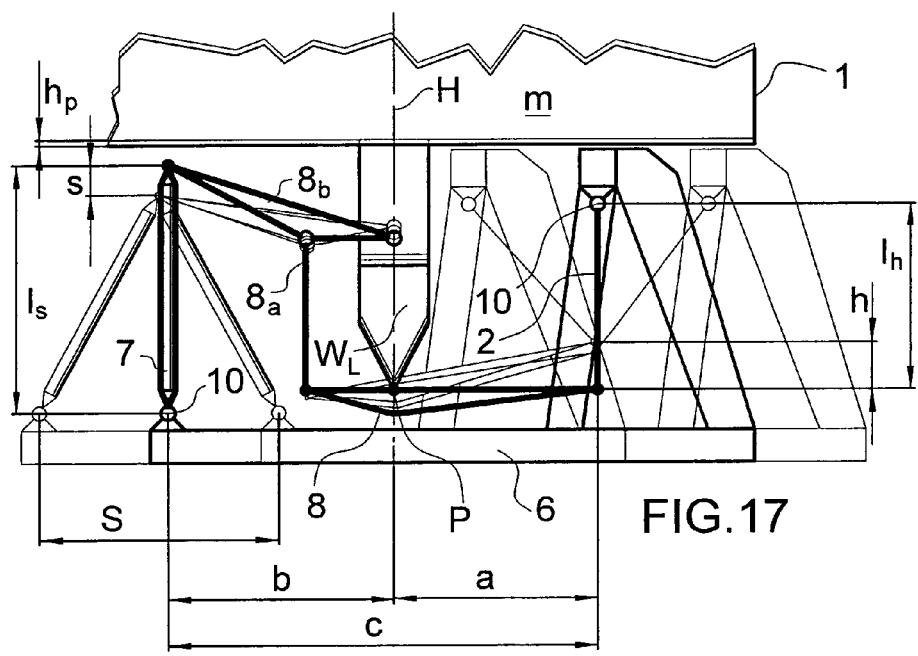

FIG. 17 With an oscillation stroke S of the base 6 and of the with the base connected virtual support point $C_v$ of the Virtual Pendulum $P_v$, the stable support element, the hanging pendulum 2, lifts its lower support point by the amount h, and the unstable support element, the standing pendulum 7, lowers its upper support point by the amount s, whereas the supported object O experiences a lift $h_p$, corresponding to the lift of the Virtual Pendulum $P_v$.

Figure 18:
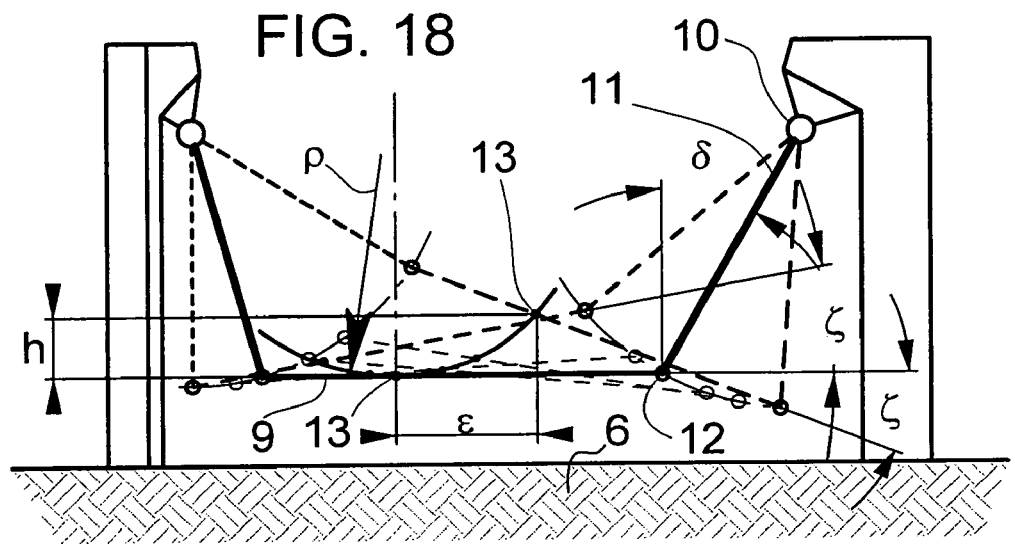

FIG. 18 This digram shows a system with a triangular coupling element 9.

Figure 19:
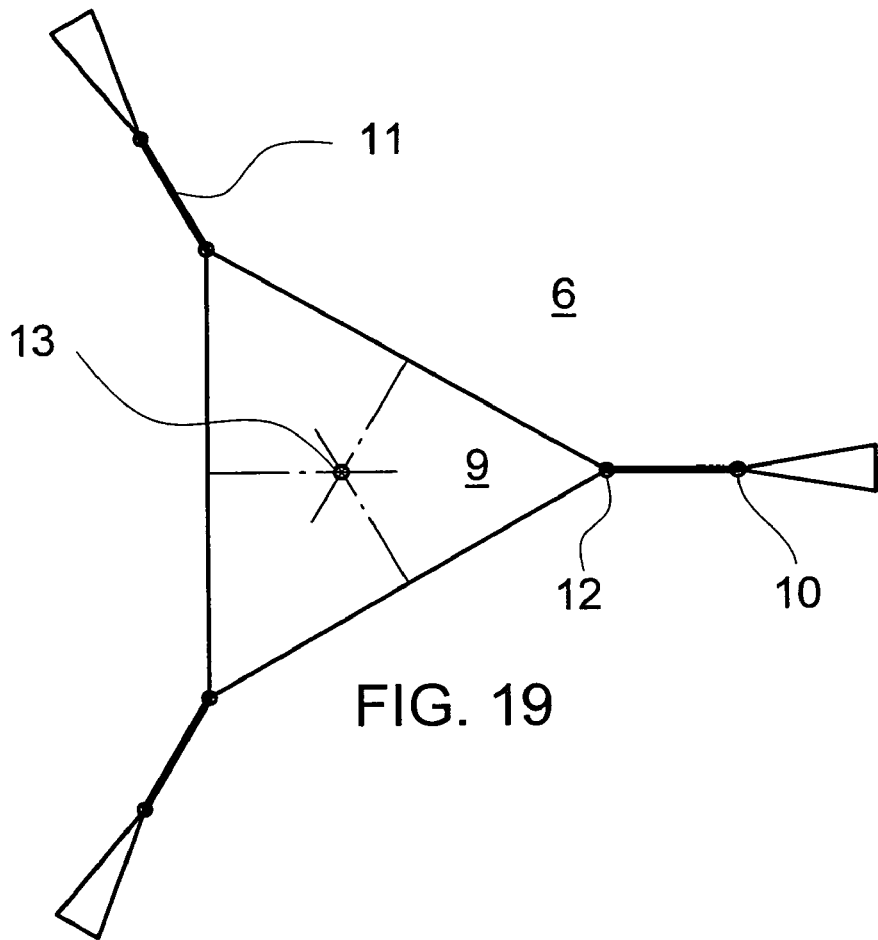

FIG. 19 shows the vertical view from above of the system depicted in FIG. 18. The triangular coupling element 9 is bi-axially hinged to three supporting elements 11. Each supporting element 11 is, at an angle δ, bi-axially hinged to the base 6 at three supporting points 10.

If on one side of the coupling element 9 a supporting element 11 experiences a lift at its lower connecting point 12, because its upper supporting point 10 moves away from the center of the coupling element 9, because of a movement of the base 6, and because the coupling element 9, by its inertia and by the inertia of an object's mass, which is supported at the center 13 of the coupling element 9, stays behind, relative to the movement of the base 6, then on the opposite side of the coupling element 9 the lower joint points 12 of the supporting elements 11 are lowered, since in their original middle position the supporting elements 11 are not vertical but inclined towards their common middle.

Since, because of the initial inclined attitude of the supporting elements 11, with the angle δ, the lowering of one side of the coupling element 9 is less than the lift at the opposite side, the center 13 of the coupling element 9 experiences a lift.

The ratio of the lift of the coupling element 9 at one side to the lowering at its opposite side is influenced by the choice of the angle δ, in reference to the centered resting position of the coupling element 9, and by the choice of the relative geometric dimensions of the supporting elements and the coupling element.

If the base moves in all directions, the center 13 of the coupling element 9 moves on a locus in the form of a concave sphere, open upwards with the curvature radius ρ.

The center 13 of the coupling element 9 moves as if suspended from a "virtual" pendulum with the length ρ. If moved horizontally by the amount ϵ, the center 13 of the coupling element 9 experiences a lift h, and the coupling element 9 experiences an inclination by the angle ζ.

Figure 20:
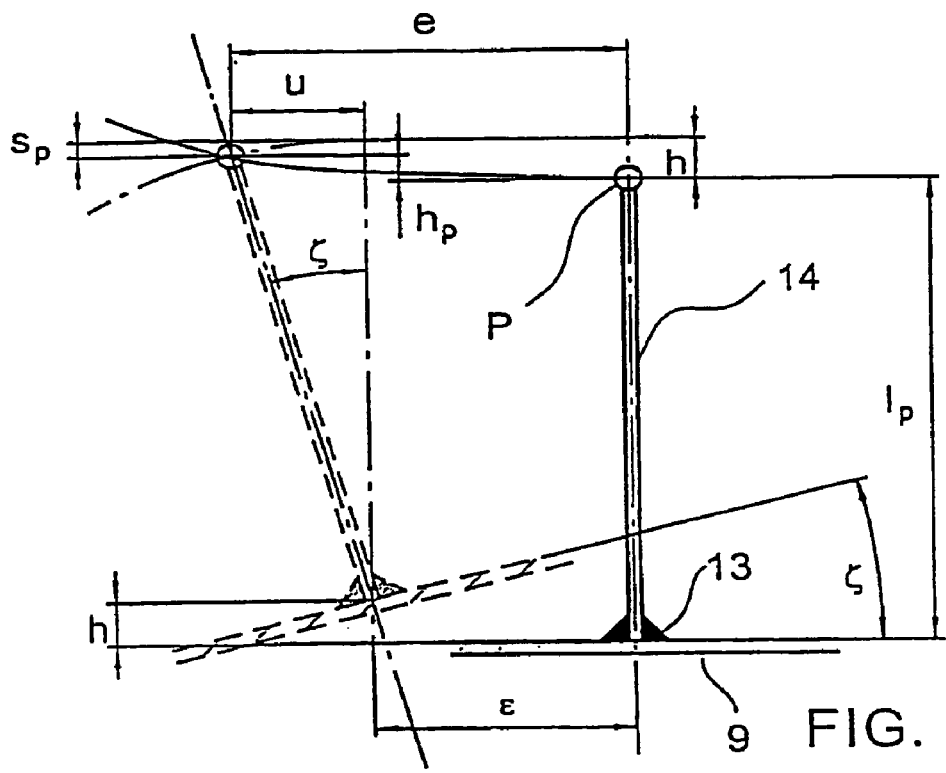

FIG. 20 If in the center 13 of the coupling element 9 is a vertical supporting element 14 rigidly affixed with the height $l_p$, then this unit itself represents a standing, physically unstable pendulum. Below its physical extension the standing pendulum is virtually supported and bi-axially hinged, and when tilted around the lower momentary pivot the unit would be lifted by the amount h, since being coupled through the coupling element 9 to the supporting elements 11, as shown in (FIG. 19).

By tilting by the angle ζ the support point P of the supported mass, on top of the supporting element 14 with the height $l_p$, in union with the coupling element 9, experiences a relative lowering by the amount $$s_p = l_p(1-\cos\zeta) \tag{12}$$

and an additional eccentric displacement $$\mu = l_p \cdot \sin\zeta \tag{13}$$

The total eccentric displacement of the point P becomes $$e = \epsilon + \mu e = \epsilon + l_p \cdot \sin\zeta \tag{14}$$

The resulting lift of the point P becomes $$h_p = h - s_p \quad h_p = h - l_p(1-\cos\zeta) \tag{15}$$

Figure 21:
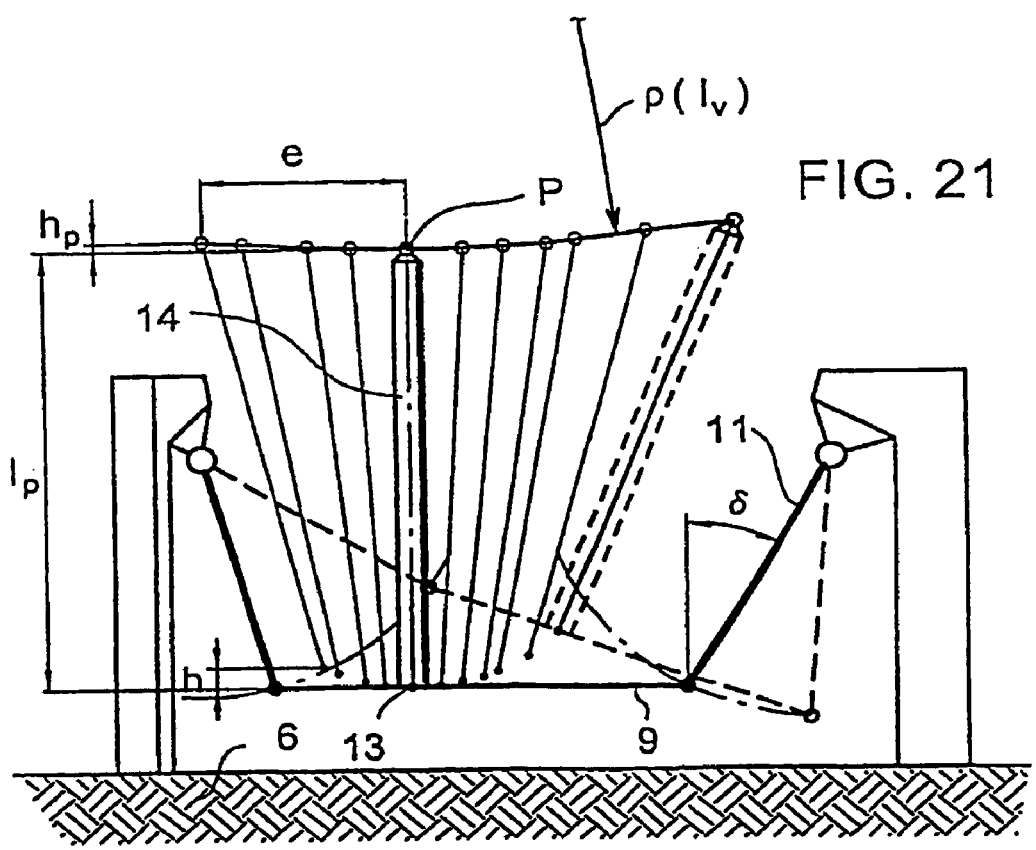

FIG. 21 Point P, the upper end of the supporting element 14, moves on a locus of a concave area, open upwards, with a flat curvature. The curvature and the stable position is determined by the relative dimensions of each element of the unit to each other, and particularly by the height $l_p$.

The choice of the length of $l_p$ is limited by the height, at which the system becomes unstable. The device according to FIG. 21 represents a Virtual Pendulum that supports an object in a bi-axial bearing in point P, in such a way, as if the supported object were suspended from a long pendulum with the length $l_v$, moving on a curved surface with the radius ρ.

With e and $h_p$ from the equations (14) and (15) the length of the Virtual Pendulum is determined by equation (6).

In this dish moves the load bearing support point always towards the lowest point, the center of the dish.

The flatter the curvature of the dish is, the smaller is the returning force towards the center caused by gravity and the slower moves the load bearing support point towards the center.

Furthermore the equations (7) to (11) apply.

With nearly the same functionality, the supporting elements 11 can also be designed as ropes to economize the mechanical links, as long as the supporting elements 11 are exclusively subjected to tension loads.

The load bearing support point of the QuakeProtect Module has a movability in space as if it were the lower end of a very long pendulum. This point moves in a flatly curved virtual spherical surface.

Figure 22:
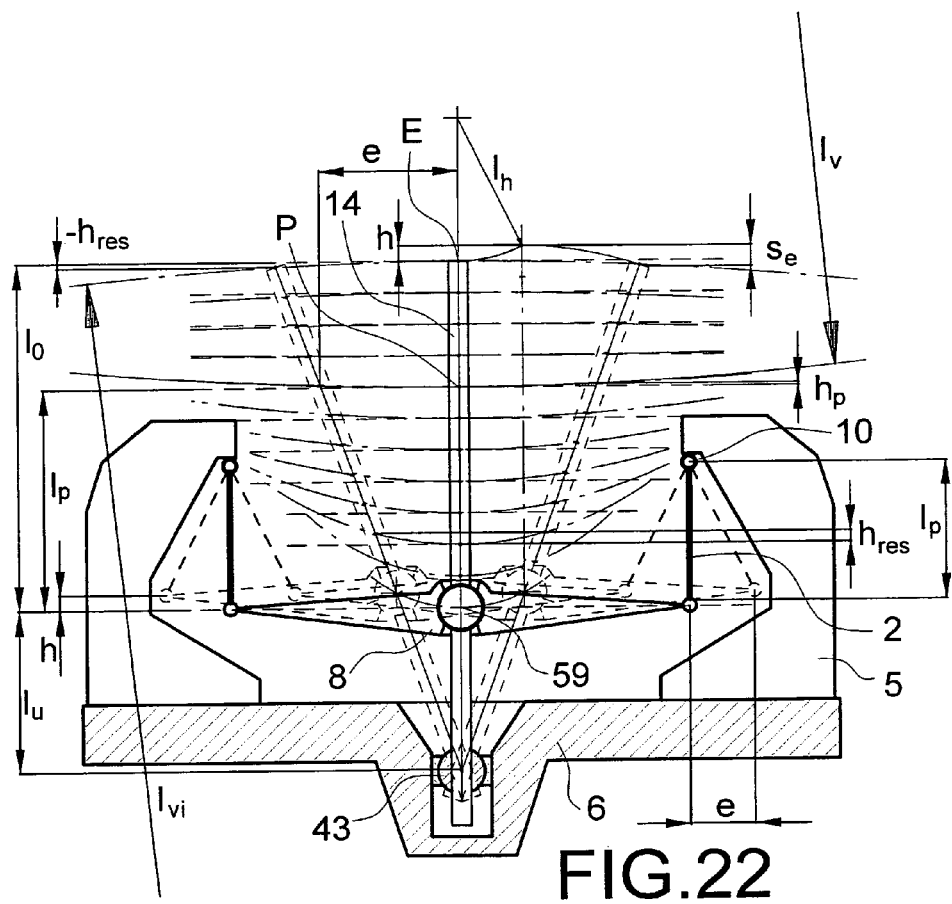

FIG. 22 shows another example of a Virtual Pendulum according to the method as defined in claim 1.

To the support structure 5, which is connected with the base 6, are bi-axially hinged at east two or several stable support elements, vertical parallel hanging pendulums 2, which support a cross beam coupling element or a platform coupling element 8.

Through the center of the coupling element 8 reaches a vertical support element 14, anchored in a bi-axially movable, vertically load sustaining bearing. Its lower end is positioned in a ball bearing 43, with axial movablity but horizontally fixed. In the bearing 43 the vertical support element 14 can swivel around all horizontal axes.

The center of the bearing 59 has the same movability in space as the lower ends of the hanging pendulums 2 with the length $l_h$ and experiences a lift h when horizontally displaced by e.

In the example of FIG. 22, for the top of the support element 14 the resulting lift is negative, it experiences a lowering. This point therefore would unsuitable as a load bearing support point.

The top, if displaced from its middle position in any direction, describes a convex area, if seen from above, as the top of a standing pendulum would do. This represents an inversed, unstable Virtual Pendulum with the length $L_{vi}$.

If there is a load on top of the support element 14, with its dimension, in relation to the dimensions of the other coupled elements 2 and 8, it is unstable.

By itself, without being coupled to other elements, it is already unstable. Only by being coupled to other elements, whose stabilizing influence under a load predominates, the whole system becomes stable and constitutes a load bearing Virtual Pendulum.

To realize load bearing stability, a length $l_o$ must be chosen, so that a positive lift $h_{res}$ of the top results. The load bearing support point P therefore describes a concave area, if seen from above. The so chosen load bearing support point P, with the distance $l_p$ from the bearing point 59, experiences a little lift $h_p$ if displaced from the middle position. The load bearing support point P therefore represents the end of a Virtual Pendulum with the length $l_v$.

Figure 23:
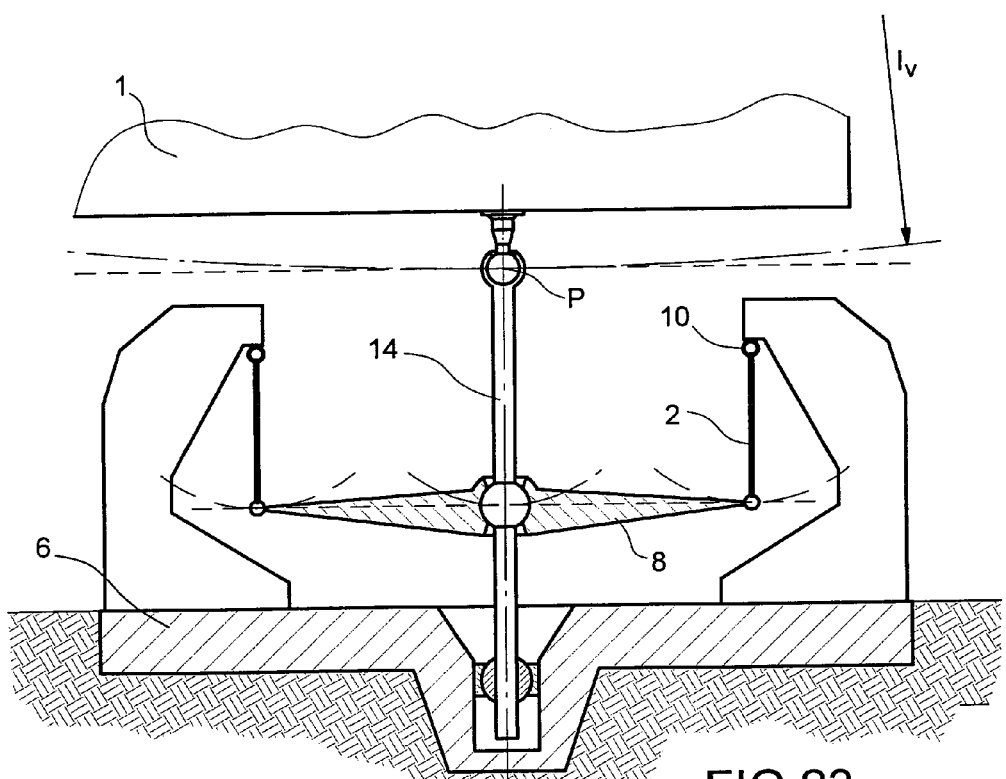

FIG. 23 shows the curvatures, which are described by the lower load bearing points of the hanging pendulums 2, the center of the coupling element 8 and the the load bearing support point on top of the vertical support element 14.

Figure 23A:
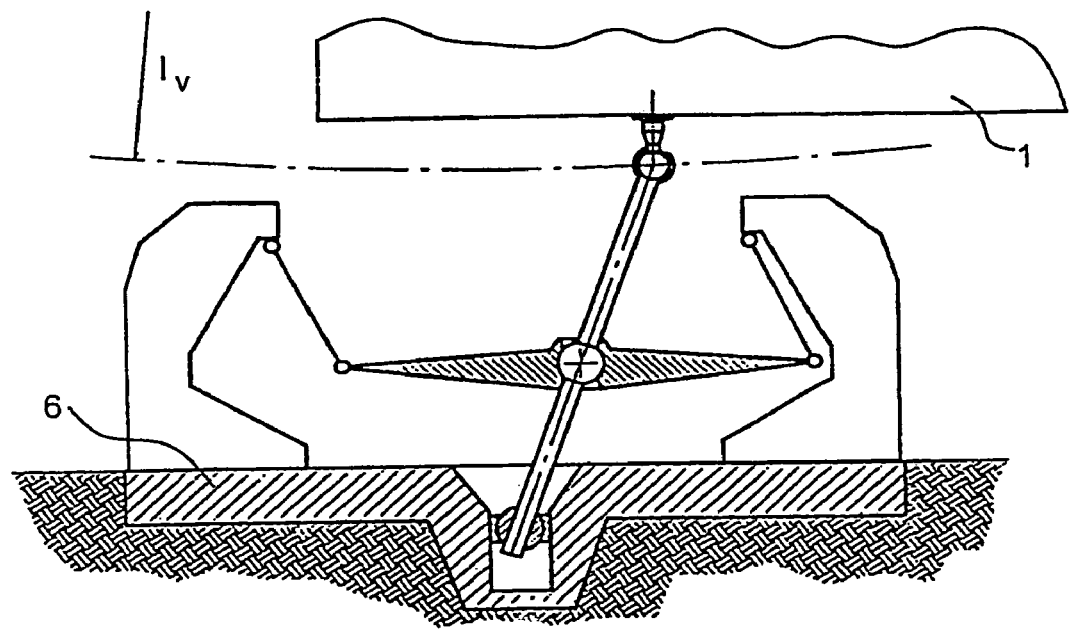
Figure 23B:
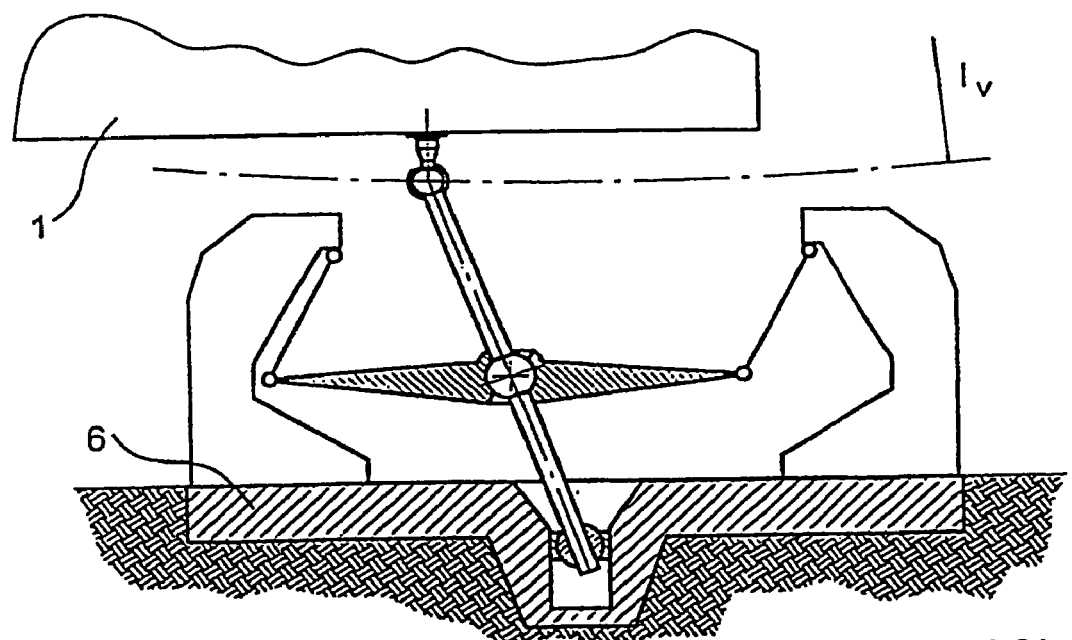
Figure 23C:
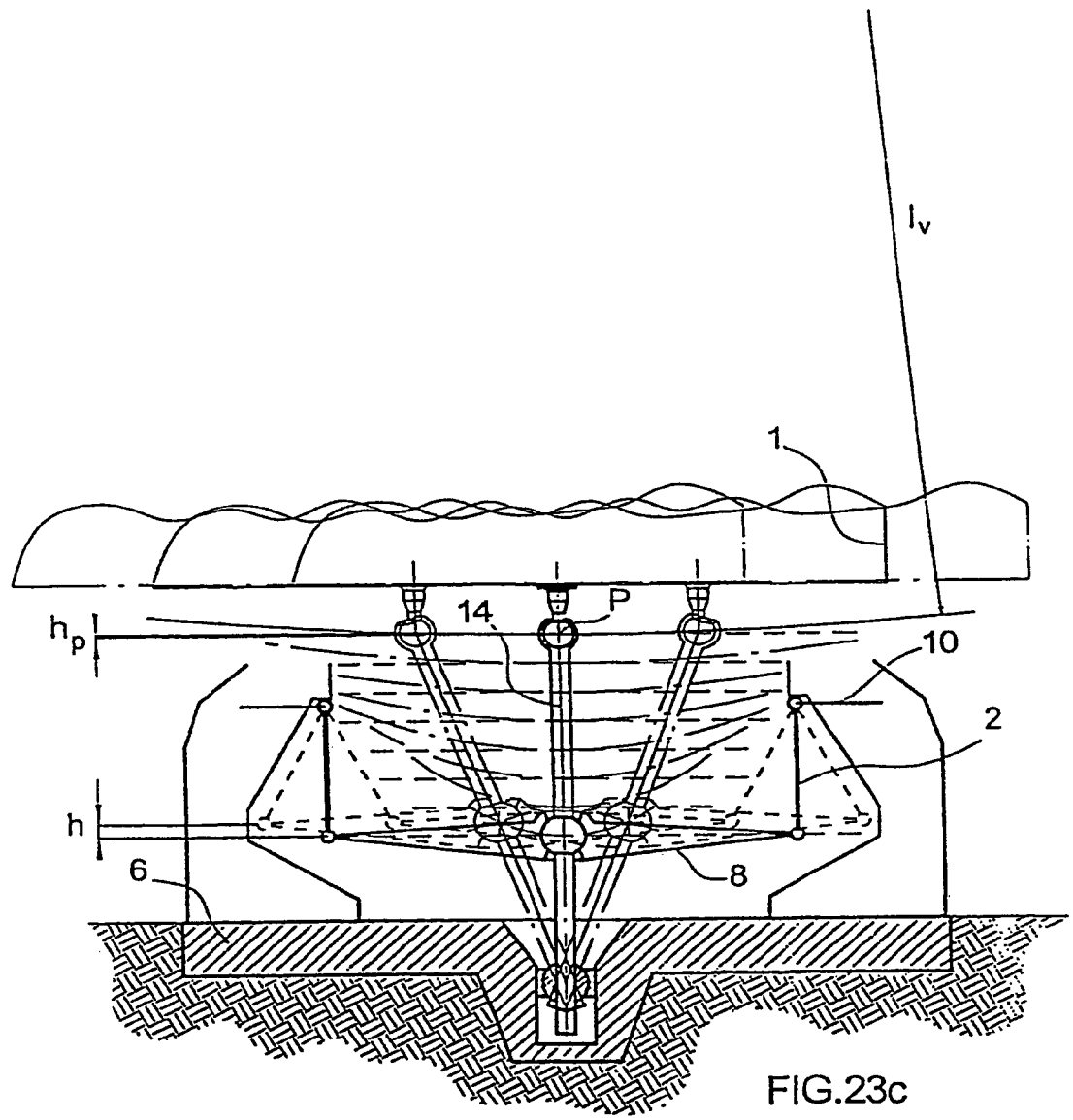

FIG. 23a, 23b, 23c show movement positions of the supported object 1 relative to the base 6 in the maximum displaced positions and superimposed.

Figure 24A:
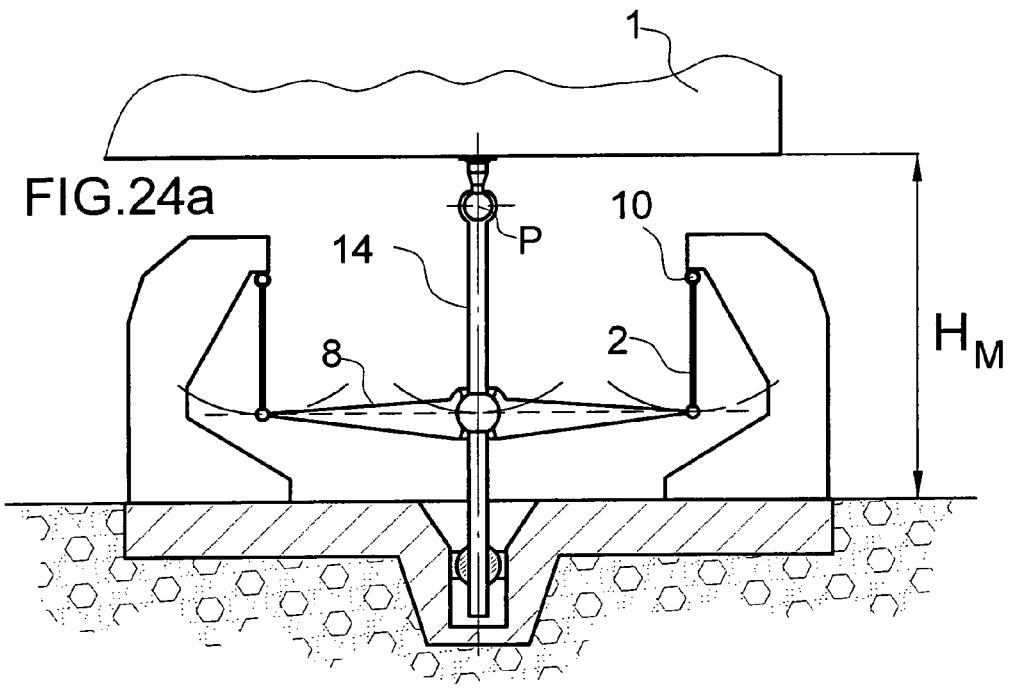
Figure 24B:
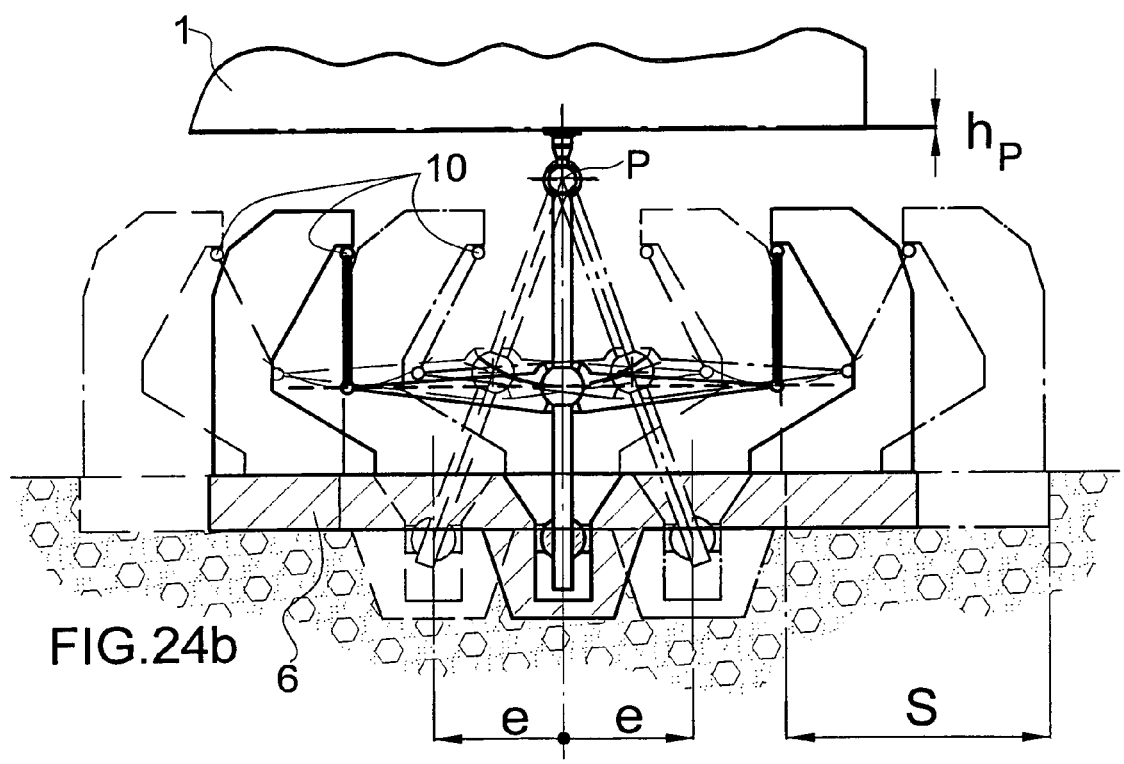

FIG. 24 shows schematically a Virtual Pendulum according to the principle illustrated in FIGS. 22 and 23c, showing its middle resting position and the movement positions of the base 6 relative to the supported object 1. If the base 6 moves by the amount e because of an earthquake, the object 1, supported by Virtual Pendulums, experiences a lift of the little amount $h_p$.

The amount of the displacement s of the base 6 relative to the height $H_M$ of the QuakeProtect Module shows, that with average story heights relative great oscillation amplitudes of the system are possible.

The movement characteristics represent a mathematical pendulum. Its natural period is only determined by the effective length of the Virtual Pendulum.

The clock pendulum illustrates this.

If during an earthquake the upper support points of the pendulums 2, which are connected to the oscillating base, move quickly back and forth, the mass suspended from the Virtual Pendulum cannot follow the quick reversal of movement of the upper support point of the pendulum, because of its inertia, determined by the characteristic of the Virtual Pendulum.

If the reversal of the direction of movement occurs quickly, the supported mass practically remains standing still.

4.3 Result of the Solution of the Problem

The solution of the problem according to the invention at hand is realized through a method according to claim 1 and the described devices deduced from it.

Advantageous designs according to the invention are the subjects of the sub claims.

The invention ensures the resonancelessness of the building when ground vibrations occur because of earthquakes. Horizontal acceleration forces and shear forces from the movement of the ground are not transferred to the building structure. This realizes an integral earthquake protection, which protects the building or object reliably against even strongest horizontal ground oscillations.

With the method of the present invention and with the proper choice of design parameters it is possible to maintain an almost motionlessness of the supported object, even if the ground moves with great amplitudes and high accelerations.

The application of the principle of the invention prolongs the natural oscillation period of a supported object. Consequently, because of the inertia of the mass, the object cannot follow the oscillating movements of the earth and of the foundation. The protected object or building remains totally unmoved even in the event of an earthquake of greatest magnitude.

Such efficiency is mathematically transparently provable.

The performance of the invention as an effective earthquake protection could already be demonstrated through a small scaled model simulation with accelerations of up to 1.2 g.

Therefore, the object is completely isolated against horizontal movements of the ground. It is an effective base isolation system, a support structure of little height, which allows the supported object a movability in space, as if it were suspended from a very long pendulum. The supporting device is called a Virtual Pendulum with long oscillation period.

The design parameters of the device can be chosen within a broad range. Hereby the difference of the frequency of the natural oscillation of the system and the frequencies of earthquake oscillations can be determined to such a degree, that the oscillation systems of the structure and the base are completely decoupled. The supported structure therefore remains standing still in its resting position.

Since the supported structure cannot follow the ground's oscillating movements, there occur no mass reaction forces caused by accelerations. Consequently there are no dangerous shear forces and all earthquake damages are prevented.

The mass of the building is suspended from „virtual" pendulums of great effective pendulum length, with the suspension point high in space above the building.

Virtual Pendulum earthquake protect modules, called QuakeProtect Modules, offer an effective protection against earthquakes of even the greatest magnitude and destruction potential. For the first time it is possible to design and retrofit any kind of structure, including high rises and slim towers, completely earthquake proof.

The novel QuakeProtect Module realizes the performance characteristics of a very long pendulum, without its vertical extension. It represents therefore a „Virtual" Pendulum with a great effective pendulum length. With little height necessary for installation, it fits within one story, either the first floor or the basement of a building.

The upper supporting point of the Virtual Pendulum is rigidly connected with the base through the support structure of the QuakeProtect Module.

A mass suspended from a very long pendulum can move only very slowly. The time period for one oscillation is great. With this technology the natural period of the Virtual Pendulum system can be freely chosen and the design of the structural members of the device is determined accordingly, for example for 20 seconds or longer. The periods of earthquake oscillations typically are between 0.5 to 2 seconds. Is the upper support point of the pendulum rapidly displaced, the mass suspended from the pendulum follows into the new position only with a speed determined by the oscillation characteristics of a pendulum with great length.

The performance of the QuakeProtect System is not determined by the magnitude of the impulse. It does not matter of what magnitude the earthquake is, how fast the earth moves, how strongly the foundation of the building is accelerated, how high or low the frequency of the earthquake oscillation is, or how harmonic or disharmonic, because the result is always the same.

Any acceleration that is transferred to the supported structure is reduced to a value of less than 0.01 g, a value hardly even perceptible.

The protective efficiency of this principle is always the same at all ground velocities and accelerations.

The supported structure does not move in a strongest possible earthquake nor in weak earthquakes.

According to the principle of the present invention, no energy is redirected, transformed or absorbed, but rather no kinetic energy is transmitted into the building structure in the first place.

Since it is not submitted to oscillating movements, no mass reaction forces caused by accelerations occur, earthquake damages are prevented.

The supported object is completely isolated from horizontal movements of the ground, it is therefore a most effective base isolation.

For this reason no additional seismic reinforcements are necessary for a building, as required by modern building codes.

A small scale prototype has already demonstrated predetermined and expected performances.

4.4 Greatly Reduced Friction with Horizontal Displacement

With this present invention, because of the design principle of the solution, the physically existing friction at the bearing points of the structural elements is effective greatly reduced, which results in a low lateral shift resistance of the moved mass.

An extremely low friction coefficient is the result. Therefore, through friction are no considerable acceleration forces transmitted from the base into the structure. The building consequently can easily be moved. Wind forces therefore can easily shift the supported object out of the middle position of its available maximum displacement range. Consequently, if then, when shifted out of its middle position, an earthquake occurs, the actually available displacement range is shortened in the direction of the initial shift caused by the wind force.

The design principle of the support structure of the new solution makes it possible to reduce the physically effective friction to very low values by a high reduction factor. The shift resistance is $$W = m * g * \mu_{red} \tag{16}$$

achievable values: $\mu_{red}$=0,002 . . . 0,004

Consequently, because of the low effective rest friction, only very low acceleration forces are transferred to the supported mass.

The available space for further displacement may never become less than the potentially possible displacement of an occuring earthquake. It is therefore necessary, additionally to the primary task of isolating the supported object from ground movements, to integrate elements into the whole solution that keep the structure in its centered position when an earthquake occurs.

4.5 Centering of Supported Objects und Wind Force Compensation

The movements of the bearing points of the supported object on QuakeProtect Modules occur in very flat, concave, spherical areas, if seen from above, whereas a spherical area is not exactly a sphere, but closely approximating a sphere.

The curvature of the area that a support point describes when displaced from the middle position is not constant, which though does not compromise neither the functionality nor the performance of the system. When fully displaced, a lift results in a repositioning force caused by gravity, which brings about a self-centering of the support point. Nevertheless, the support point may not be completely repositioned into the middle position, because of some rest friction, as little as it may be.

The horizontally effective thrust, the restoring force after displacement from the middle position, that results from the mass inertia of the object suspended by Virtual Pendulumss is $$S_H = m \cdot g \cdot \frac{e}{l_v} \cdot \cos\left[\arcsin\left(\frac{e}{l_v}\right)\right] \tag{17}$$

$S_H$  horizontal thrust because of gravity
$M$  supported mass
$G$  gravity of the earth
$E$  displacement from the middle position
$l_v$  length of the Virtual Pendulum The horizontal resistance against displacement because of friction is $$W_H = m \cdot g \cdot \mu_{red} \tag{18}$$

$W_H$  horizontal resistance against displacement
$\mu_{red}$  reduced friction coefficient The horizontal resistance against displacement, according to the design principle of the QuakeProtect Modules, is extremely low. This is due to the fact that the friction coefficient is reduced according to the relation of ½ of the bearings' diameter of the pendulum support elements to the effective length of the pendulum.

The reduced friction coefficient becomes $$\mu_{red} = \mu \cdot \frac{D_L/2}{L_P} \tag{19}$$

$\mu$  friction coefficient of the bearings of the pendulum
$D_L$  diameter of the bearings of the pendulum support elements
$L_P$  length of the pendulm support elements Since according to the inteded design the curvature of the moving sphere of the lower end of the virtual pendulum is very flat in its central area because of the desired effect of decoupling from ground movement, nevertheless in spite of an extreme low friction after swinging out there is a hysteresis with a remaining
deviation from the center position $$A_H = l_v/\sin(\text{arc sin-arc }\cos\mu_{red}) \tag{20}$$

$A_H$ . . . final horizontal displacement from the middle position

The concept of the QuakeProtect Modules allows to design for possibly great displacements, that in the case of extreme ground movements, there is still enough space available for displacements relative to the base, even when the starting position was not the middle position. The initial position of the building may vary because of wind force shifts and because of different possible positions after an earthquake stops. If this is of no concern, an additional centering of the building and resistance against wind forces would not be necessary. But if it is necessary that the building always remains on the same spot, an additional device for exact centering can be installed as described below.

FIG. 25 shows a simple solution for horizontal centering and fixation. Such a device is needed at at least 2 points of the building. It can also be integrated into the QuakeProtect Modules themselves.

A preloaded extension spring 41 is connected to the base at its lower end. At its upper end the spring supports the shaft 42, that sticks axially movable into a spherical bearing 43, which is rigidly connected to the supported structure. The extension spring 41 is tightened to such a degree, that the horizontal leverage at the postion of the bearing 43 counteracts any expected maximum wind force, without bending the spring 41, which would lift the coils on one side of the spring, and therefore tilt the shaft 42.

But, if there occurs a horizontal movement of the base relative to the supported mass of a building through an earthquake with high accelerations, causing an impulse of the accelerated building mass that significantly surpasses any possible wind load, then by the resulting moment through the lever of the shaft 42 the spring 41 is bent. The base experiences a displacement $\epsilon$ relative to the building. With further shift, after overcoming this initial moment, the force does not increase linearly but degressively. Therefore, the reaction force of the spring is kept low through the oscillation amplitude S.

This horizontal fixation can also be applied in reversed position, whereas the joint 43 is connected with the base 6 or is enclosed within the foundation, and the shaft 42 is hanging down with the spring 41 connected to the building structure 51.

FIG. 26 shows a comparable solution to keep the building centered with a elastomer spring block 48. Properly dimensioned, this solution shows a performance comparable to the solution in FIG. 25. The difference is that there is no distinct break off moment. From the beginning, the movement occurs linearly depending on the horizontal force.

The reversed position is also possible for this solution.

Figure 27:
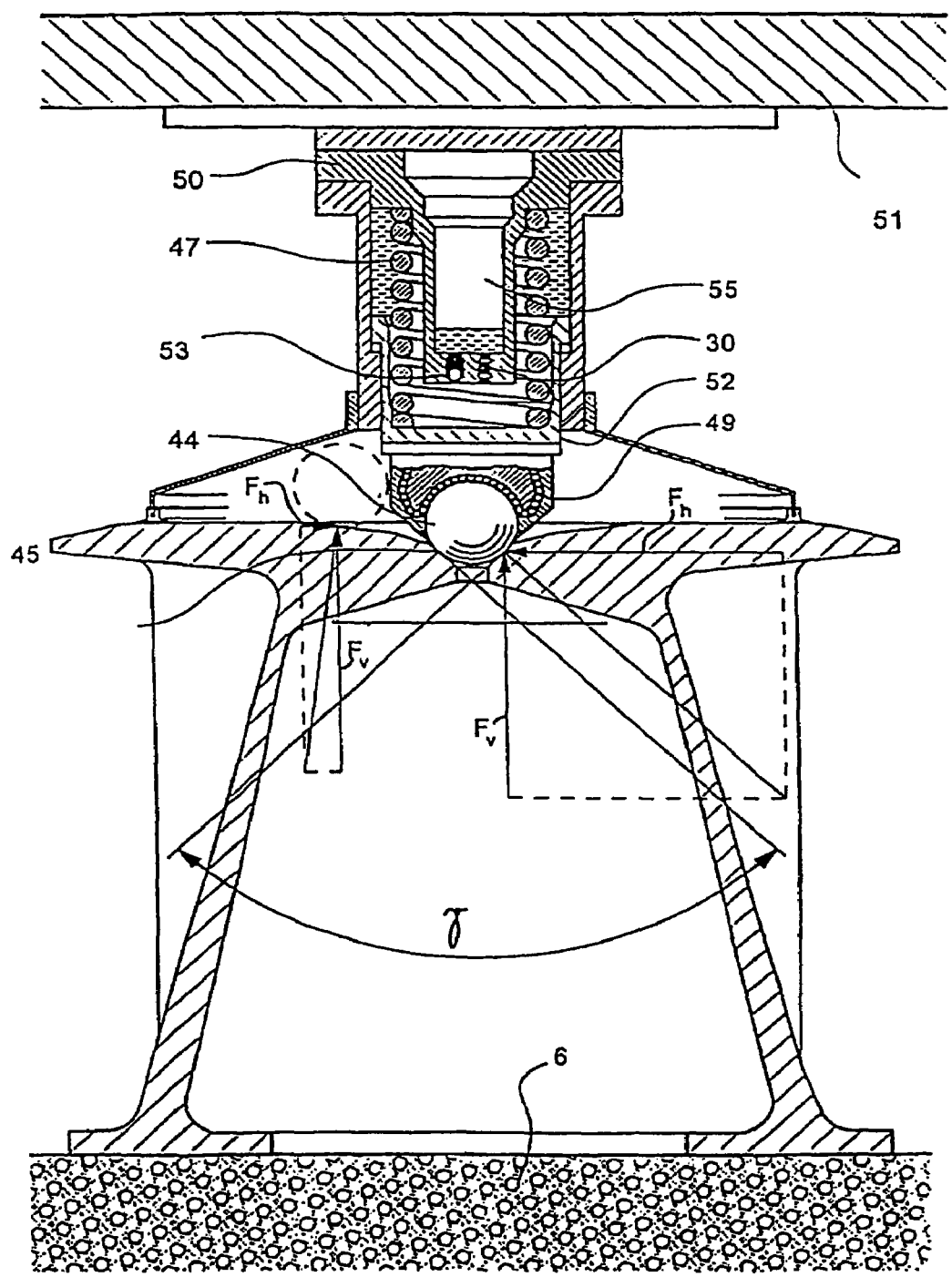

FIG. 27 shows a device to keep a building centered, whereas at at least two points underneath the supported structure 51 is a positioning device 50 rigidly connected. A rotating ball 44, held in a dish 49 with rolling balls, is pressed into a centering cone 45 by the spring 47 with the vertical force $F_v$, which equalizes the expected maximum horizontal force $F_h$ caused by wind loads.

$$F_v = F_h tg(\gamma/2) \qquad (21)$$

$F_v$ . . . Vertical Force
$F_h$ . . . Horizontal Force
$\gamma$ . . . Opening angle of the centering cone If the force $F_v$, becomes greater than any possible maximum wind force, which can only be caused by the impulse of an earthquake, then the shift of the centering cone 45, caused by the shift of the base 6, presses the rolling ball 44 against the spring 47 through the piston 52. The spring 47 is then pushed back. Consequently, the rolling ball 44 moves into the area of the centering cone 45 with reduced inclination or increasing opening angle $\gamma$. Hereby decreases the horizontally transferable force and becomes zero when the rolling ball leaves the area of the cone and rolls on the flat surface.

The fluid, displaced by the piston 52 enters through the check valve 53 into an external reservoir or into the integrated reservoir 55. When it spring pushes back, the speed of the moving piston 52 is slowed, since the fluid can only flow back through the throttle orifice 30.

With the high speed oscillation of the base the slowly returning rolling ball 44 does not touch down in the steeper center of the centering cone 45 but in the section of little inclination. Consequently, the transferrable horizontal forces are low.

When the oscillation stops, the returning rolling ball 44 settles in the steeper part of the centering cone and centers the supported object with the again effective higher horizontal restraining force $F_h$.

Figure 28:
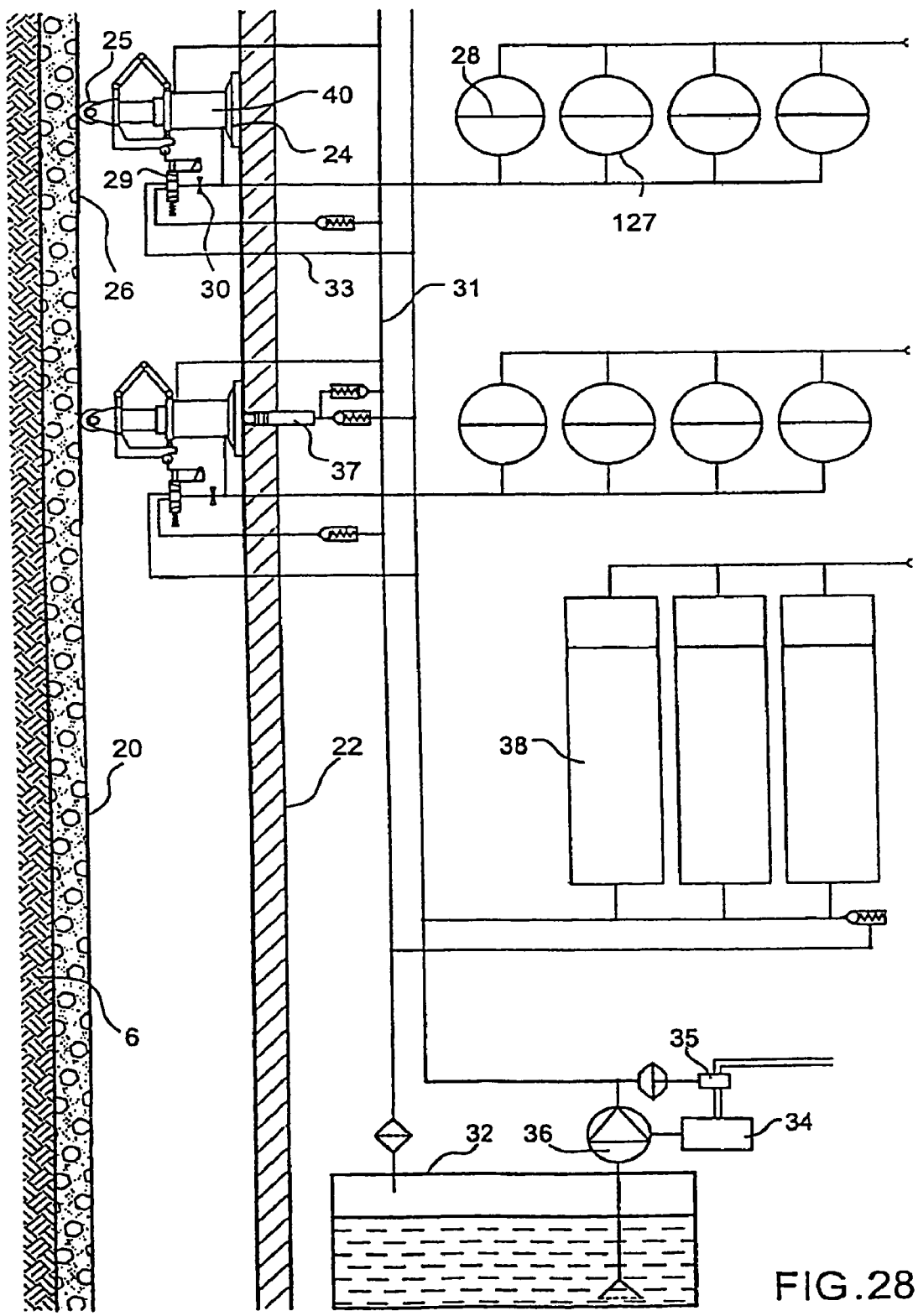

FIG. 28 represents another method and device for structure centering and wind load compensation. Between the wall of a basement 22 and the wall of the foundation 20 at the base 6 there are at each of two opposite sides at least two horizontal support elements 24 and at the other two remaining sides of a rectangular building at least one horizontal support element 24 at each side.

The horizontal support element 24 is depicted in a section view from above. The direction of rolling of the rolls 25 is horizontal and on the same level on the foundation wall 20. All other objects in the diagram are shown in a vertical section.

The horizontal support element 24 consists of a hydraulic cylinder 40 with fully extended piston shaft, which has a rolling gear mounted at its end with one or several rolls 25. Between each roll and a flat run way 26 affixed to the wall of the base there is a minimal gap if the basement is exactly centered within the base. The rolling direction of the rolls is horizontal.

To guarantee the same direction of the piston shaft with the rolling gear, the end of the piston shaft is connected with the cylinder 40 through a hinged linkage to prevent rotation.

When the wall of the foundation 20 moves towards the structure 22 the piston moves into the cylinder 40, pushed by the rolls 25 and the piston shaft, and displaces the contained fluid into one or several hydraulic accumulators 127, which could be of membrane-, bubble-, or piston-type reservoirs, and compresses on the other side of the membrane 28 a gas, air or nitrogen. Through that the hydraulic cylinder works as a spring support with gas springiness.

Is the piston shaft fully extended against the mechanical stop inside the cylinder 40, then a control valve 29, governed by the piston shaft, is in the open position. The gas pressure in the accumulators pushes the fluid through the throttle orifice 30 and through the open valve 29 into the drain to the reservoir 32. If the piston shaft is pushed into the cylinder by the foundation wall 20 approaching the building wall 22, then the control valve 29 opens and fluid moves from the pressure pipe 33 into the hydraulic accumulators 127 and consequently causes a pressure build up until the resulting force in the cylinder pushes the piston shaft forward again and brings the building back into its original position.

This process is effective when the building is subjected to wind forces and is pushed out of its middle position relative to the base, because of its easy movability.

Since wind forces don't change abruptly, but increase and decrease within a certain necessary time period, the process of inflow and outflow of fluid through the throttle orifice 30 is sufficiently fast to keep the control process at its required rate, ensuring that the building is kept in its original middle position.

When the base wall moves towards the building and away from it in rapid sequence, as it would be in the event of an earthquake, then, with the quick movement of the piston, and consequently the opening and closing of the valve 29 in quick succession, the in- and outflows of fluid through the throttle orifice 30 into and out of the air spring system are little. The gas spring force in the cylinder 40, which initially was in balance with any wind force, varies only little, because of its low spring rate and because of the alternating inflow and outflow through the throttle orifice 30 with the frequency of the earthquake and the movements of the piston and the control valve 29.

The system can be so designed, that these resulting acceleration forces remain so little, that they, in relation to the mass of the building, result in very little effective accelerations, as they change directions with the frequency of the earthquake.

The hydraulic system is centrally supplied from a reservoir 32 through a pump 36, which is driven by a motor 34 that is governed by a pressure control switch 35. The energy for the motor could be autonomously supplied through solar or wind energy. The hydraulic energy is buffered in an array of hydraulic pressure reservoirs 38, so that the necessary power of the pump 36 can be kept low. During an earthquake a lot of external energy is available that could be used for this system, in that the piston of the horizontal support device can be combined with a piston pump 37.

During the fast movement of the foundation base towards the building basement the piston pump 37 delivers fluid from the reservoir 32 to the pressure reservoir 38. This therefore supplies the mass flow of liquid which returns from the spring system, consisting of cylinder 40 and accumulators 127, through the throttle orifice 30 into the drain when the control valve 29 opens with the frequency of the earthquake during half of an oscillation.

Figure 29:
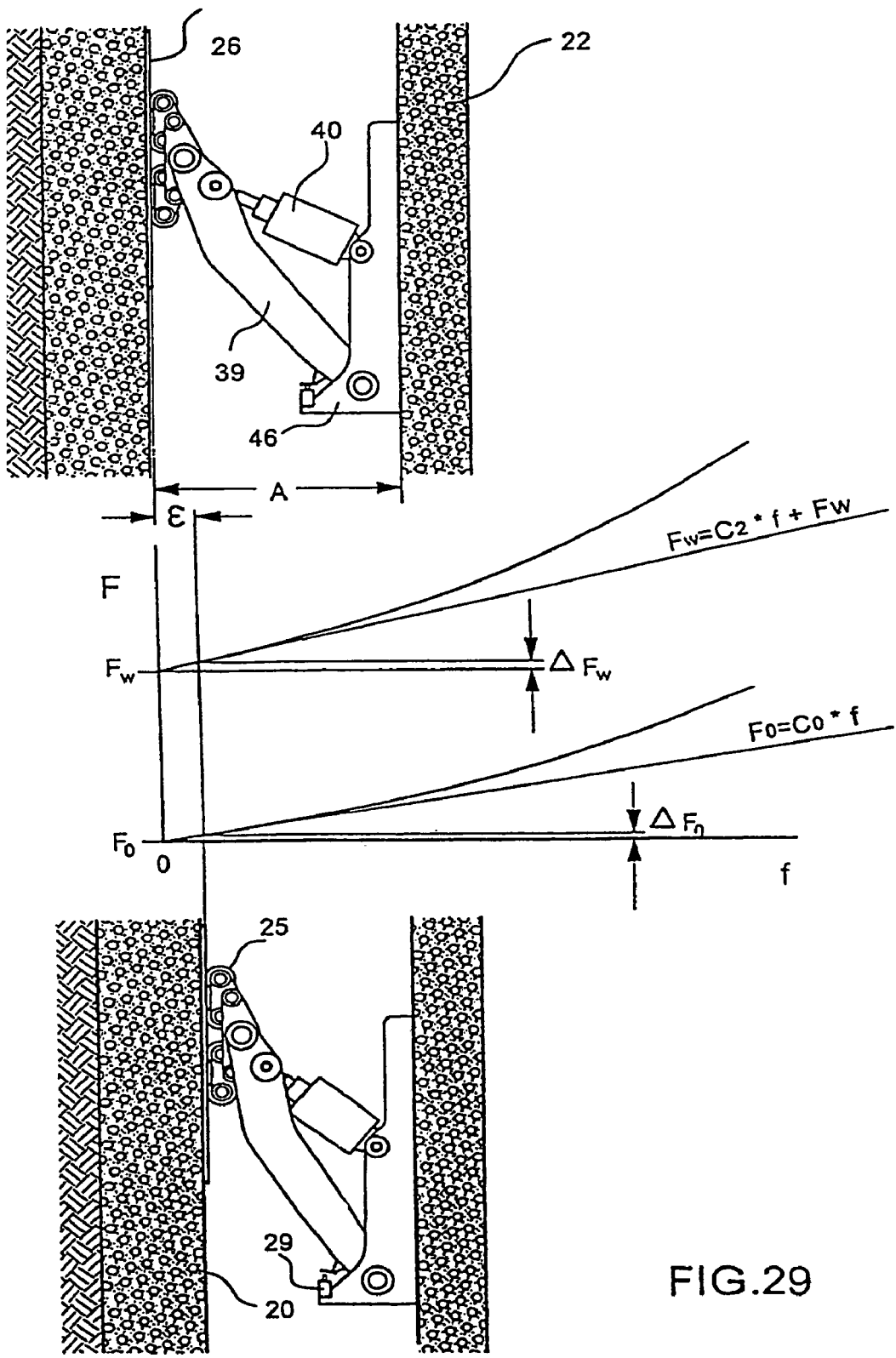

FIG. 29 shows a horizontal support through a swing lever 39. With such a configuration great displacements and distance changes towards the foundation wall are possible. The swing lever 39 is joined to a frame 46, which is fastened to the building, and supported by one or several cylinders 40 towards the building wall of the basement 22. At its end the swing lever 39 carries a rolling gear with one or several rolls 25, depending on the support load, which can move along a flat runway 26 mounted on the wall of the foundation 20. Instead of rolls, gliding pads could be used as well with suitable gliding materials. At the frame 46 there is a control valve 29, which is operated by the swing 39, that has the same function as the valve in FIG. 28. The hydraulic equipment is the same as in the example of FIG. 28.

For this solution also at least six devices are needed for a building in order to keep the zero position of the building with respect to its three axes, the two horizontal and one vertical axis. This horizontal support device allows large displacements of the building towards the base.

The spring system, consisting of a hydraulic cylinder 40 and connected hydraulic accumulators similar to the example of FIG. 28, has without external horizontal wind forces an initial spring rate according to the following equation $$F_o = C_o \cdot f \qquad (22)$$

whereas f is the distance travelled by the spring deflection. With greater spring movement the spring rate is not constant due to the polytropic gas compression. With a displacement of the foundation towards the supported structure by the value of $\epsilon$ the force $\Delta F_o$, caused by the systems springiness, impacts the building mass as an acceleration force. In the case of wind, the support force of the system automatically increases to balance the wind force, as described in the example of FIG. 28, without the building significantly moving from its original position. If during the restraint of a building against a wind force $F_w$ by the horizontal support devices simultaneously movement of the base occurs because of an earthquake, and therefore a displacement of the base towards the building with the value of $\epsilon$, then the force in the support spring system increases according to the equation $$F_w = C_2 \cdot f + F_w \qquad (23)$$

This function has a greater steepness than the one that originates from the zero point, since the relation of the displaced fluid volume to the gas volume changed with a higher spring force and higher gas compression. When the base wall 20 moves with a value of $\epsilon$ the horizontal support force increased by the value of $\Delta F_w$, and only this force difference $\Delta F_w$ impacts the mass of the building as an acceleration force and is not much greater than the force $\Delta F_o$ during calm.

Figure 30:
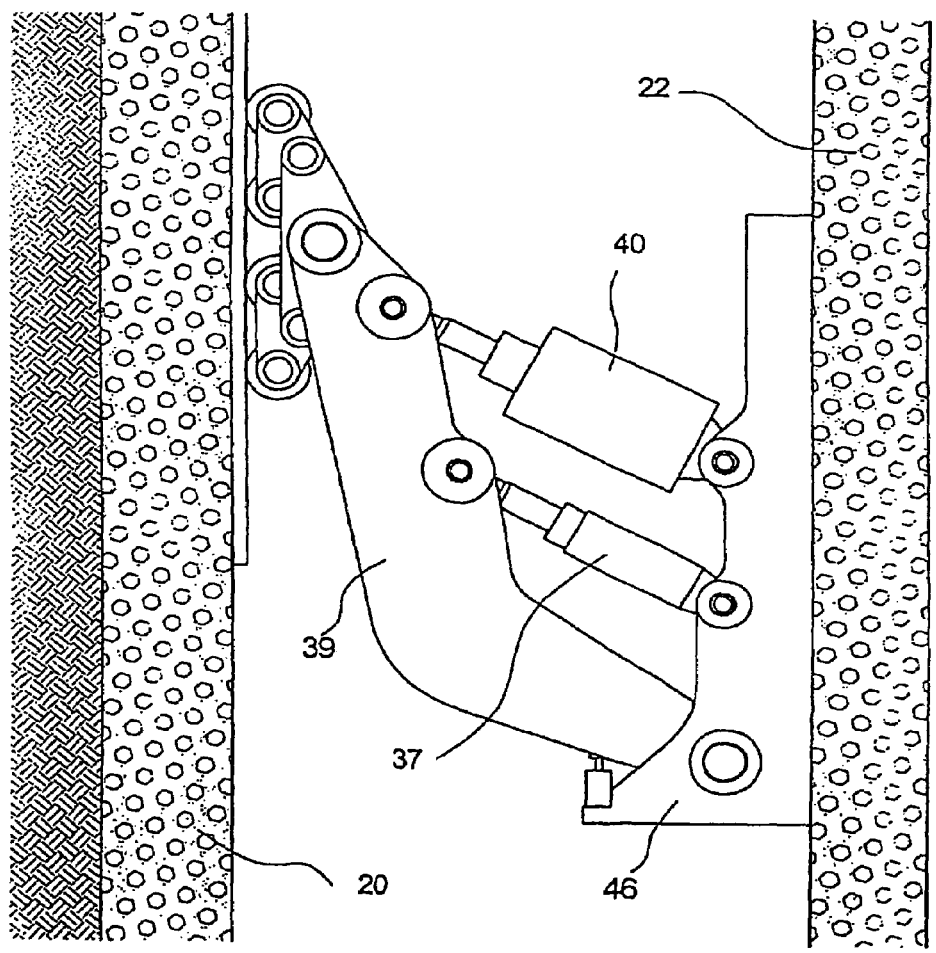

FIG. 30 represents fundamentally the same horizontal support system by means of a swing as described for FIG. 29. In addition, this device is furnished with a piston pump 37, positioned, as the cylinder 40, between the swing 39 and the frame 46. The piston pump 37 has the same function as the described device according to FIG. 28.

Figure 31:
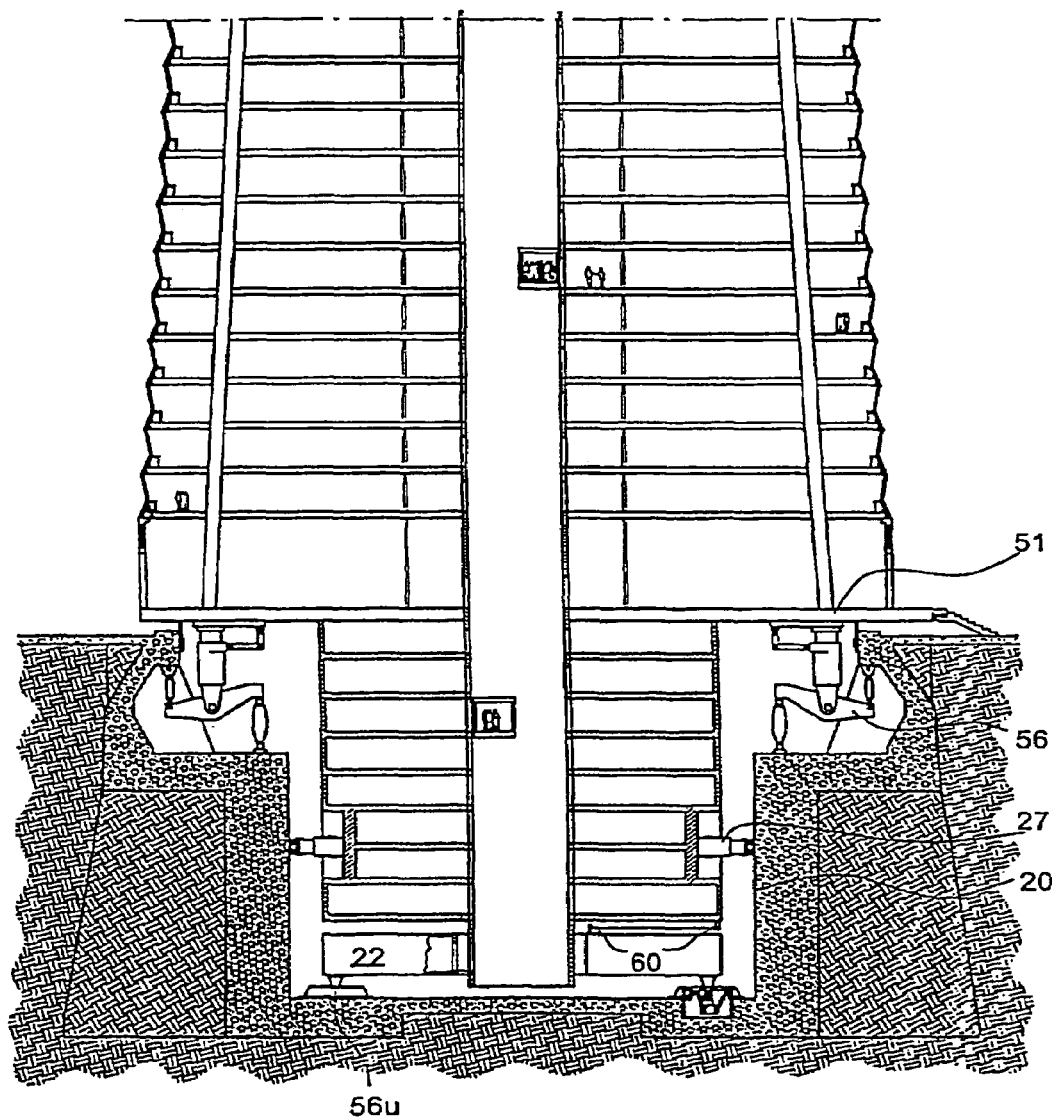

FIG. 31 shows the principle of a centering and wind force compensation system, where the main body of a building is supported by QuakeProtect Modules 56 beneath the ground floor, and a part of the building of one or several basement stories separate from the upper building is supported by its own QuakeProtect Modules 56u.

Since the building part 22 is self-centering, supported with little friction and does not experience any wind forces, it does not need a wind force compensation device. It is always centered, even when oscillating, and serves as a position reference for the centering of the upper building part. Through mechanical or contactless distance measurement along two axes and between two reference points 60 respectively, at the upper and the lower building parts, is the control value for the control of the wind force compensation device 27 determined.

4.6 Vertical Shock Isolation of the Supported Object

For buildings with a certain aspect ratio, for which tilting is not of concern, an optional feature can be incorporated to reduce or almost eliminate vertical accelerations. This would be very desirable for hospitals, industrial facilities with sensitive production processes, such as in the manufacturing of microchips, or for chemical and nuclear facilities.

A building supported by this technology would virtually stand still in space in case of an earthquake.

The building's inertia against accelerations form the horizontally oscillating base causes reaction shear forces within the building structure, which can exceed the shear building materials can sustain in an earthquake. Horizontal shear forces are the main cause for structural failure in an earthquake.

Vertical accelerations on the other hand can be sustained by a building without damages, since the design computations of the building's strength add to the dead and live loads a load multiple through a safety factor or the material strength degree. Consequently there result no structural dangers from vertical accelerations, unless vertical accelerations in excess of 1 g would tear the supported object off its foundation.

If indeed a vertical oscillation damping is deemed advantageous, QuakeProtect Modules can be fitted with additional vertical spring elements.

Figure 32:
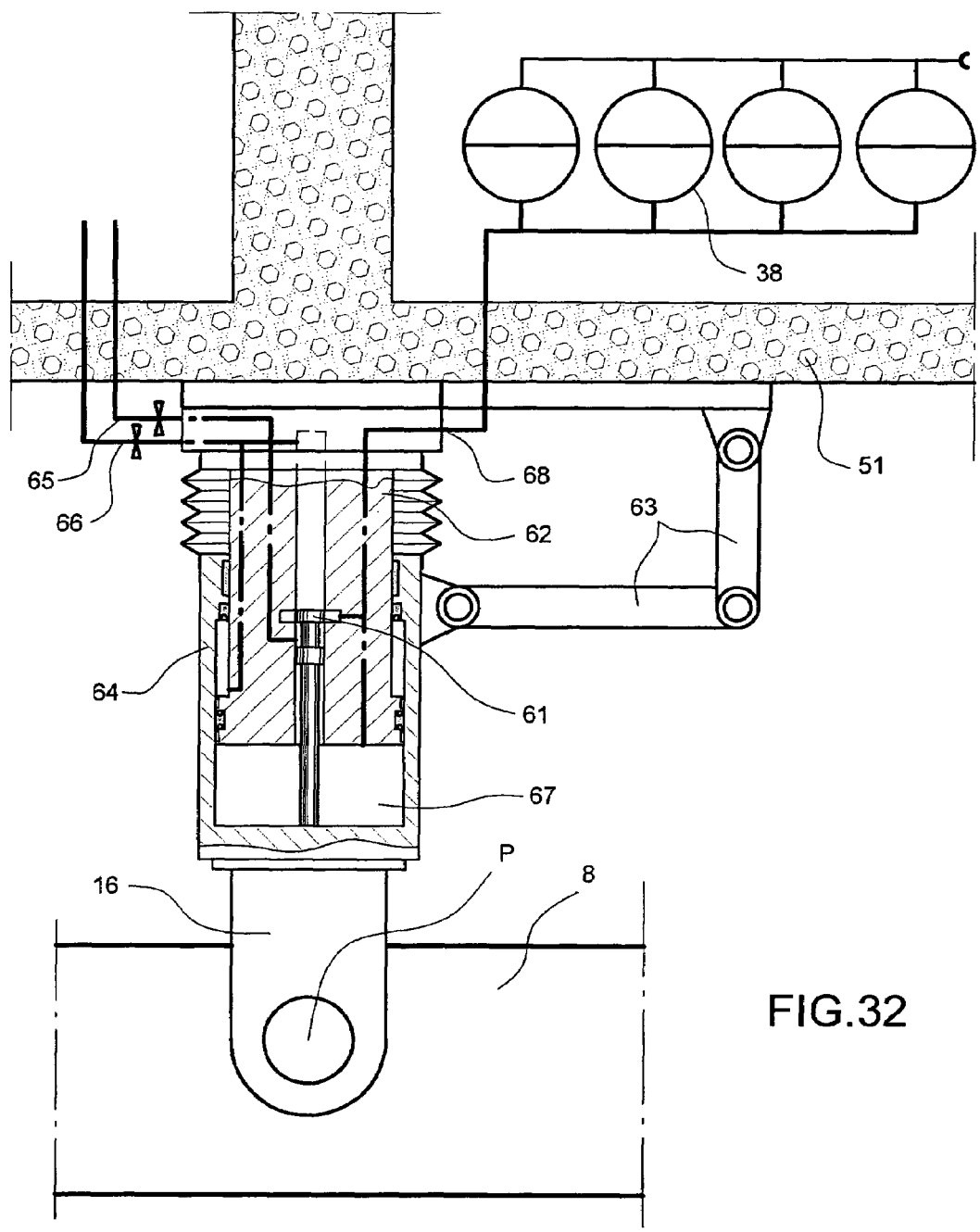

FIG. 32 shows schematically an example of a spring support of a building 51. The building support 16 is designed as a hydraulic cylinder 64 with an integrated level control valve 61 and supports the building load on top of the piston staff 62. The coupling element 8 is hinged to the bottom of the cylinder 64. The swing levers 63 are to prevent the turning of the vertically movable cylinder 64, to in turn to prevent the coupling element 8 from turning around its vertical axis.

The inflow of the fluid ocurrs through the fluid feed 65, the drain 66 relieves the fluid circulation of the spring support. The cylinder pressure space 67 is connected through the pipe 68 with one or several hydraulic pressure tanks 38. The volume of the hydraulic pressure tanks determines the hydropneumatic spring rate.

If through the stroke of the cylinder, caused by the vertical movement of the base, the volume of the displaced cylinder fluid is small relative to the volume in the hydro pressure tanks, then the pressure in the hydraulic pressure tanks rises only little.

The ratio of pressure increase to initial pressure represents the degree of acceleration in reference to 1 g, with which the supported mass experiences a vertical acceleration during vertical ground motion. Through the appropriate design any desired reduction of acceleration can be accomplished. Especially with visco elastic fluids a very low spring rate can be realized.

Figure 33:
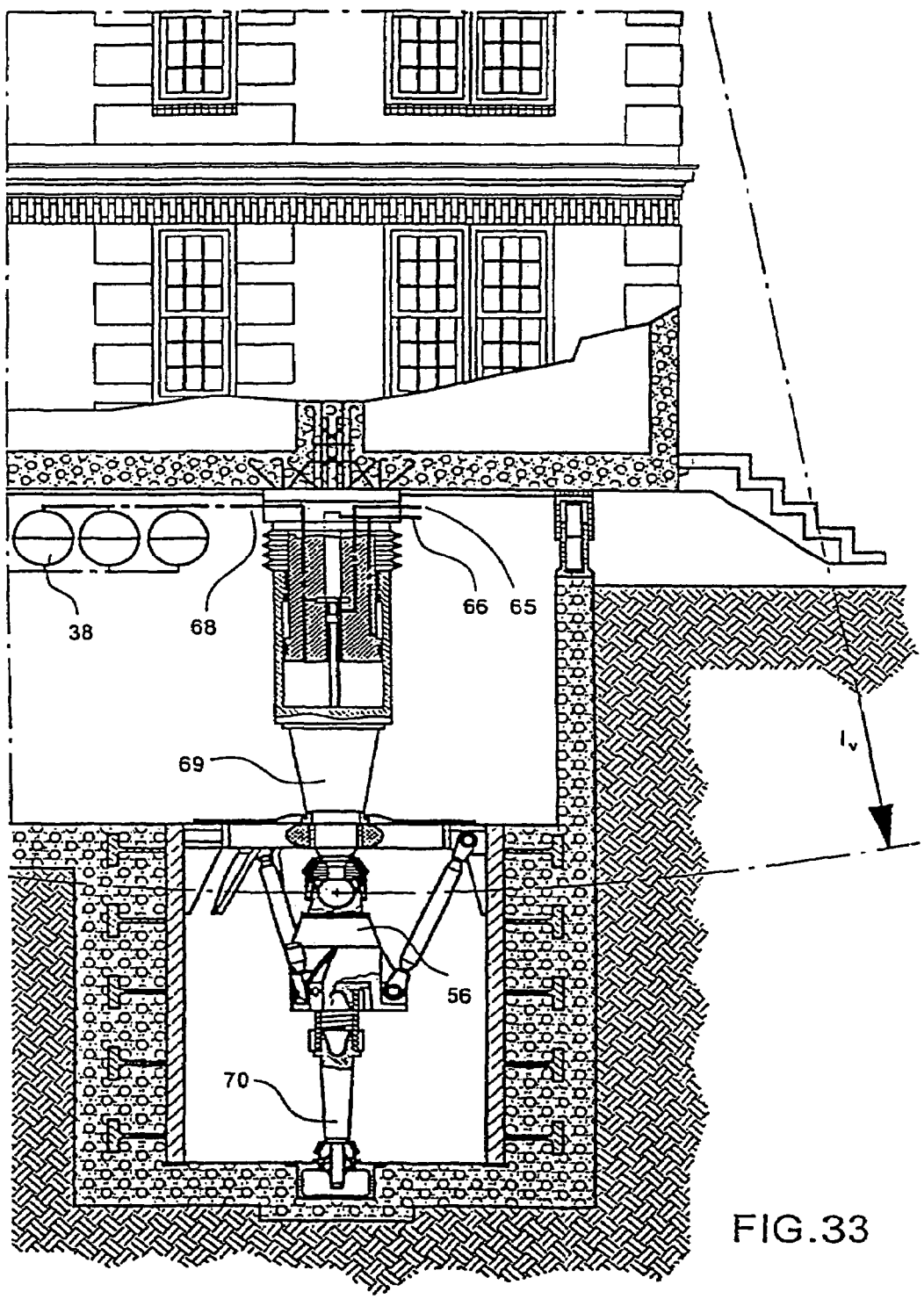

FIG. 33 shows a vertical spring system comparable to the example of FIG. 32, only that the spring support 69 is positioned on top of the QuakeProtect Module 56 as according to FIG. 21, into which is integrated a centering and wind resistance device 70 as shown in FIG. 25. The hydraulic connections 65, 66 and 68 are, as the example in FIG. 32, fluid feed and drain and connection to the hydraulic pressure tanks 38.

4.7 Earthquake Protection of Objects on Poles by Virtual Pendulums

Objects such as light installations or signs on top of poles or masts possibly can buckle or break off during strong horizontal ground vibrations, since amplification of movement and increase of acceleration through resonance can occur.

Figure 34A:
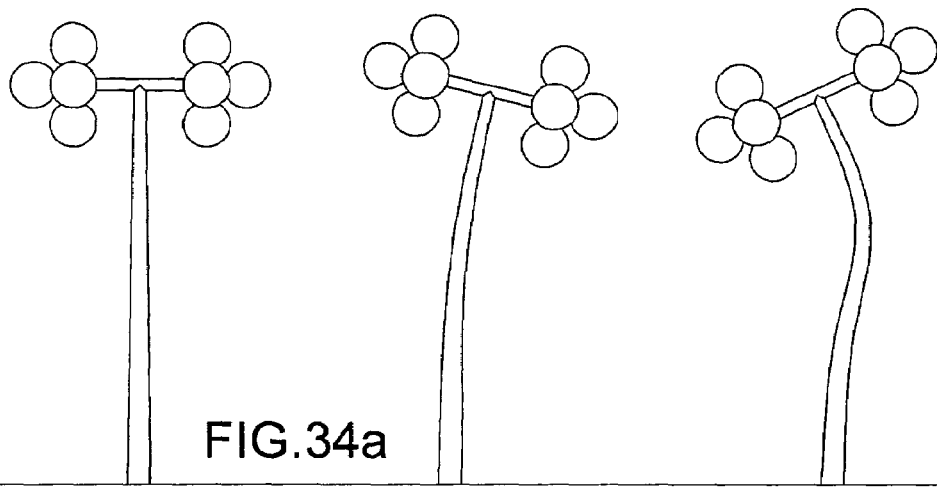
Figure 34B:
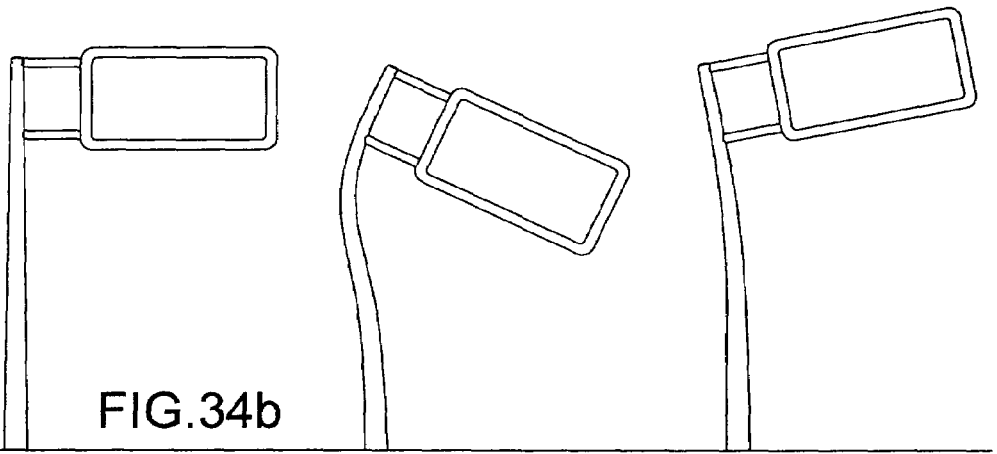
Figure 34C:
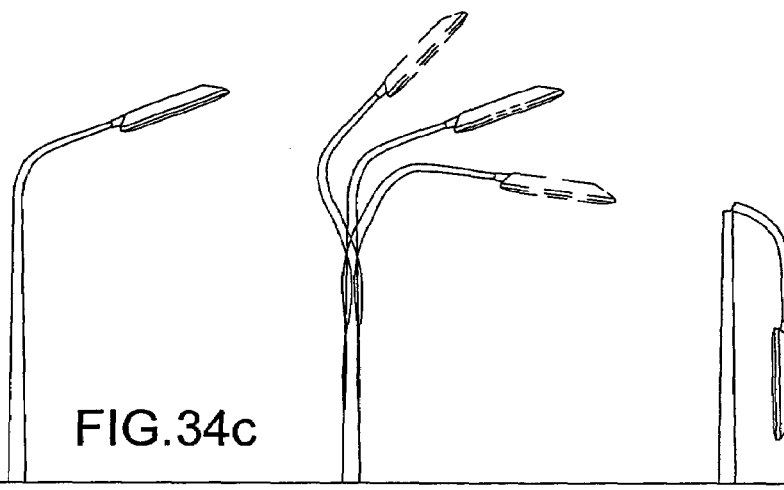

Although the base essentially remains parallel to its original position during horizontal and vertical oscillations, the upper part of a pole or a mast, which is the base for an object or a QuakeProtect Module, experiences an additional axis of movement because of the bending of the pole and a skewness of the elevated base through an inclination, such as FIG. 34 illustrates. The value of the mass supported by the tip of the pole greatly determines the oscillation characteristics of the pole. The bending moment from the mass reaction force through horizontal acceleration is lesser with poles without a top mass, and if only caused by the mass of the pole, then the bending and the inclination angle of the upper end of the pole are lesser.

Is between the top of the mast and the supported object a QuakeProtect Module positioned, the mast's top experiences only the mass forces of the module, which can be considerably lesser than the mass of the supported object. The bending angle of the mast end is decreased.

To prevent that the supported object be subjected to the additional change of inclination of the pole, since those oscillations around a tilting axis could endanger or disable the object, the QuakeProtect Module needs to compensate for or at least diminish this change of inclination.

Figure 35:
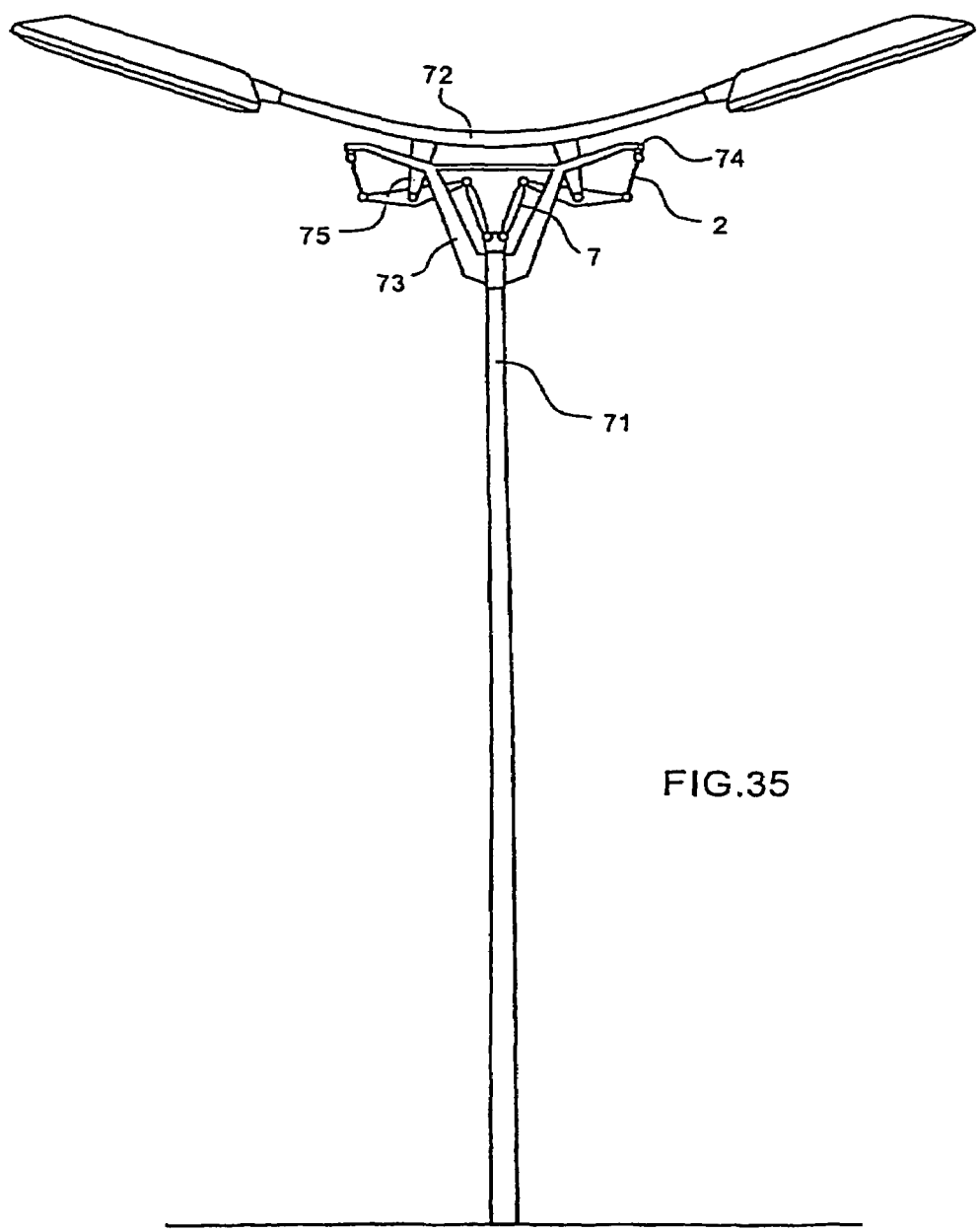

FIG. 35 shows the lateral view and a partial section of an QuakeProtect device at the top of the mast 71. The device supports the beam 72, which could support for example lighting installations.

Figure 35A:
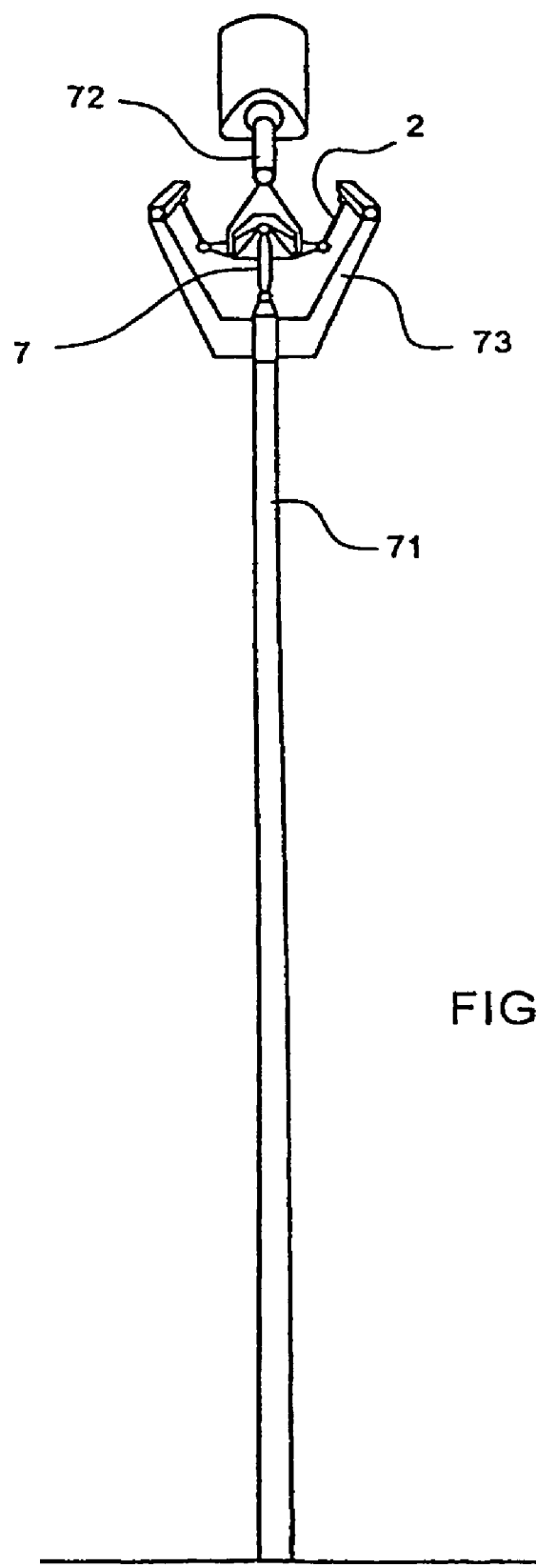

FIG. 35a is a cross section of FIG. 35 and

Figure 35B:
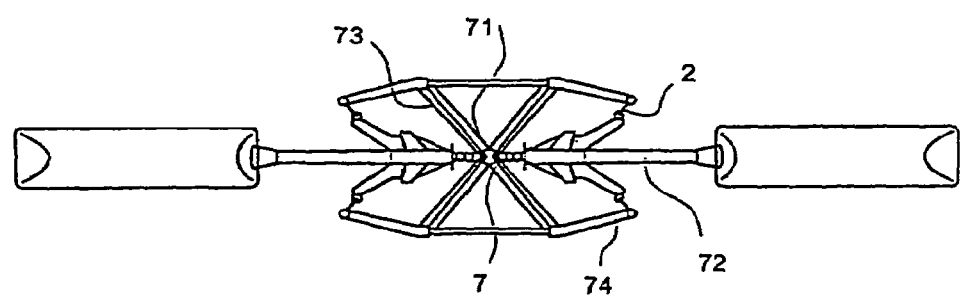

FIG. 35b shows the view from above.

The mast supports at its top four support beams 73, with two beams each supporting a bar 74. To each of the four ends of the bars 74 are hanging pendulums 2 bi-axially hinged. The beam 72 is hinged through two support beams 75 to two coupling elements 8. The coupling elements 8 hang bi-axially hinged from two hanging pendulums 2 and are bi-axially hinged to a third support point, the upper end of a standing pendulum 7, which at its lower end is bi-axially hinged to the top of the mast 71. The support elements pendulum 2 and pendulum 7 are positioned and inclined in space in such a way, that if the mast 71 experiences a bending inclination at its top, away from the vertical, the beam 72 remains about in its horizontal position. Because of the decoupling of the vibration of the beam 72 with its support loads from the mast vibrations incited by ground motion, the supported masses on its top don't impact the mast as mass reaction forces. The mast's dynamic loads are therefore reduced.

Figure 36:
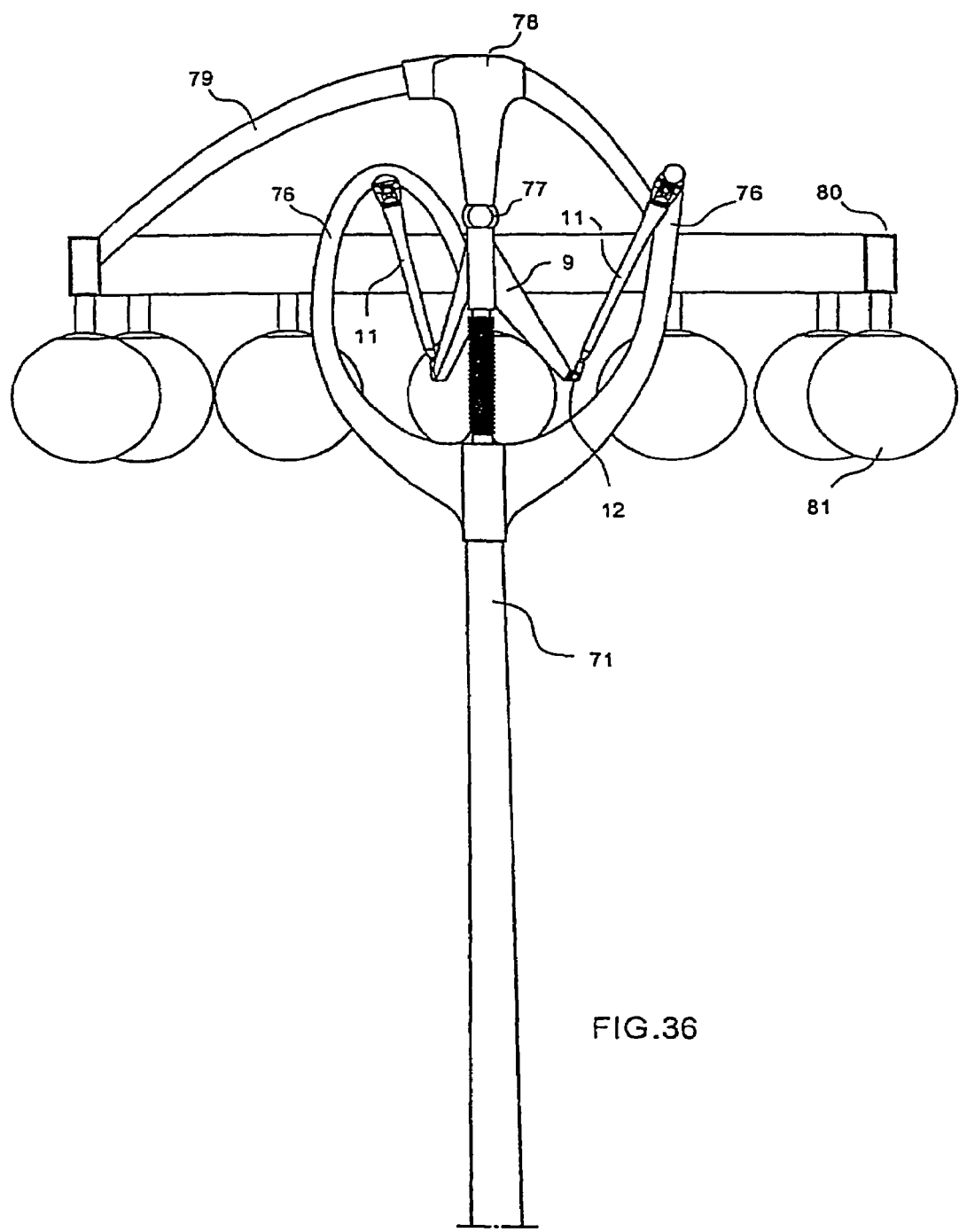
Figure 36B:
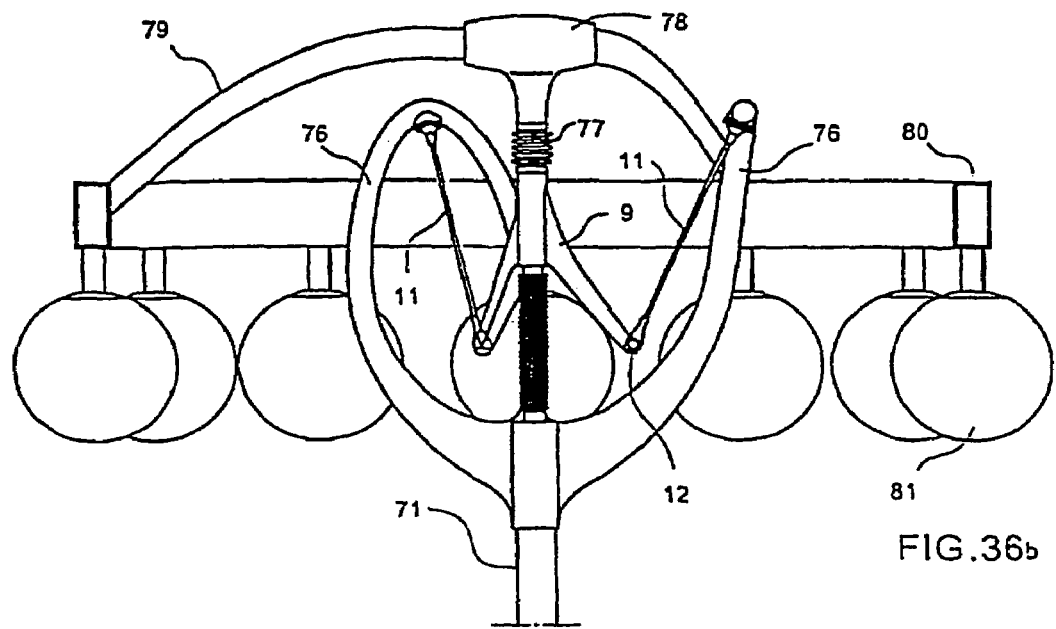

FIG. 36 shows the earthquake protection of a lighting installation on top of a pole 71, which employs a Virtual Pendulum according to the principle as depicted in FIG. 21. On top of the pole are three support elements 76 positioned, here in form of rings, where each at its vertex, bi-axially hinged, supports a support element 11, a hanging pendulum in an angled position in space. At their lower end 12 the three hanging pendulums 11 support a coupling element 9, bi-axially hinged, which in FIG. 36a appears as a three pointed star, when seen from above. The coupling element 9 supports at its top in an universal joint 77 a support element 78, that extends into three or more bars 79, which are connected by a ring 80, that in turn supports several lamps 81. The pendulums 11 can also be designed as ropes as shown in FIG. 36b. An elastic bellow tube allows for the electrical wiring to go through the connection between the mast 71 and the lamps 81.

Figure 37A:
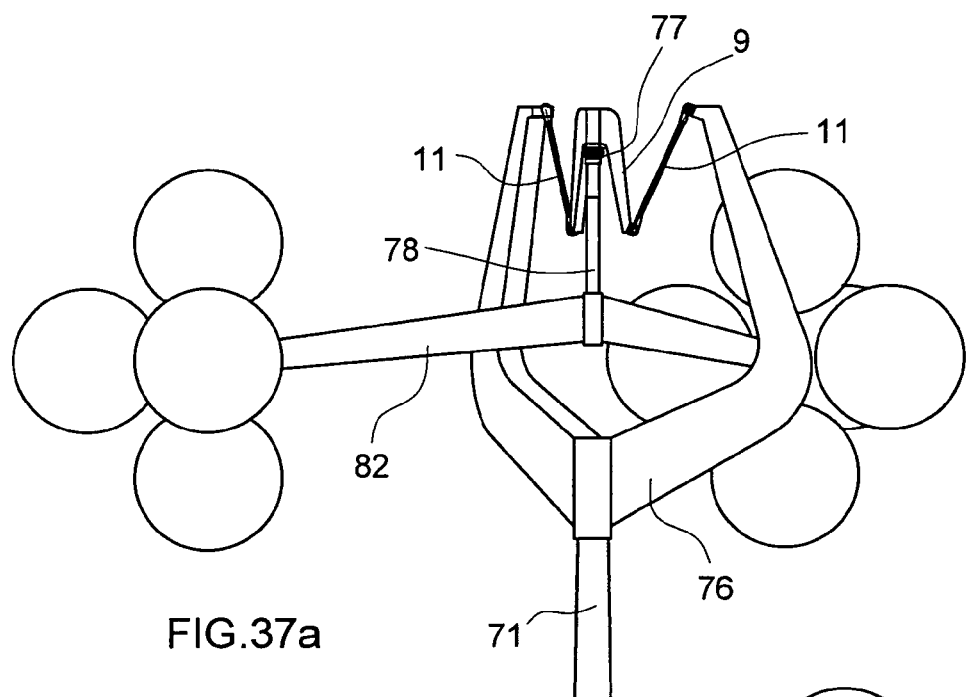
Figure 37B:
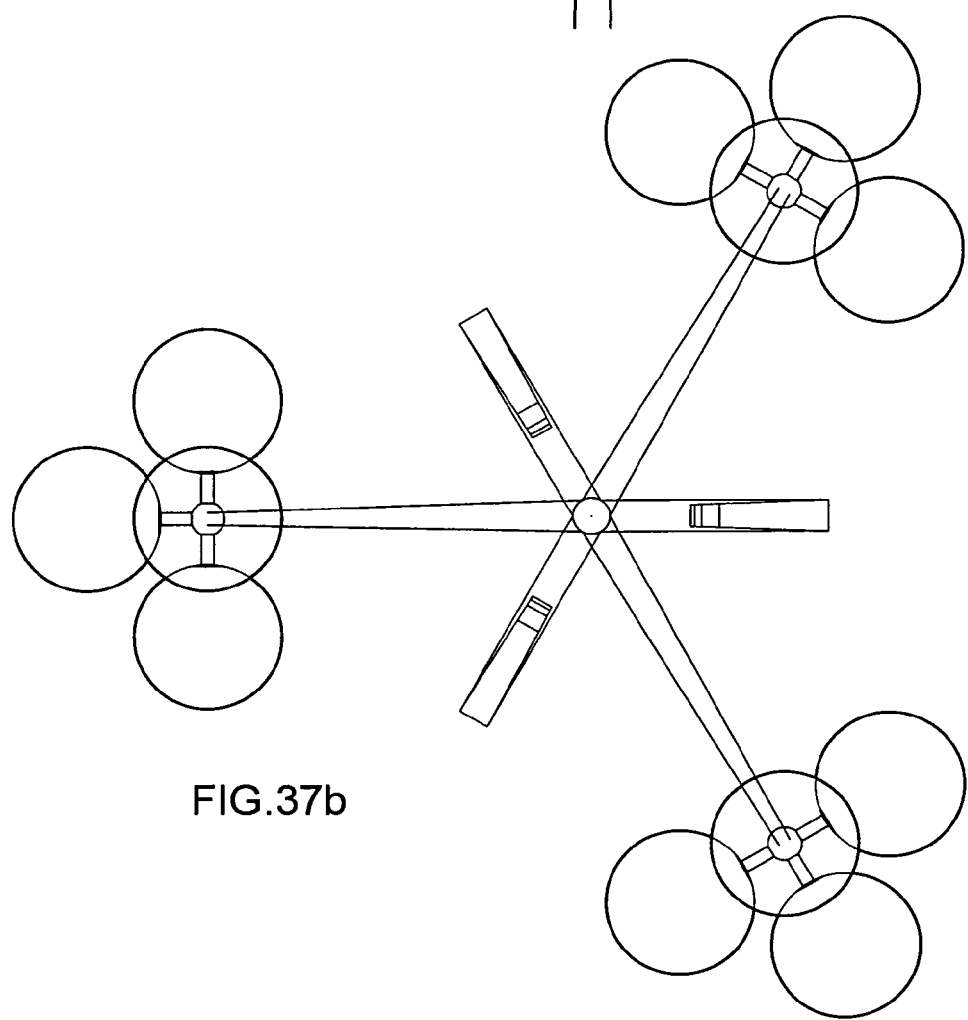

FIG. 37 shows a second example of the application of the Virtual Pendulum, according to the principle as depicted in FIG. 21, for the vibration isolation of a lamp support beam 82 from the vibrating pole 71, whose own oscillation is superimposed over the oscillation of the ground. The pole 71 at its top has attached three support arms 76. At each their ends are connected three hanging pendulums, either as bi-axially hinged rigid bars 11 or as ropes. At their lower end the hanging pendulums support, bi-axially hinged, a three legged coupling element 9, that hold in an universal joint 77 a hanging support element 78, which is rigidly connected to three lamp support beams 82.

Figure 38A:
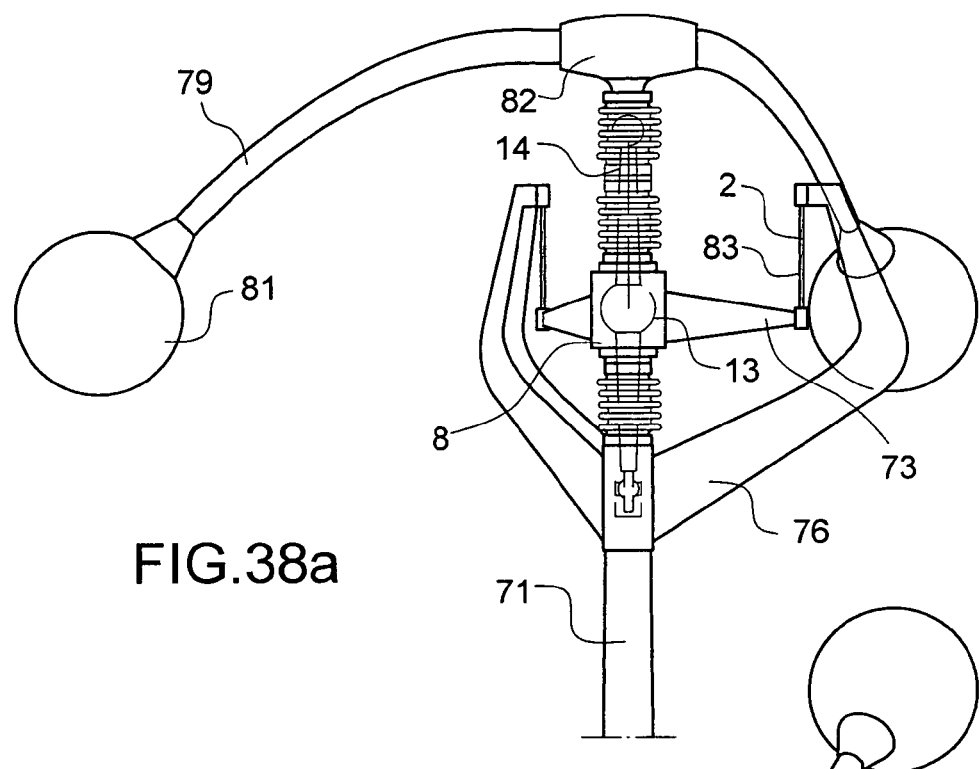
Figure 38B:
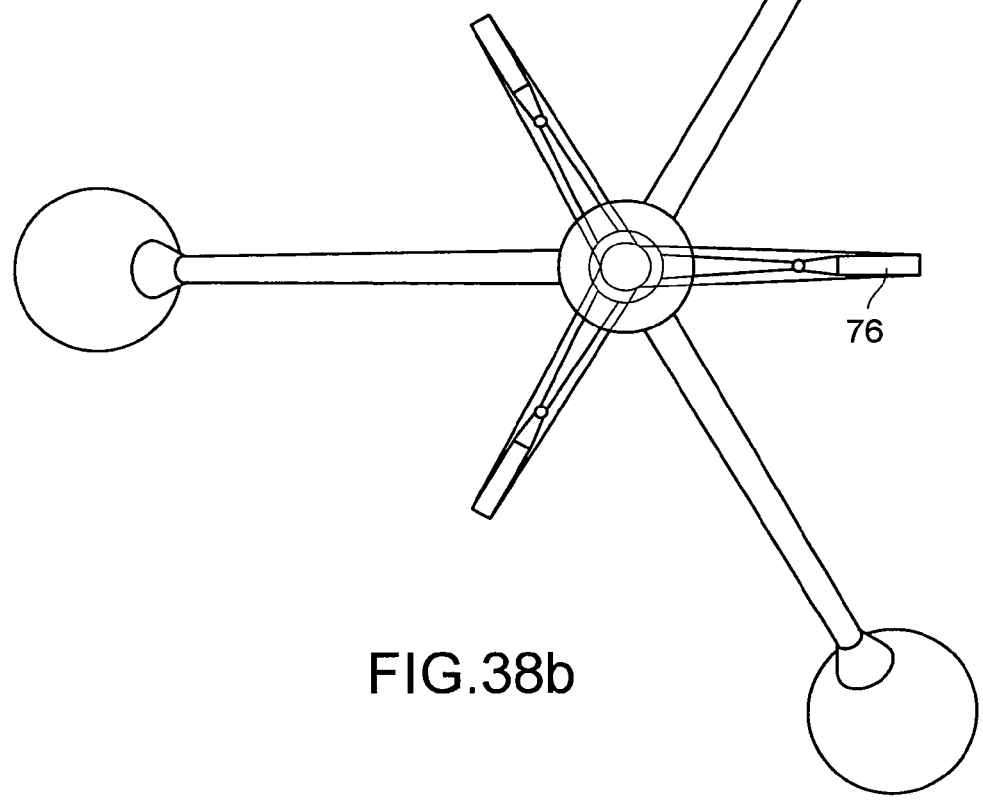

FIG. 38 This example of an oscillation decoupled bearing of a group of lamps on top of a pole utilized the Virtual Pendulum based on the principle as depicted in FIG. 23. At the top of the pole 71 there are three or more support arms 76, each at its upper end connected to a hanging pendulum, either as a rope 83 or a rod 2 with universal joints at either side, supporting at their lower end a coupling element 8 with support rods 73, corresponding to the number of pendulums. In the center 13 of the coupling element 8 is the vertical support bar 14 supported in a universal joint. The lower end of the support bar 14 is axially movable and radially and bi-axially supported at the top of pole 71. On the top of the vertical support bar 14 a universal joint supports a lamp support element 82, which with several support rods 79 serves as a support for the lamps 81.

Figure 39A:
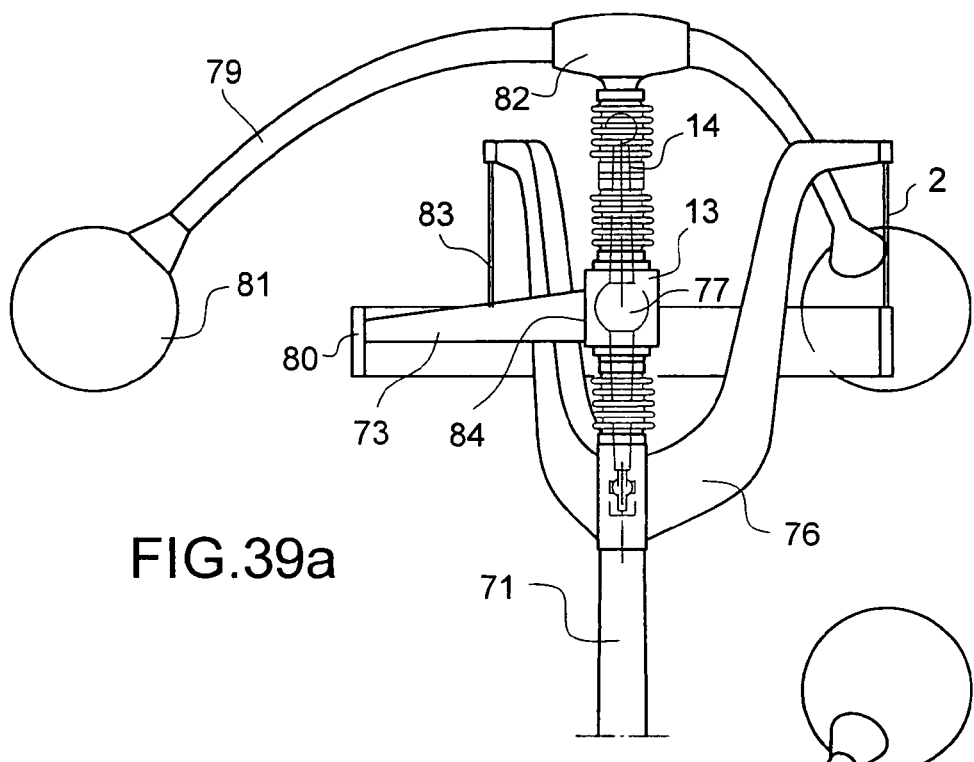
Figure 39B:
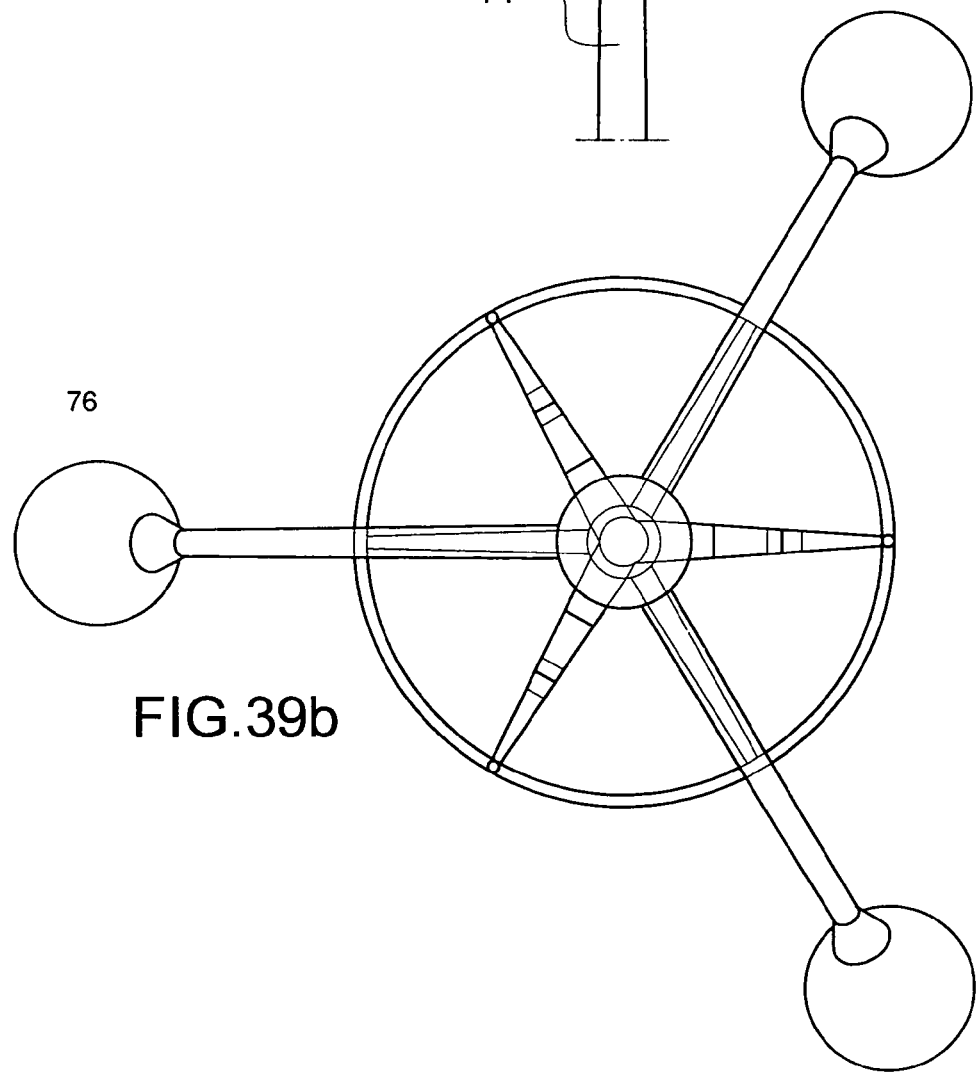

FIG. 39 shows a variation of the application of the same principle as in the example of FIG. 38, whereas here the support arms 76 are positioned within the configuration of the hanging pendulums. The hanging pendulums, on both sides bi-axially movable, either as ropes 83 or as rigid rods 2 with bi-axial bearings, support a ring 80, which through spokes 73 holds a hub 84 in its center. The hub 84 supports through an universal joint 77 the vertical support element 14. Otherwise the design corresponds to the example in FIG. 38.

4.8 Earthquake Protection of Hanging Objects by Virtual Pendulums

Hanging objects from ceiling, for example lamps or presentation and indicator signs, also beging to swing when buildings oscillate. The hanging objects themselves represent pendulums, which with the usual dimensions can begin to resonate. The oscillation amplitudes can become great and the objects can hit the ceiling and therefore be damaged or destroyed and sometimes tear off. The danger exists that hanging electrical objects can create fires because of short circuits. And if heavy hanging objects, such as heavy chandeliers in halls and auditoriums etc., tear off they can endanger also people.

To make hanging objects safe it is possible to suspend them from Virtual Pendulums.

Figure 40:
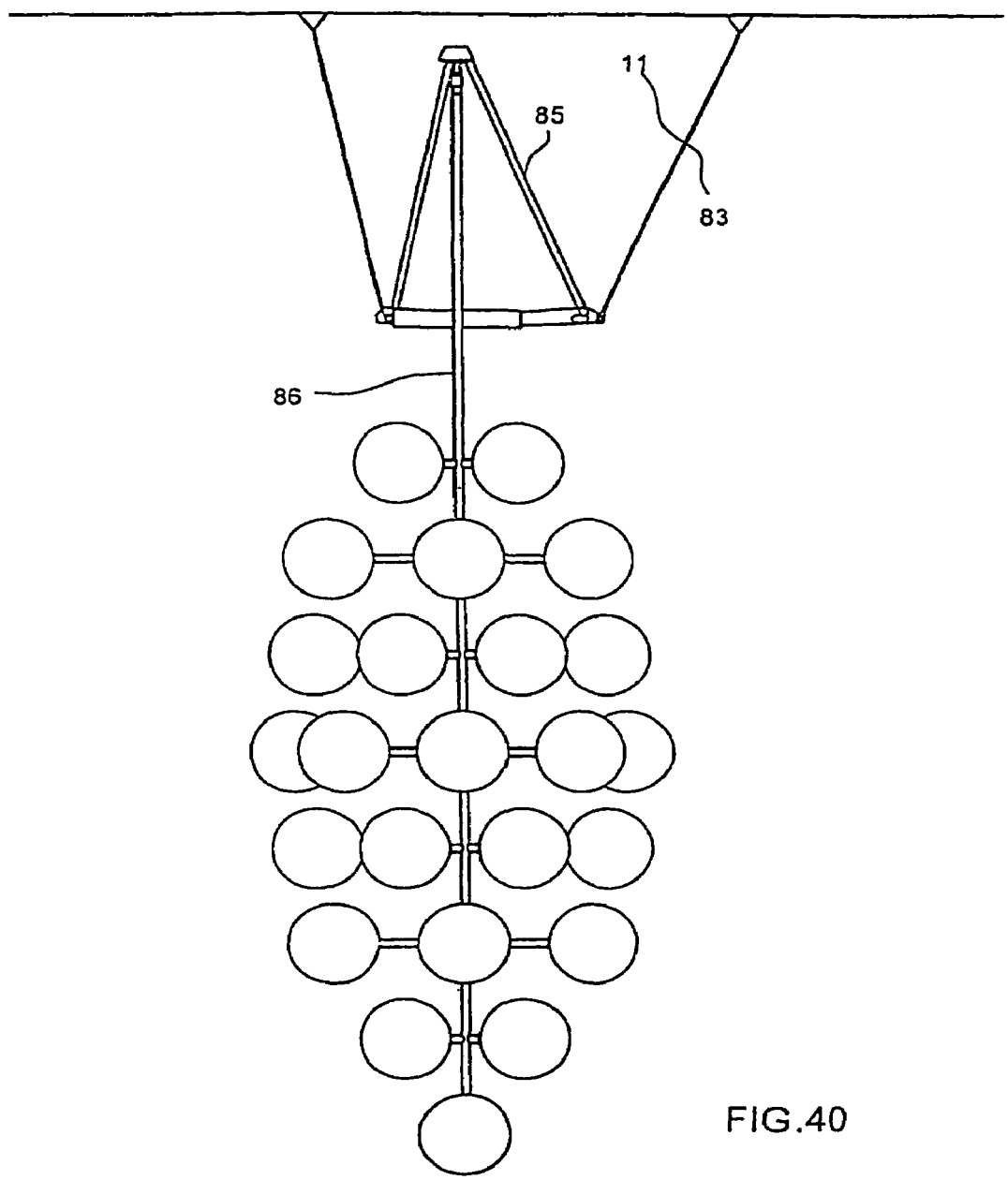

FIG. 40 shows the suspension of a lighting installation from a Virtual Pendulum according to the principle as depicted in FIG. 21. Three cables are attached to the ceiling in the corner points of a equal sided triangle, pointing down equally angled to their common center. The lower ends are attached to the corner points of the equal sided bottom triangle of a pyramid 85. In the tip of the pyramid is bi-axially hinged a rod 86 simply by two chained rings, serving as the support of lamps.

Figure 41:
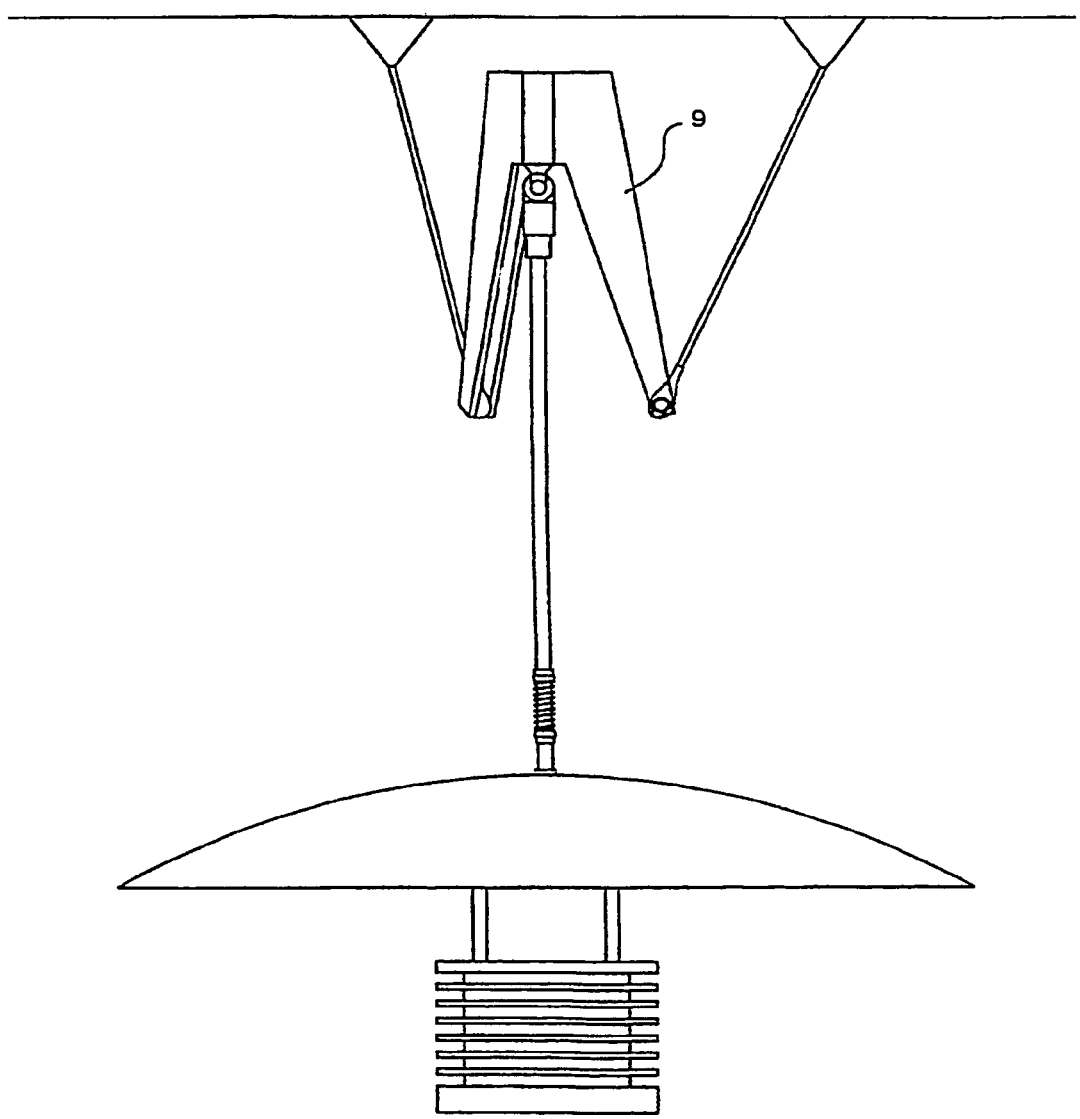

FIG. 41 shows a lamp, hanging from a Virtual Pendulum of great length, comparable to the example according to FIG. 40. Here the coupling element 9 consists of three support arms 76, which represent the edges of a three sided pyramid.

Figure 11:
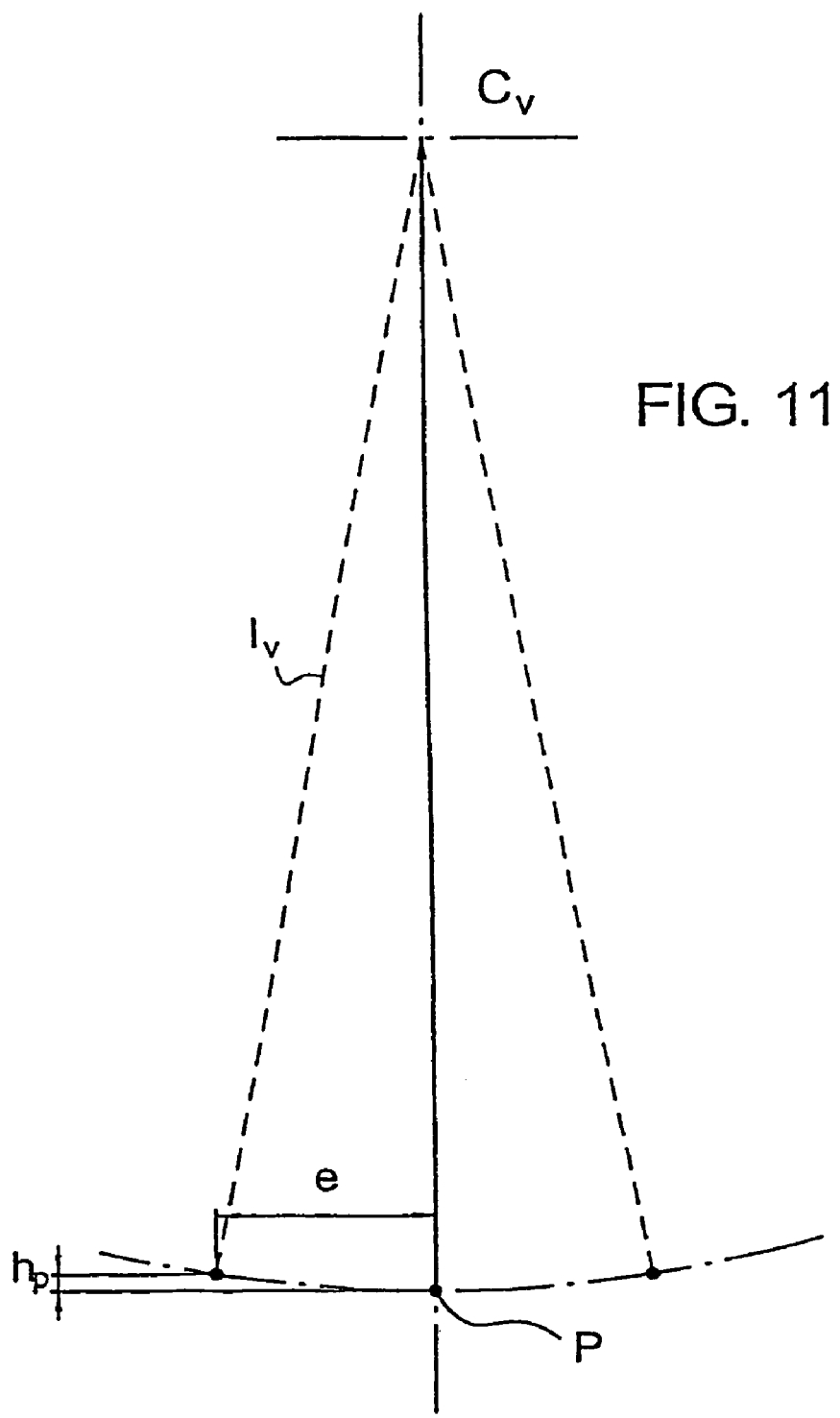
Figure 42A:
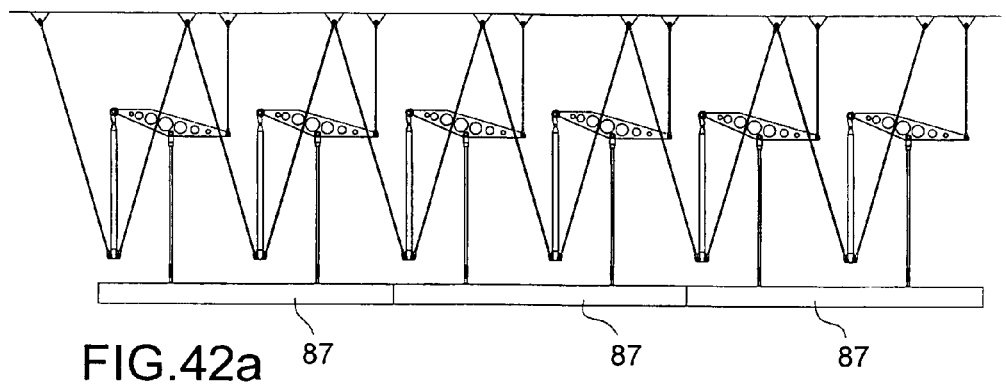
Figure 42B:
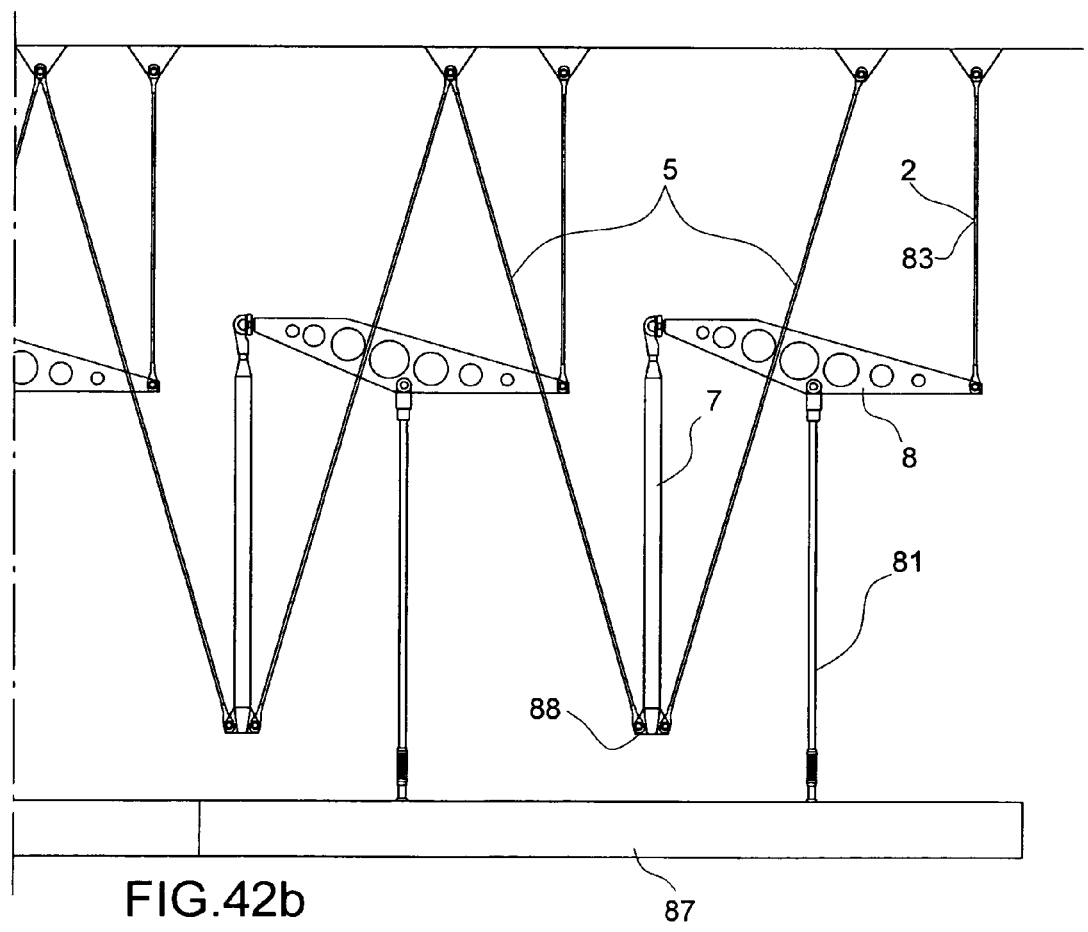

FIG. 42 The lights 87 are suspended in a row, each from two Virtual Pendulums according to the depiction of FIG. 11. The stable, hanging pendulum, as a bi-axial rod 2, or a rope or chain 83, is connected to the ceiling. At its lower end it supports one end of the coupling element 8, bi-axially movable. A support structure 5, consisting of four elements, either rods, ropes or chains, is bi-axially movably connected to the ceiling, whereas the four support elements 5 are the edges of an upside down pyramid. In its tip they form the support point 88 for the lower, bi-axial bearing point of the unstable, standing pendulum 7, which at its upper end is bi-axially hinged to the other end of the coupling element 8. Hinged to it in one axis, the support rod 89 hangs from the coupling element 8, and holds the light 87 with a vertical springiness.

4.9 Oscillation Reduction through Virtual Pendulums

High rises, slender towers, high masts and chimneys are incited by earthquakes and strong winds to lateral oscillations, which can have critical effects. To reduce alternating bending loads caused by deformations and prevent fatigue of the material, very effective oscillation reducers can be utilized, to reduce amplitudes. For that purpose additional masses are positioned on top of the structure, or for slender chimneys or masts strapped down by wires at those positions where the greatest amplitudes occur. They are able to oscillate and are connected to the structure through spring support elements and dampers, or they are moved by active systems, counteracting the movement of the structure through the reaction forces of the moved mass of the oscillation reducers. For the support of such masses Virtual Pendulums find a most advantageous application. Needing only little space, Virtual Pendulums can easily be designed for any desired natural frequency of the supported reducer mass by the free choice of the relations of the dimensioning parameters. For active oscillation reduction systems the application of Virtual Pendulums is very advantageous, because of the very little friction of the bearing support of the mass and because of the freely choosable natural period of the system.

Figure 43A:
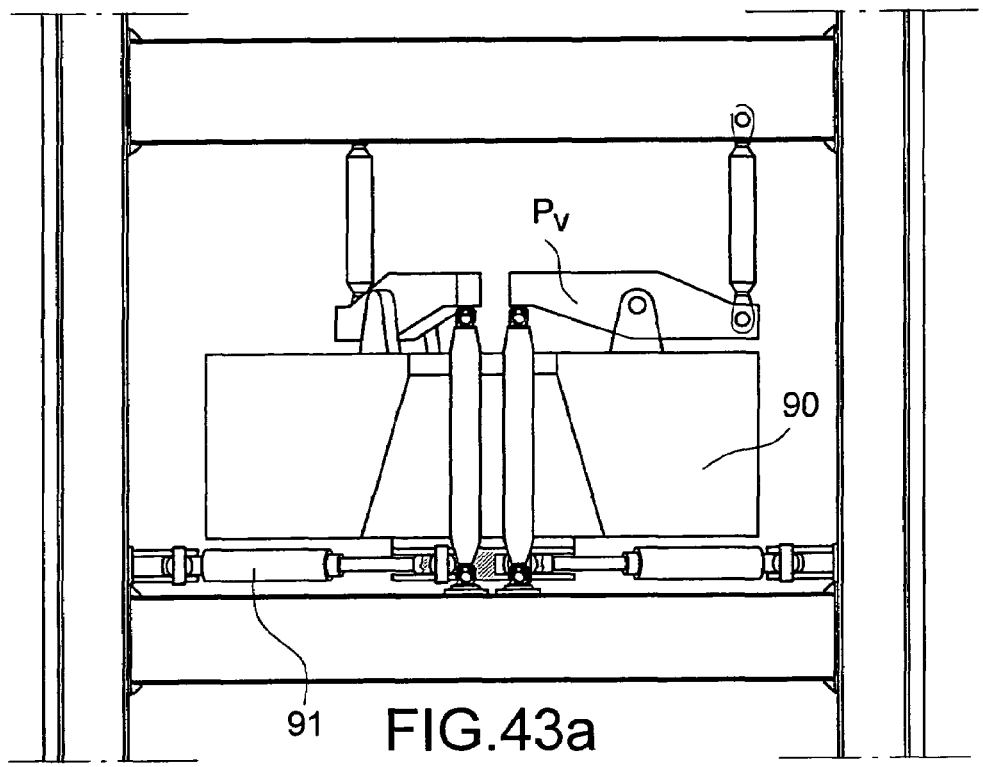
Figure 43B:
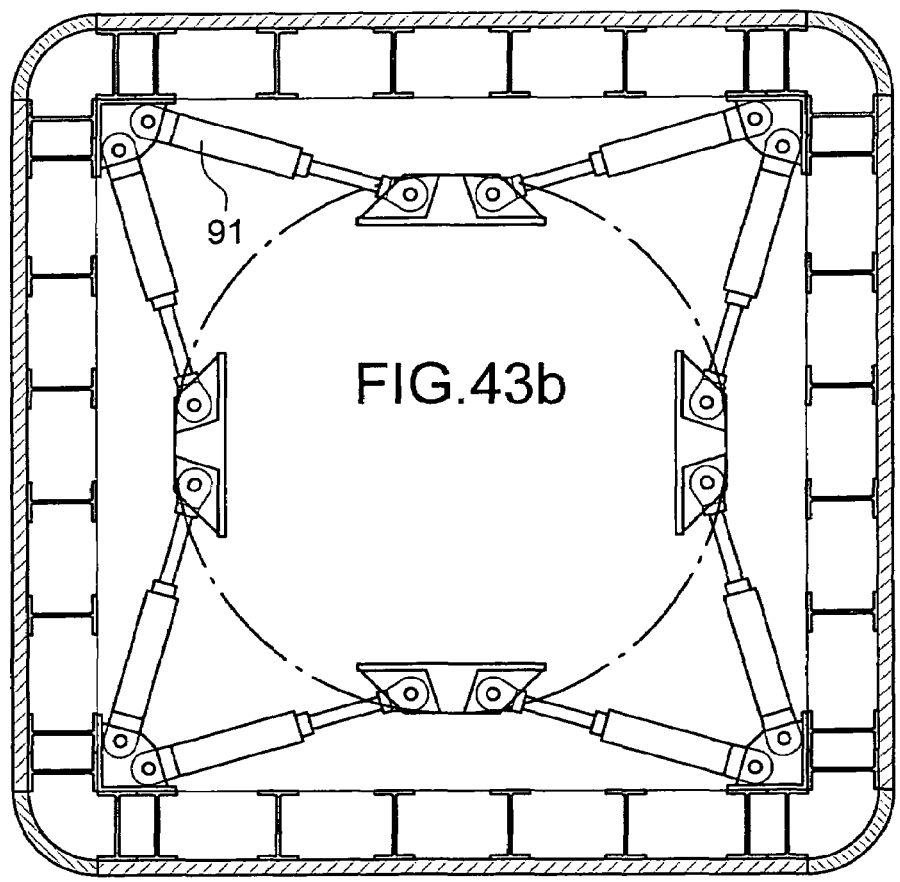

FIG. 43 depicts a passive oscillation reducer in a tower. Three Virtual Pendulums $P_v$, according to the principle shown in FIG. 11, support the reducer mass 90. Spring dampers 91 support the mass horizontally against the mass of the building.

Figure 9:
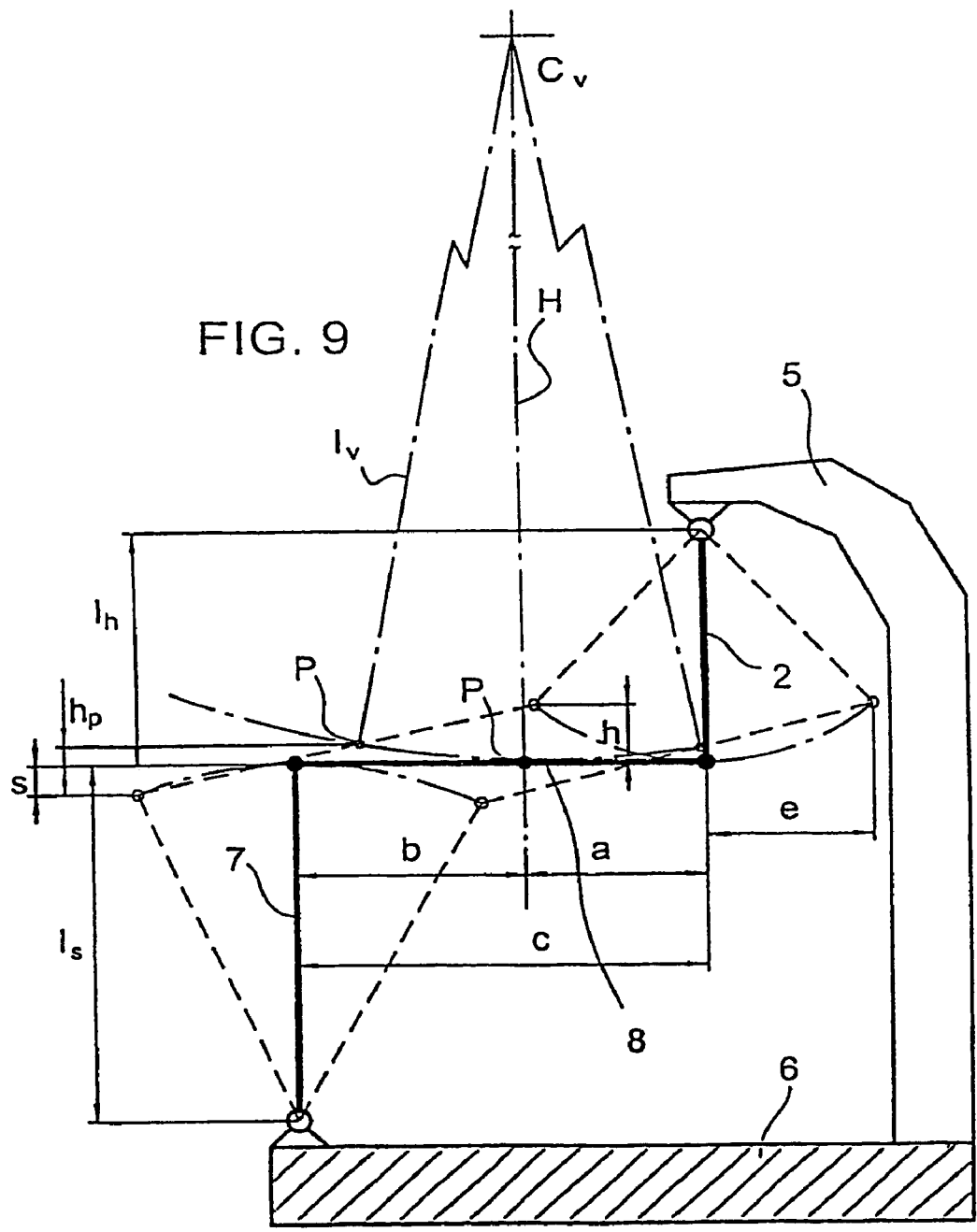
Figure 44:
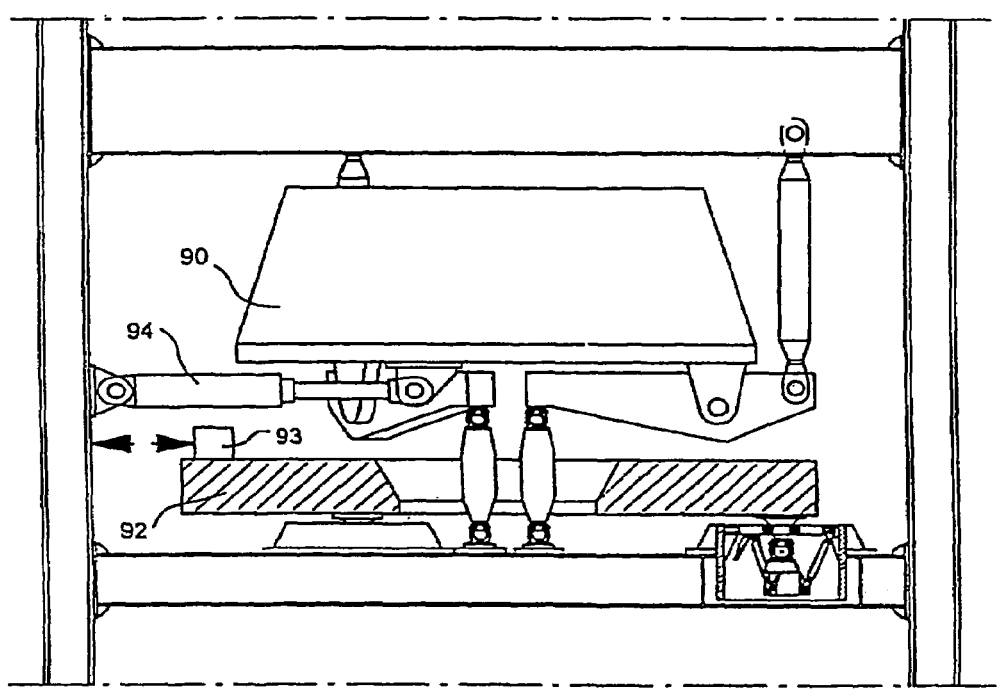

FIG. 44 The depicted active oscillation reduction system consists of the reducer mass 90, which is supported by three Virtual Pendulums according to the principle shown in FIG. 11, and the reference mass 92, which is supported by three Virtual Pendulums according to the principle shown in FIG. 9. These Virtual Pendulums for the reference mass 92 are designed for very little friction, a very small hysteresis and a very long natural period. Sensors 93 for determination of the position of the reference mass 92, which is decoupled from all horizontal movements of the structure, in reference to the position of the structure, provide through a controller the input control parameters for the movement of the reducer mass 90 through the actuators 94.

Figure 13:
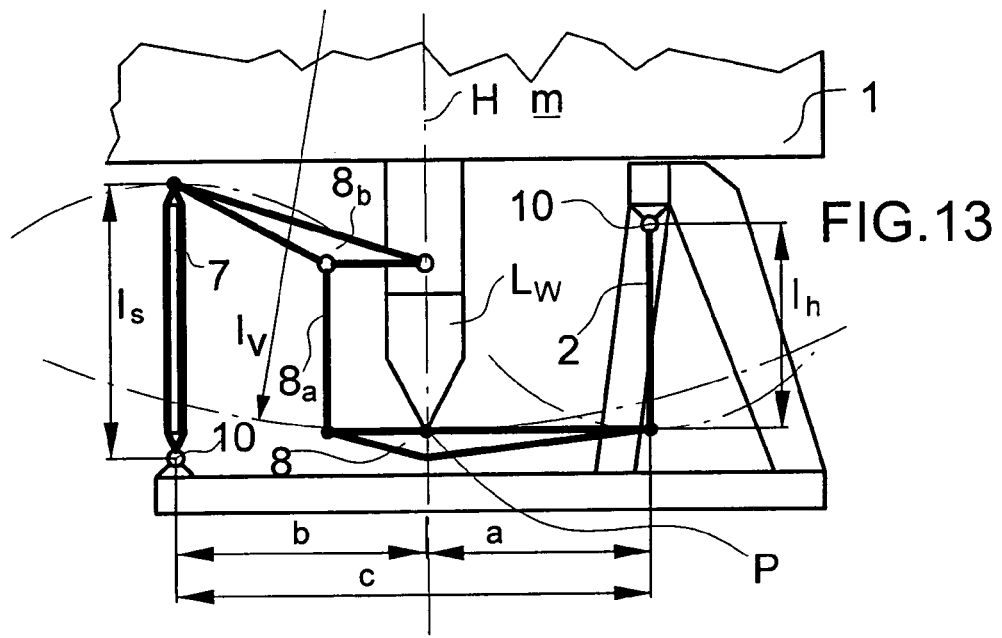
Figure 45:
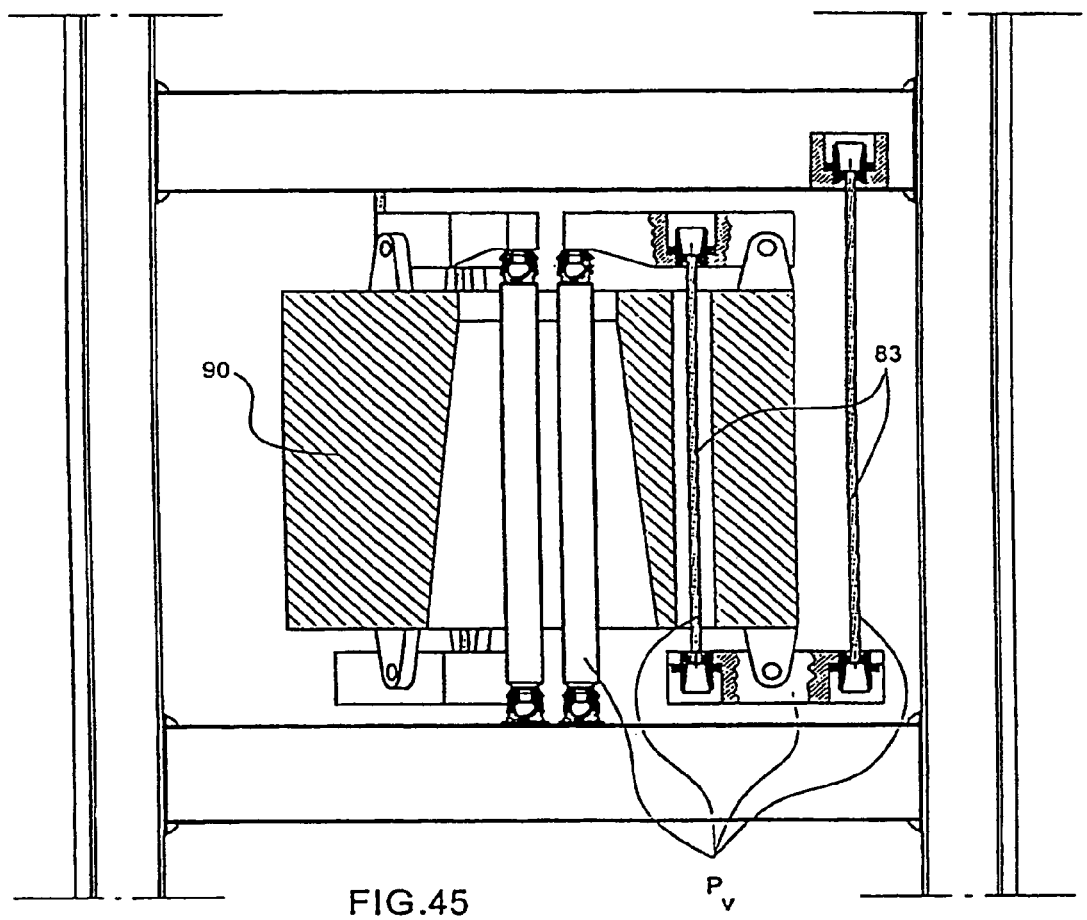

FIG. 45 shows an oscillation reduction system with the support of the reducer mass 90 through three Virtual Pendulums $P_v$ according to the principle as shown in FIG. 13, as it could be used for an active or passive system. The tension load support elements in this example can be designed as ropes 83.

Figure 46:
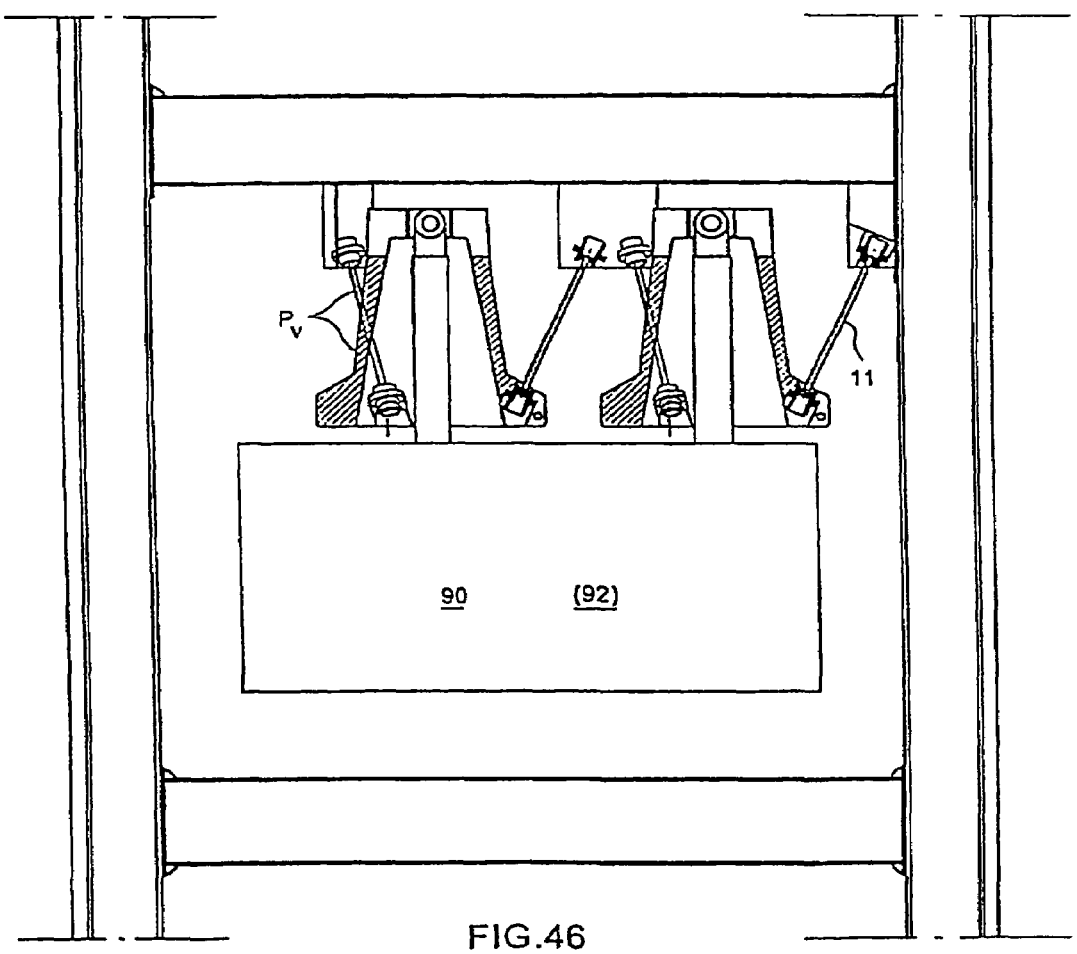

FIG. 46 shows the support of the reducer mass 90 or the reference mass 92 for an active system by three Virtual Pendulums $P_v$ according to the principle as shown in FIG. 21. The stable, hanging pendulums 11 in this example are designed as ropes.

Figure 47:
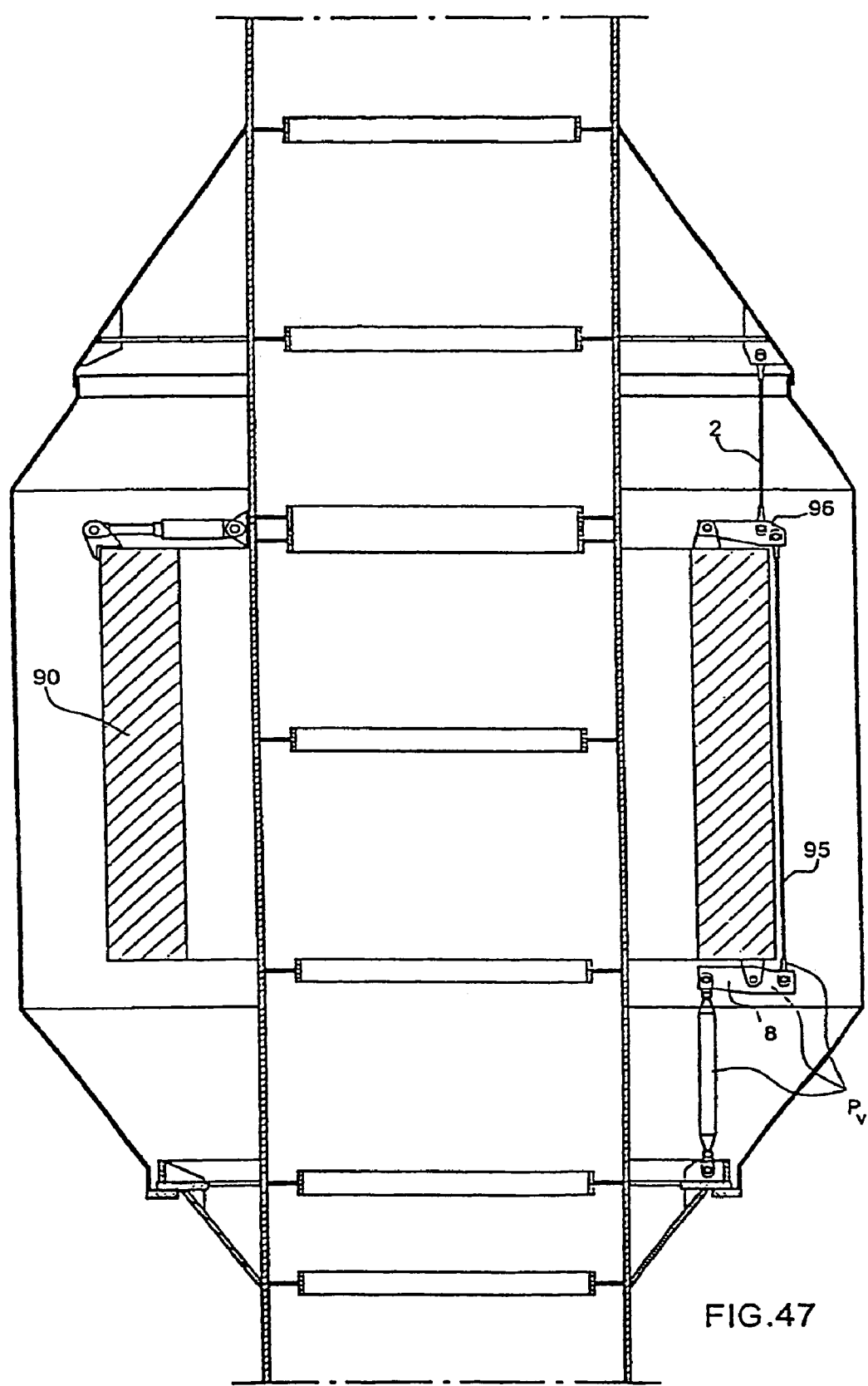

FIG. 47 For an oscillation reduction system for tubing masts, the reducer mass 90 is designed as a ring around the mast and is supported by three Virtual Pendulums $P_v$ according to the principle as shown in FIG. 11. The stable, hanging pendulum 2 is not directly connected to the coupling element 8, but through an extension 95, which does not work as a pendulum, and an intermediary lever 96 is shifted onto a higher level. Through this less radial space is needed and wind resistance is reduced. The paneling 97 prevents the superimposing of wind forces onto the function of the oscillation reducer.

Figure 48A:
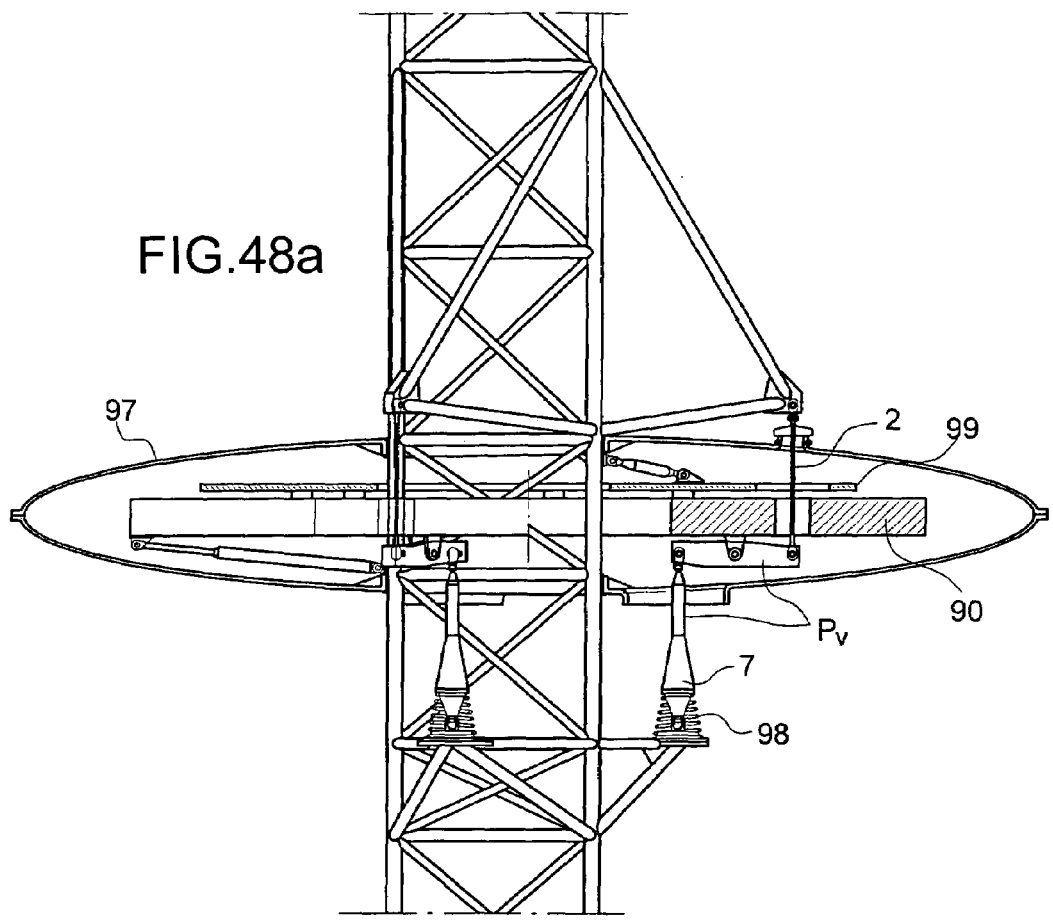
Figure 48B:
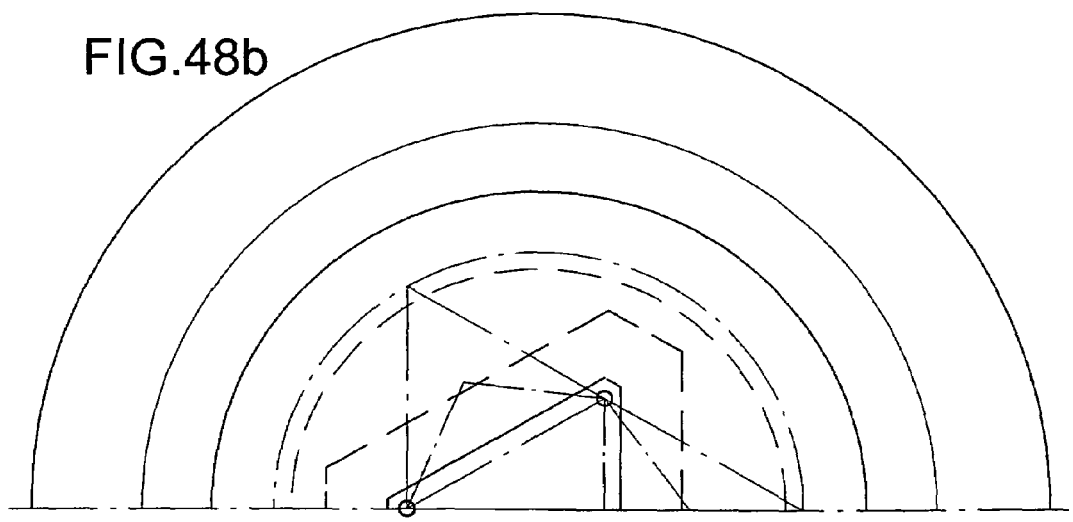

FIG. 48 For the passive oscillation reduction system for a latticed mast the oscillation reducer mass is designed as a flat ring around the mast to reduce wind resistance. The reducer mass 90 is supported by three Virtual Pendulums $P_v$ according to the principle as shown in FIG. 11. The return to the original position is accomplished through the self centering force of the Virtual Pendulum $P_v$ and the spring 98 at the bottom joint of the unstable, standing pendulum 7. Damping is accomplished by the friction disk 99. The stable, hanging pendulums 2 are designed as ropes. Not to be impaired by wind forces, the reduction system structure is covered by an aerodynamically effective panelling 97.

4.10 Large Reduction of the Threat of Soil Liquefaction

When the ground oscillates in an earthquake, the changing moments of a building's mass create swelling foundation loads, which, in certain kinds of earth, can cause a softening of the ground and a lessening of the ground's load bearing ability. The building can sink into the ground.

Since buildings supported by Virtual Pendulum are isolated from the horizontal vibrations of the ground, no reaction forces result caused by tilting moments, and therefore the effects that lead to liquefaction are avoided.

The mass reaction forces of an oscillating building cause in certain grounds liquefaction with fatal consequences. The ground becomes a highly viscous liquid and buildings tilt and sink into the ground. If the mass of the building is less than the mass of the ground that is displaced by the building, then the building rises and swims on top of the liquefied ground. QuakeProtect Modules on the basis of Virtual Pendulums reduce the reaction force of the building to 3/1000. In certain cases liquefaction is even avoided all together.

During horizontal oscillations of the ground, the tilting moments of the building's accelerated mass add to the static load on the foundation a dynamicly swelling load, changing directions with the frequency of the ground oscillation.

The alternating additional load on the edges of the foundation caused by the acceleration of the building's mass $$L_a = m \cdot a \cdot \frac{h_m}{W} \tag{24}$$

$m$ Mass of the building
$a$ Acceleration at center of gravity of the building
$h_m$ height of the center of gravity of the building above the tilting edge
$W$ greatest distance of the tilting edges-in direction of the base oscillation The alternating ground pressures cause in wet ground a pumping action onto the water in the ground. Through that the adhesive friction between the elements of the ground, such as sand and rocks, is lessened through pulsing floating between the elements of the ground, and consequently the ground becomes a viscous fluid, the ground liquefies to a mush.

Buildings can sink in the ground and if forces don't occur symetrically they can also tilt into the ground.

If a building is supported by devices according to the invention at hand, the described reactions of the supported mass do not occur, since the mass does not experience any significant accelerations. The static loads are not superimposed with those dynamic loads from tilting moments. The threat of liquefaction is greatly diminished.

Figure 49:
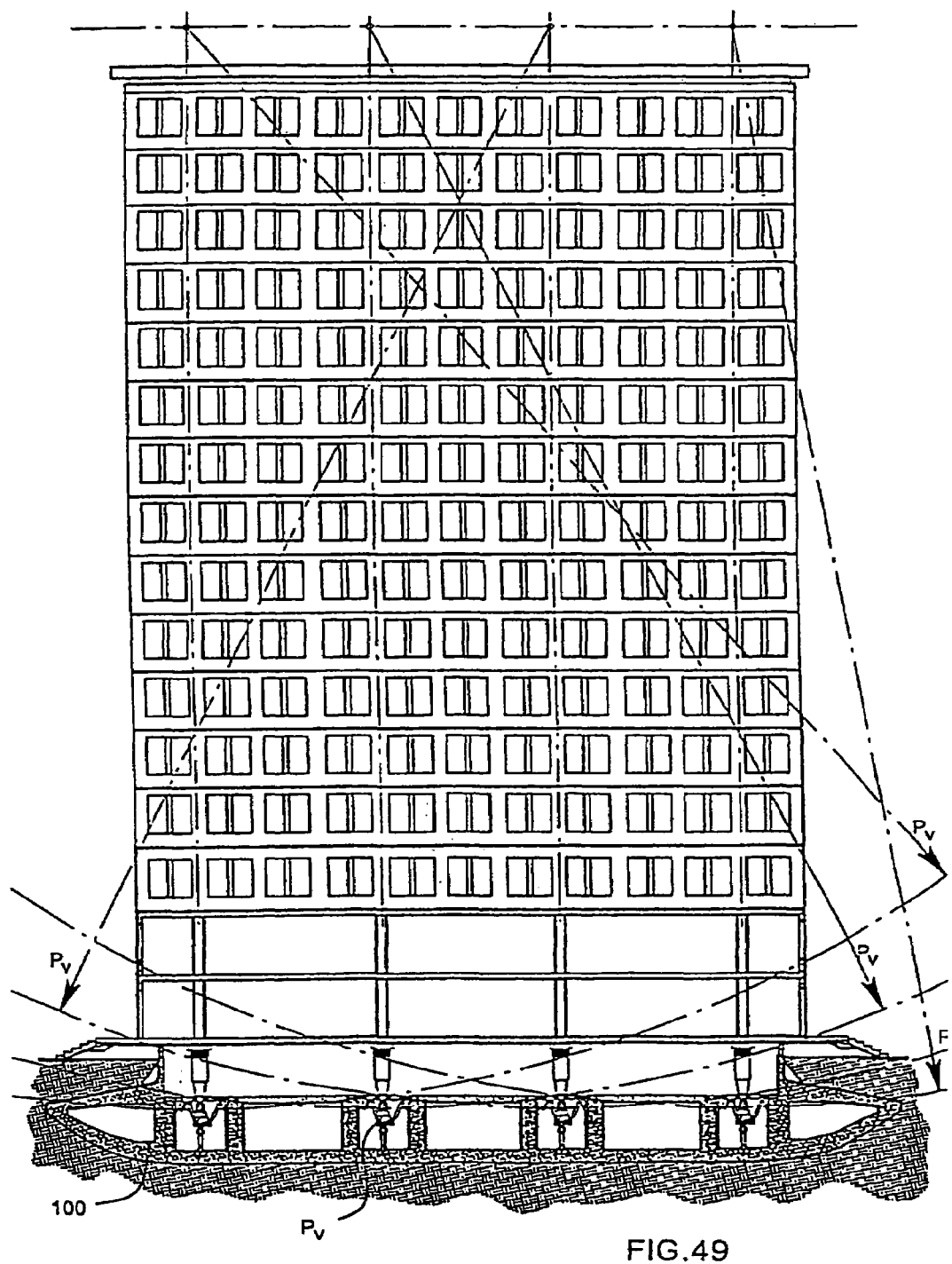

FIG. 49 To further reduce the danger of liquefaction on very soft and wet grounds, beneath the Virtual Pendulums $P_v$ there is additionally a QuakeProtect Foundation installed as a base for QuakeProtect Modules. The foundation is designed as a rigid and light structure in such a way, with such dimensions, that the mass of the displaced ground equals the mass of the whole building.

To reduce the impact of the mechanical force of ground compression waves onto the foundation, the underside of the QuakeProtect Foundation 100 is curved with its curvature increasing towards its rim.

Figure 50:
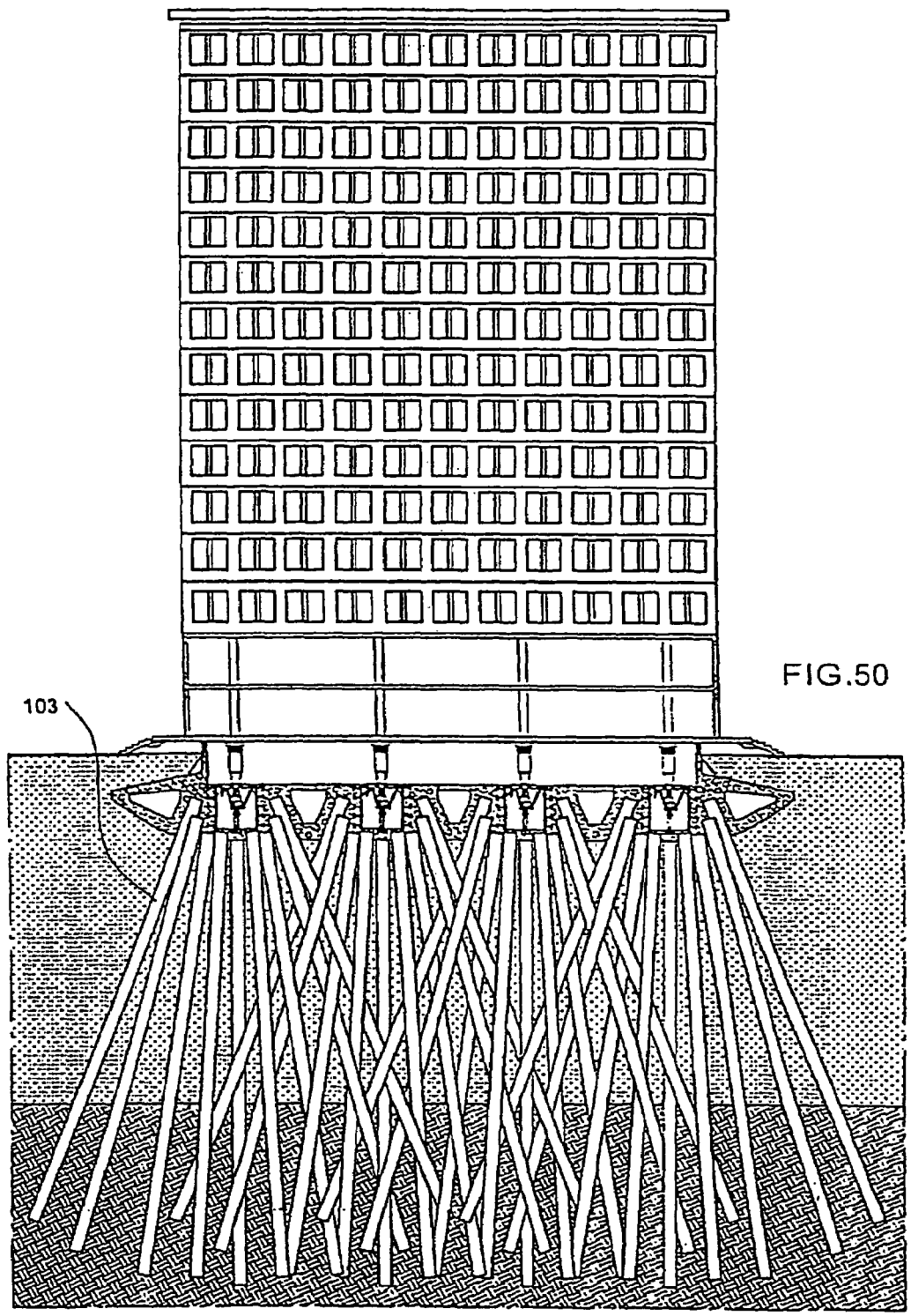

FIG. 50 If underneath a moist and soft sediment is a harder ground or rock reachable, additional foundation piles 103 could be used with a QuakeProtect Foundation as shown in FIG. 49.

4.11 Building Seal Between Base and Supported Object

Figure 51:
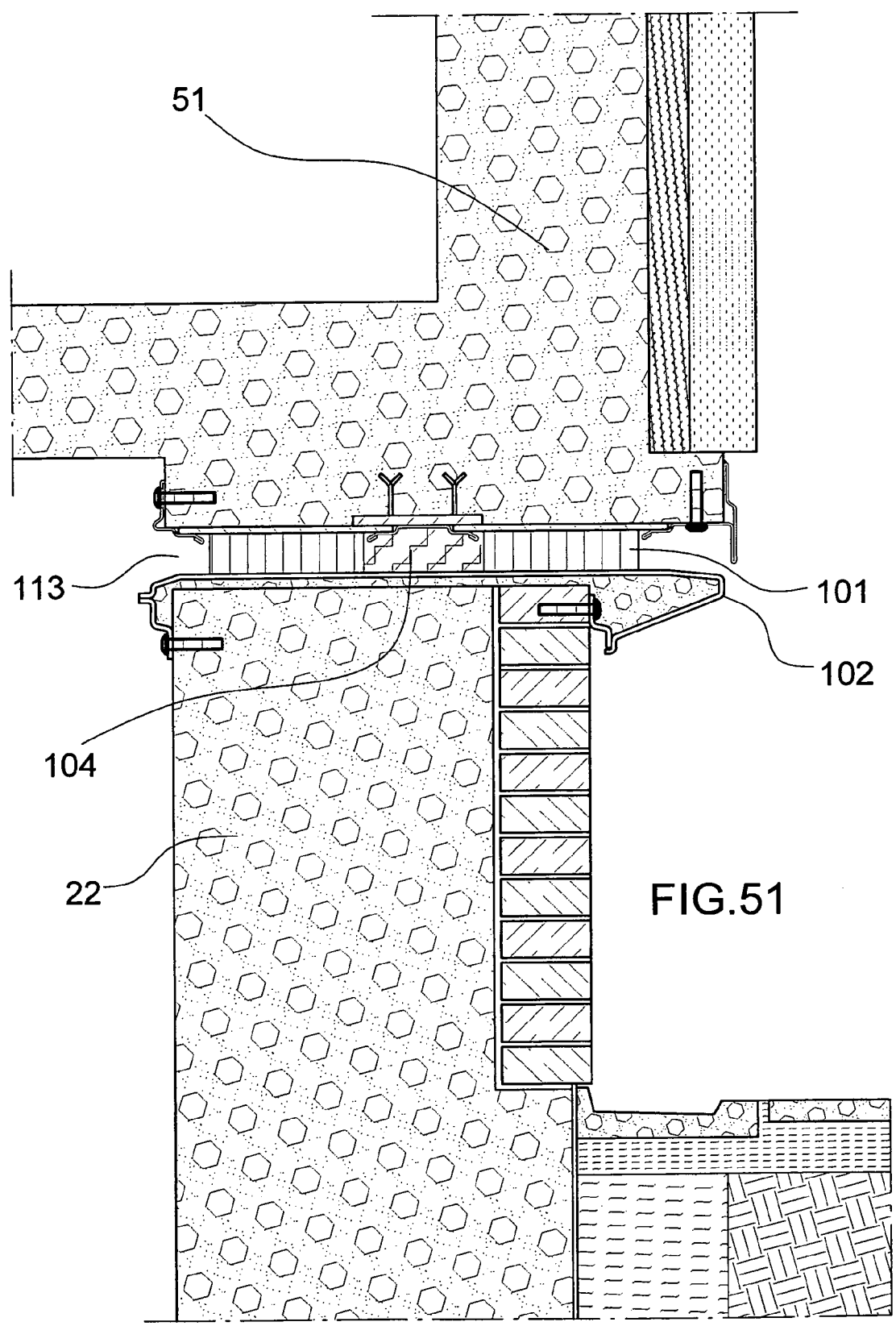

FIG. 51 Between the basement walls, which are embedded in the ground and oscillate during an earthquake, and a building structure 51, which is supported by Virtual Pendulum QuakeProtect Modules and remains standing still, there is a gap 113 provided for movement, which though is not permeable by wind, dust, moisture and vermin. On one side of the gap, preferably the upper side, are strips of wire brush 101 attached and in between stuffed isolation wool 104. On the other side of the gap is a gliding frame 102 mounted with sloped edges.

Figure 52:
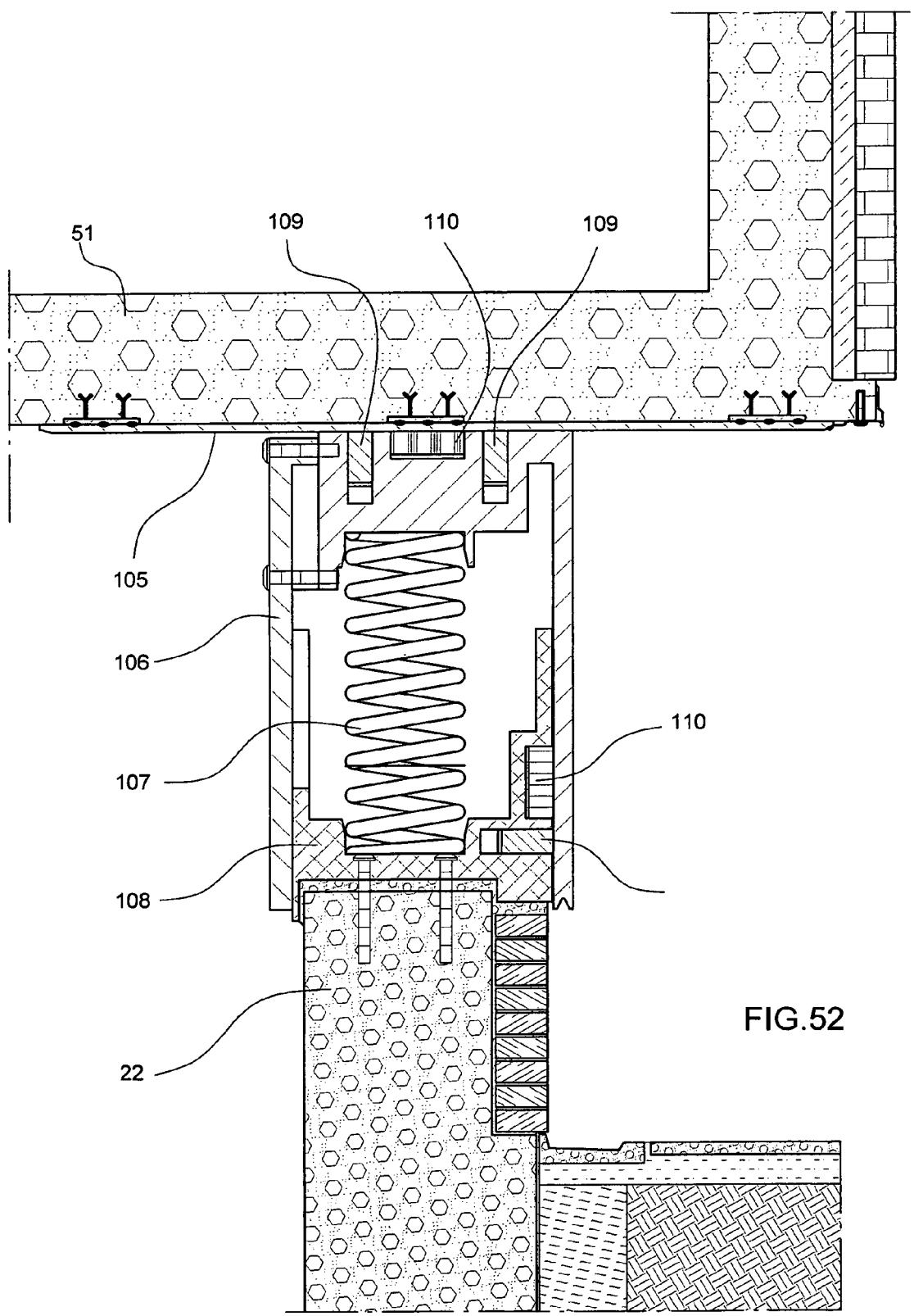

FIG. 52 If for the compensation of vertical accelerations the QuakeProtect Modules are additionally fitted with vertical springs and dampers, then it is necessary to outfit the movement gap seal with a vertical spring as well.

Against the isolated building structure 51 or an additional glide protection lamella 105 is a U-shaped seal frame 106 pressed by spring elements 107, e.g. coil springs or leaf springs. The frame 106 is vertically guided by the u-shaped frame 108, which is fixed to the basement wall 22. A seal strip 109, pressed by a spring, seals the frame 108 towards the frame 106. Seal strips 109, also pressed by springs, and a seal pack 110 seal the frame 106 towards the base isolated building or glide protection lamella 105.

4.12 Lesser Fire Hazard through Improved Interface

Figure 53:
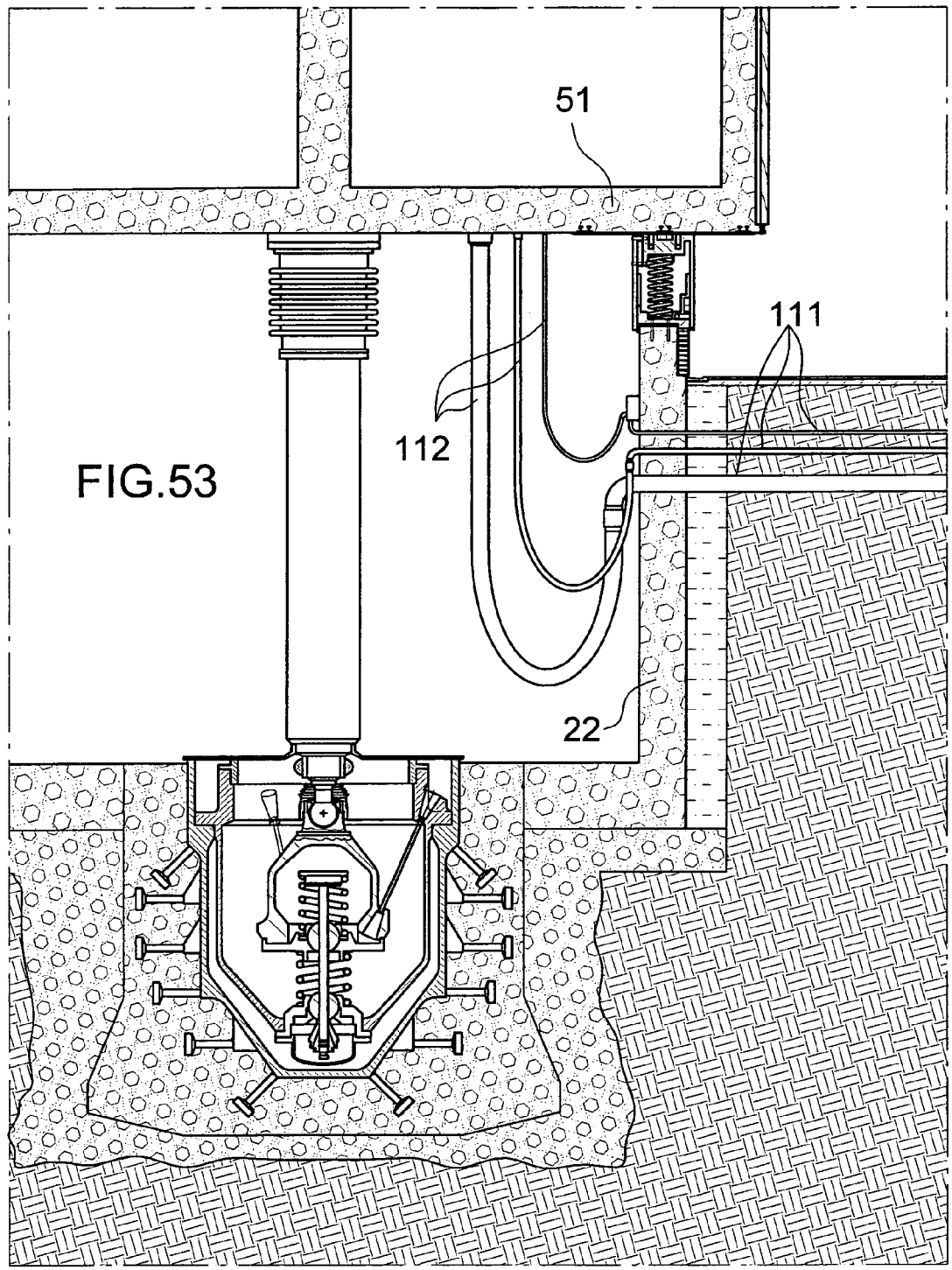

FIG. 53 Since the building mass is accelerated back and forth during an earthquake, the mass reaction forces exert a pressure into the earth around the building through the vertical surfaces of the basement walls 22. The ground is compressed or relieved. Stress can occur between the gas, water and electricity mains 111 in the ground and the pipe and wire connections in the building, which can lead to to fractures.

Damages to gas pipes and electric wiring can cause fire through a short circuit. This fire hazard is reduced, because the compression of the ground and the stress to the mains is reduced, since any acceleration reaction forces are not caused by the mass of the building but only by the considerably lower mass of the basement. The potential of fractures is greatly reduced.

Within the building flexible connections between the mains and the pipes and wires in the building, designed as hanging U-loops 112, provide movability, so that the relative movement of the oscillating base to the base isolated building structure 51 does not cause any damage.

4.13 Tolerating Openings Underneath Buildings

Even in the most unlikely of events, that a fault line moves in opposite directions right underneath a building, or the ground opens up right underneath, the building has a good chance to survive, because of the ability of the devices to move independently of each other and the ability to equalize the changed support spans at the base.

The devices still would provide stability for the supported structure.

Figure 54:
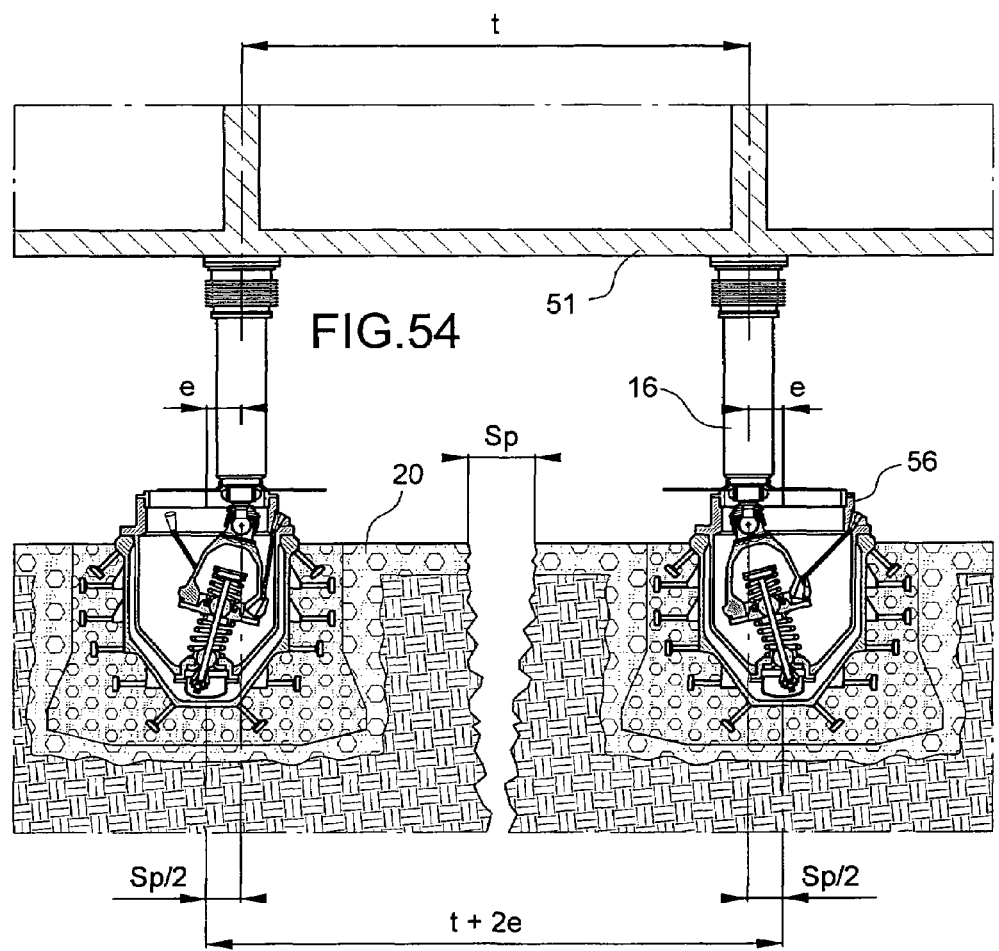

FIG. 54 The pitch t between the rigidly mounted support elements of the supported structure 51 does not change. The pitch between the QuakeProtect Modules 56 on the foundation 20 is the same.

If there occurs an opening of the ground between QuakeProtect Modules 56, because of earthquake compression waves, the span of the protection modules 56 widens by the width of the gap Sp. The QuakeProtect Modules, as they are Virtual Pendulums, center the load bearing support points in the center of their amplitudes underneath their virtual suspension points.

If the span of two virtual suspension points of two Virtual Pendulums is widened, then the rigidly connected load bearing support points take an equalized position, so that the deviation from the original middle position is the same for both Virtual Pendulums.

4.14 Impact Reduction of Explosions

Additionally, in the case of explosions near a building, with strong air pressure loads exceeding the stagnation pressure loads of strongest storms, the object or building equipped with this support system can shift in any direction, reducing therefore the air load moments.

The wind resistance system automatically responds to the wind force with a parameter control responsiveness that corresponds to the wind force change rate.

An increase of air pressure loads by an explosion occurs in an extremly short time period, within which no significant increase of the resistance force for the wind force compensation occurs through the automatic control. Therefore, if suddenly impacted by a air pressure wave, the building moves back with little reaction force, which greatly reduces the impulse impact.

5 BRIEF DESCRIPTION OF THE DRAWINGS

Figure 1:
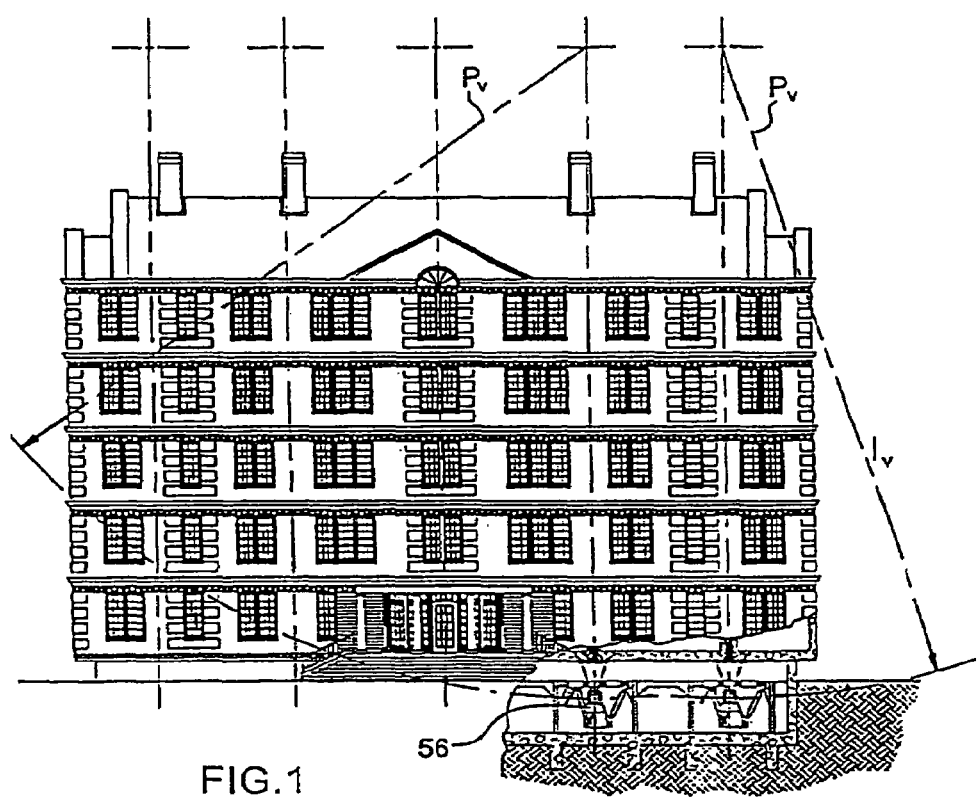

FIG. 1 is a representation of a house supported by QuakeProtect Modules, which represent Virtual Pendulums of great length, with a behavior as if the house was suspended from long pendulums of the length $l_v$.

Figure 2:
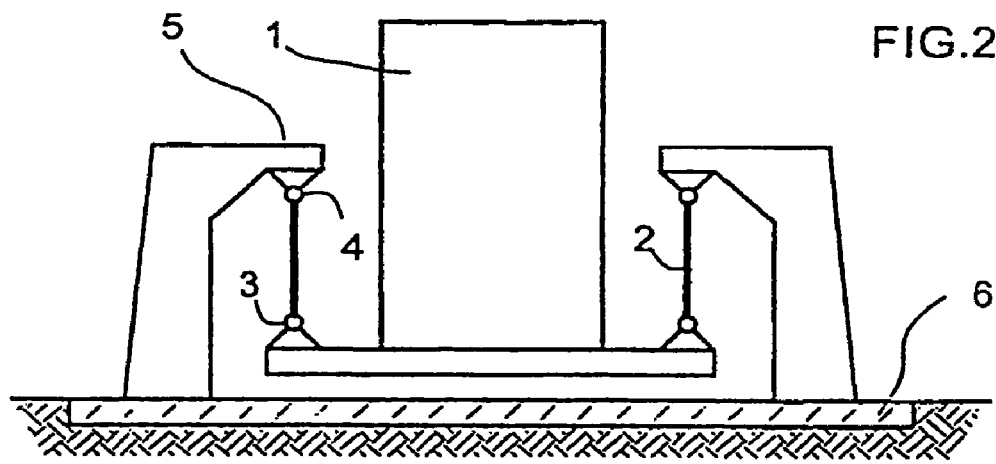
Figure 3:
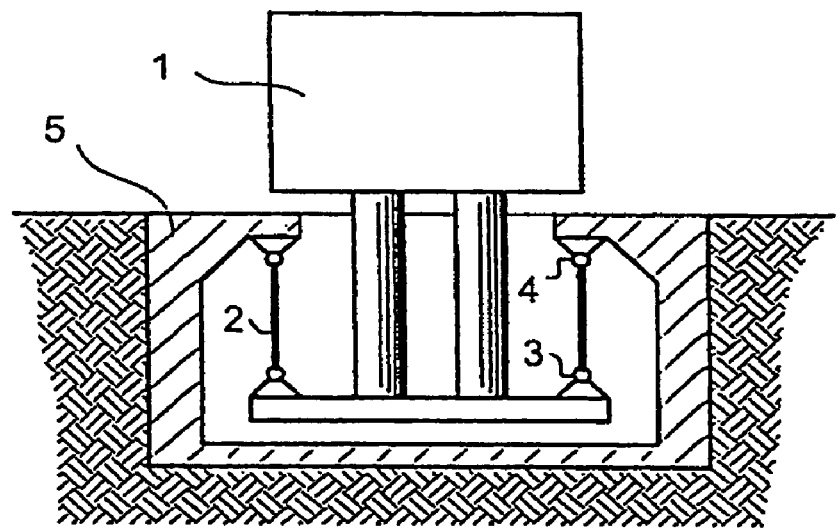
Figure 4:
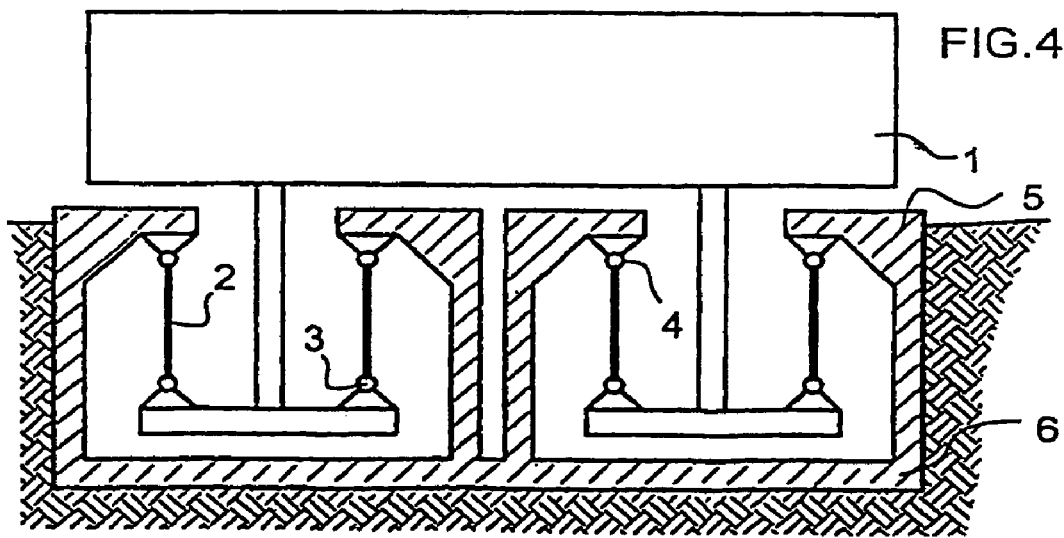

FIG. 2–FIG. 4 show devices for earthquake protection according to prior art, taken from drawings of the respective literature. (Referenced documents)

Figure 5:
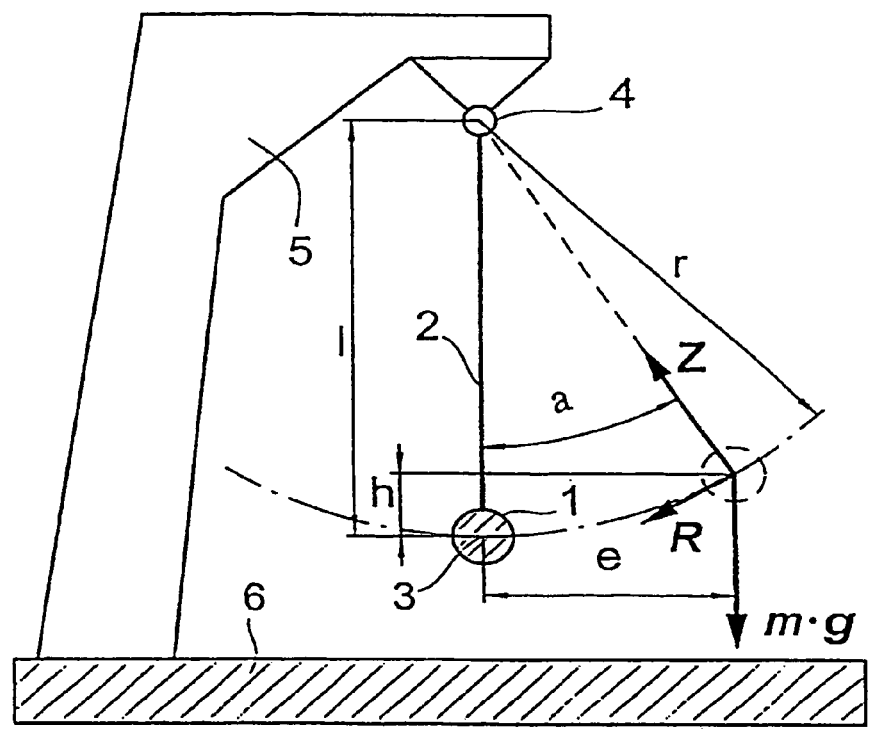

FIG. 5 is a schematic depiction of a mathematical pendulum and shows the reference symbols and function values as they will be used for fundamental discussion in the section „Deduction to solve the task".

Figure 6:
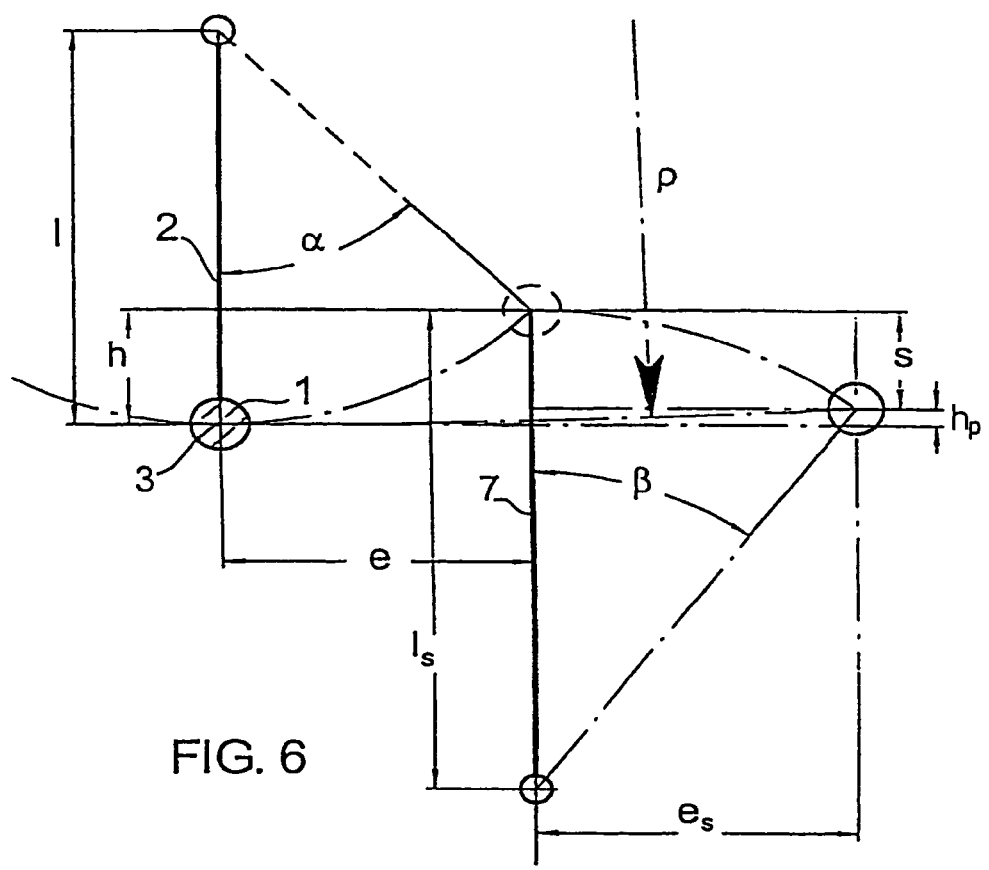
Figure 7:
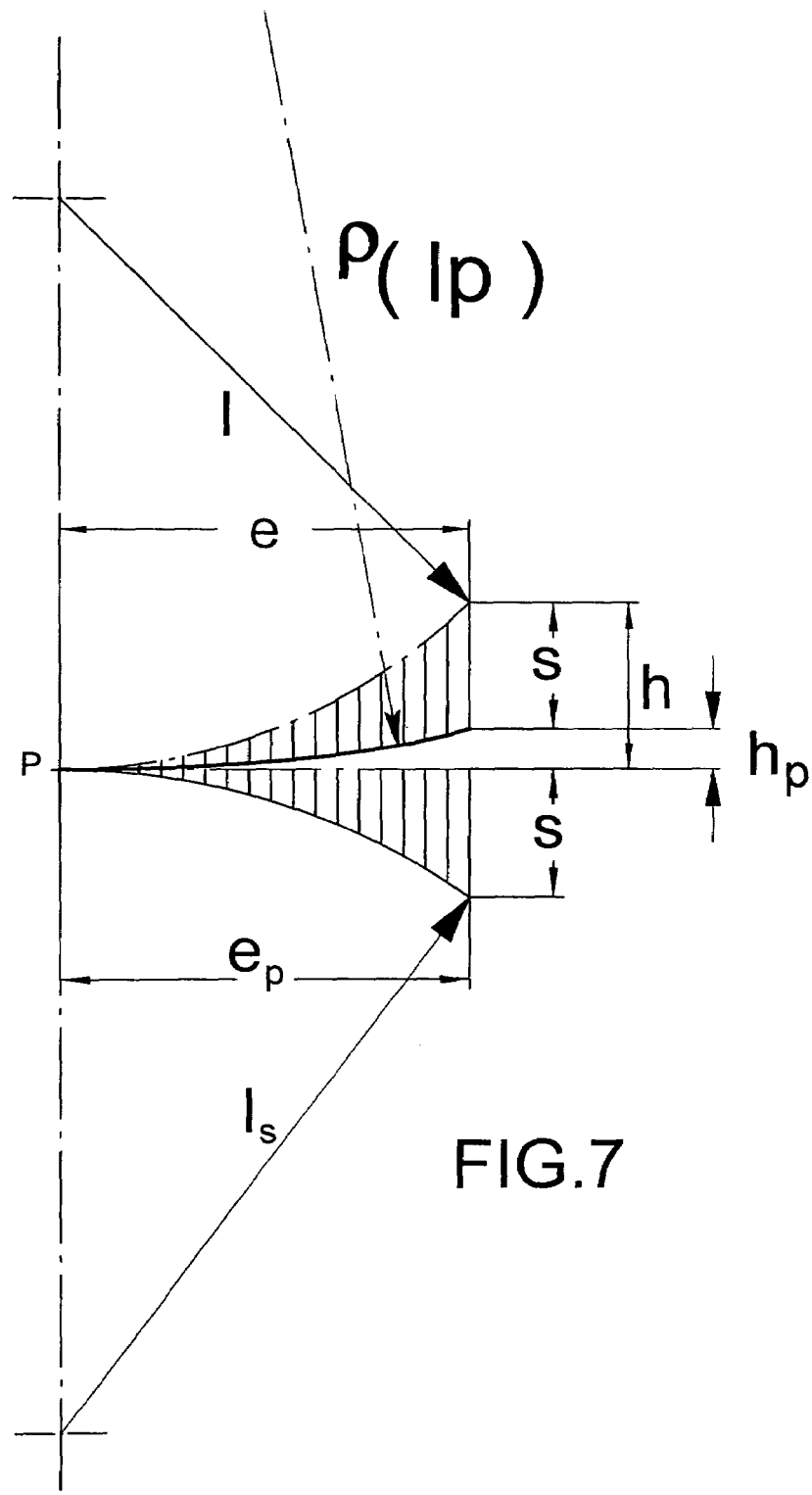

FIG. 6 and FIG. 7 show the overlapping of ascending and descending harmonic movements.

Figure 8:
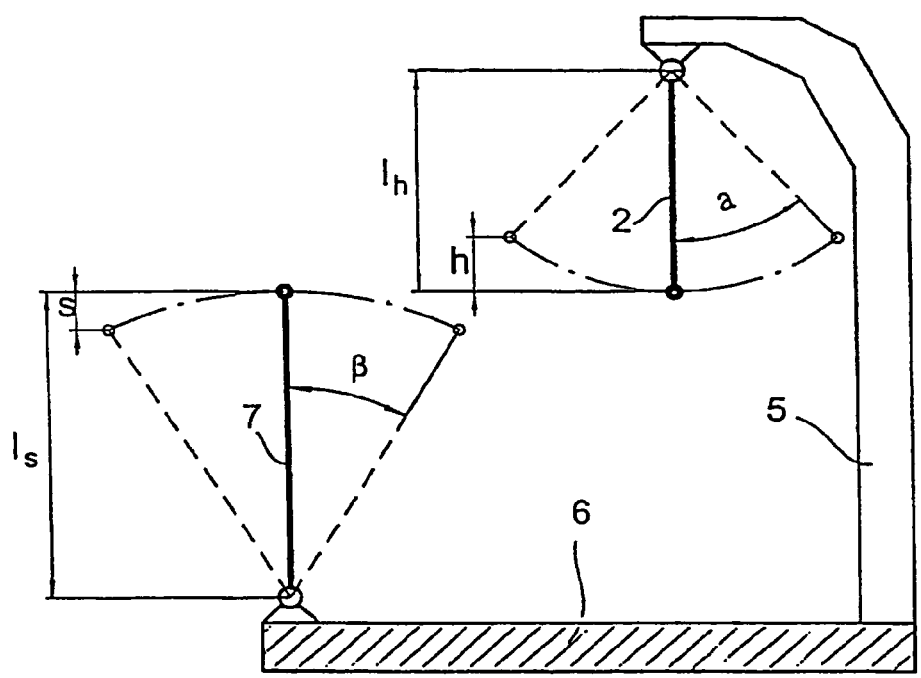

FIG. 8 serves to illustrate the invention and shows schematically a comparison of stable and unstable pendulums as supporting elements.

FIG. 9 is a simplified schematic depiction of the example of a device which represents a Virtual Pendulum of great length with relatively little real vertical extention. Illustrated is the effective principle of the solution of the invention, whereas a point on this kinematic design serves as a support point for a supported object, with a behavior in space as if this point were the oscillating end of a long pendulum.

Figure 10:
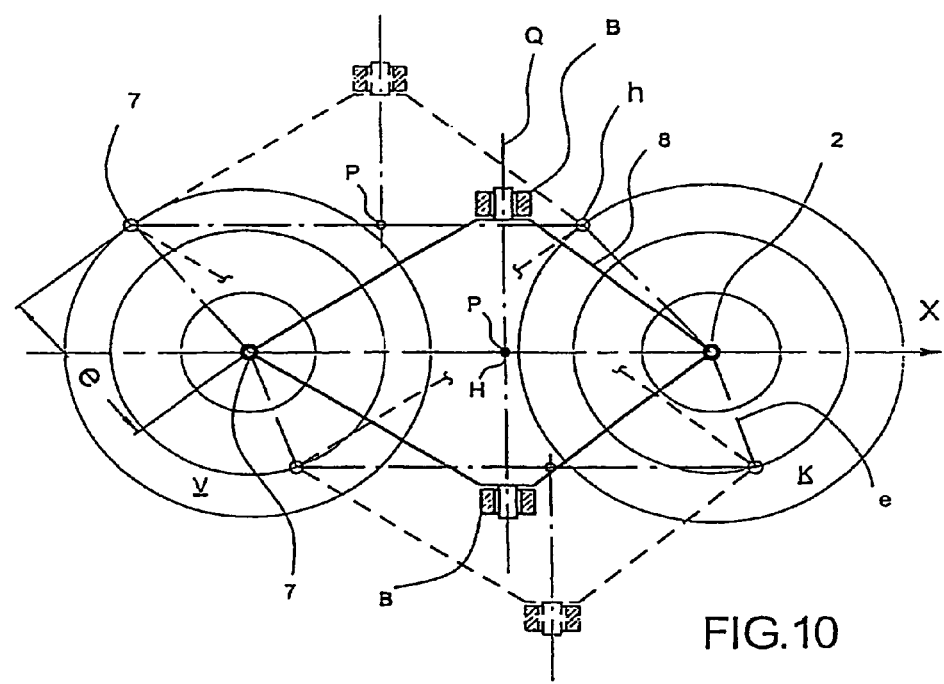

FIG. 10 is a simplified illustration of the vertical view from above of the diagram of FIG. 9.

FIG. 11 shows the used reference symbols for the diagram of a pendulum.

Figure 12:
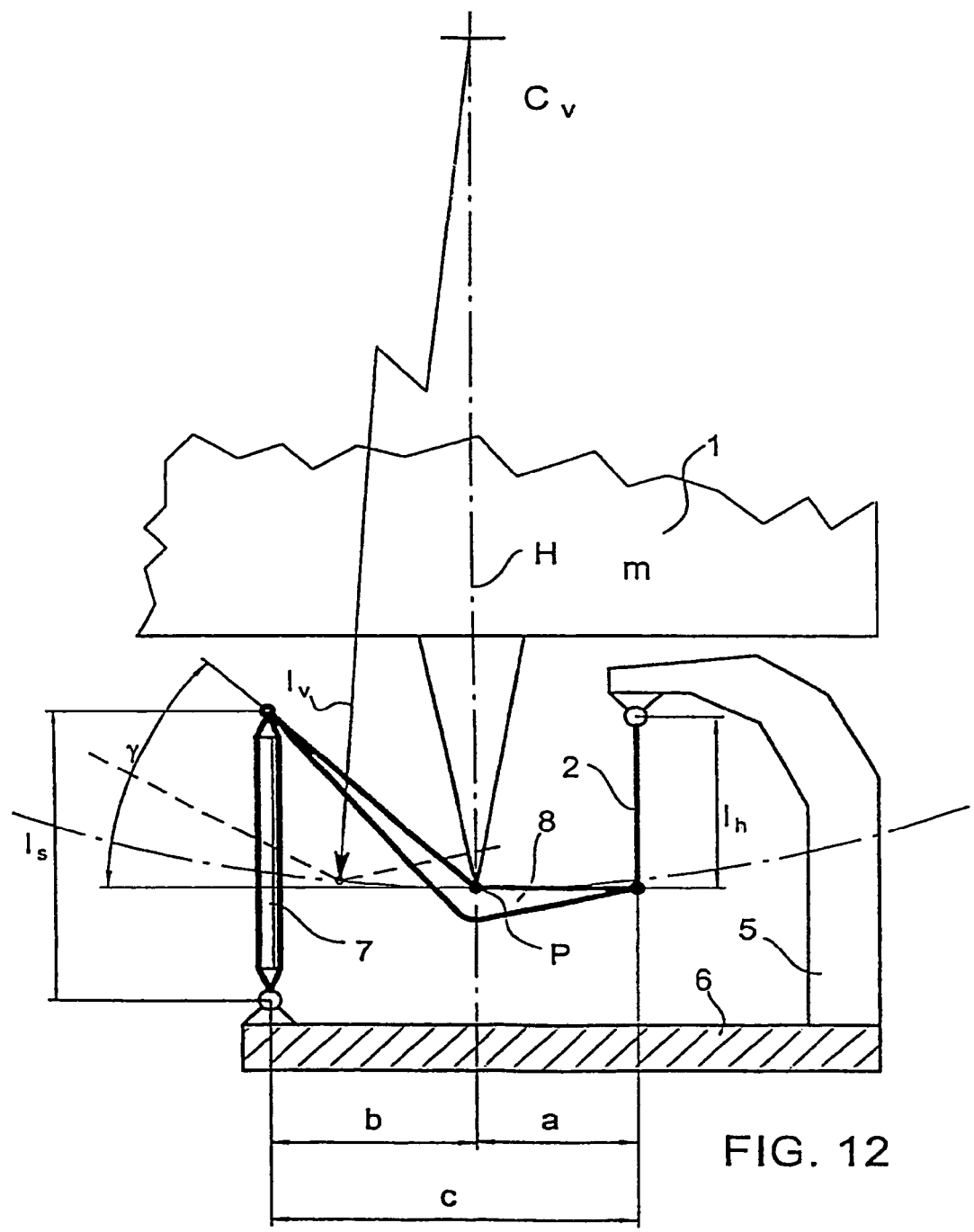

FIG. 12 is a simplified schematic depiction of a variation of the design as shown in FIG. 9.

FIG. 13 depicts a Virtual Pendulum as a variation of the design as shown in FIG. 12, where the lever connecting to the stable, hanging pendulum and the lever connecting to the unstable, standing pendulum are positioned on different levels.

Figure 14:
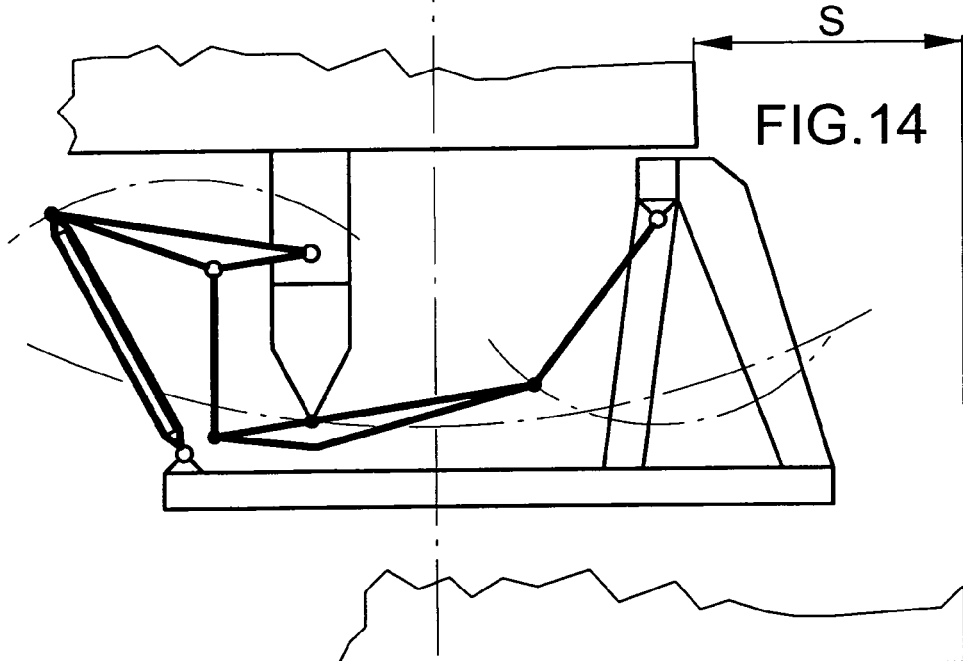
FIG. 14 and FIG. 15 show the oscillation range of the supported mass in relation to the base in two directions.
Figure 15:
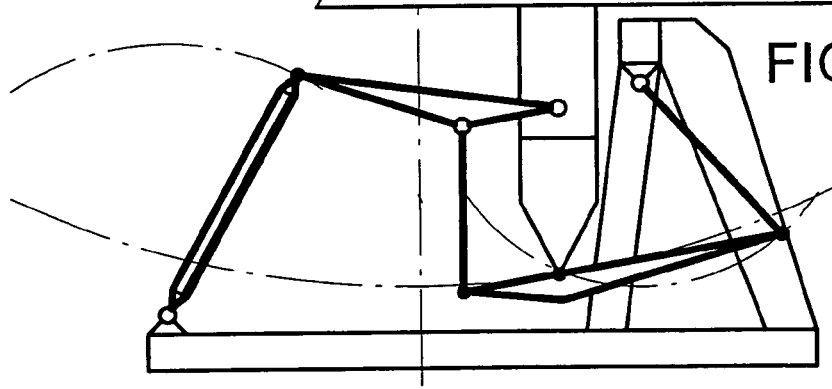
Figure 16:
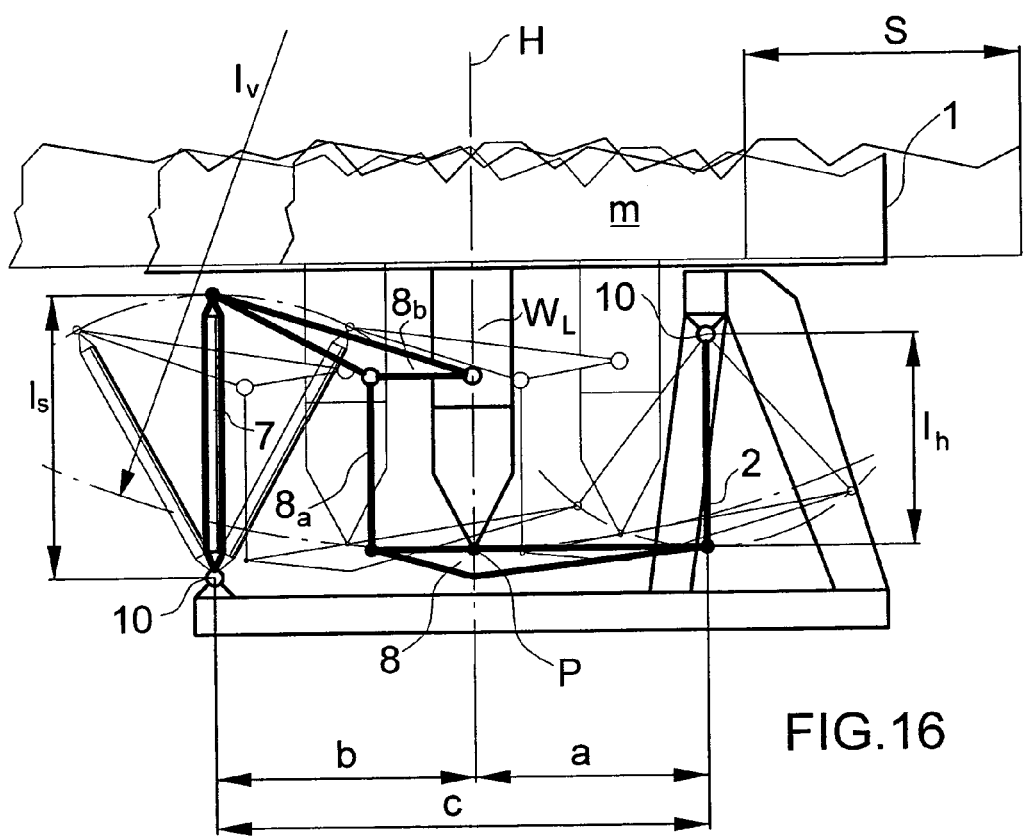
FIG. 16 shows the range of oscillation of the supported object in relation to the base in three motion phases with an oscillation amplitude of S.

FIG. 14–FIG. 16 show the Virtual Pendulum as shown in FIG. 13 in different phases of movement. FIG. 17 shows the movement of the Virtual Pendulum as shown in FIG. 13 relative to the oscillating base.

FIG. 18 is a simplified schematic depiction of a second solution for the realisation of a Virtual Pendulum different to the one realized in the example as shown in FIG. 9.

FIG. 19 shows schematically the vertical view from above of the example in FIG. 18.

FIG. 20 and FIG. 21 show in simplified schematic illustrations an addition to the example of FIG. 18 and FIG. 19 to realize a great length Virtual Pendulum.

FIG. 22 is a schematic depiction of variations of Virtual Pendulums.

FIGS. 23, 23a, 23b, 23c show the diagram of a Virtual Pendulum and its positions of movement.

FIG. 24 shows the movement of the base relative to the Virtual Pendulum.

FIG. 25 shows in a conceptual illustration a centering and wind force compensation device for an object supported by Virtual Pendulums.

FIG. 26 is an illustration of a device for the centering of an object supported by Virtual Pendulums by means of an elastomeric spring block.

FIG. 27 is a centering and wind force compensation device for an object supported by Virtual Pendulums by means of a rolling ball, which is pressed into a centering cone by the force of a spring.

FIG. 28 shows a simplified illustration of a diagram for a hydropneumatically controlled system for the centering and the wind force compensation of an object supported by Virtual Pendulums.

FIG. 29 shows a device for the centering and the wind force compensation of an object supported by Virtual Pendulums, by means of swings, which horizontally support the building against the foundation wall through hydropneumatic spring forces.

FIG. 30 shows the same device as in FIG. 29 with the additional integration of a hydraulic pump, which draws its power from the movement of the base during an earthquake.

FIG. 31 shows a system for centering and wind load resistance, where a part of the building, that is not subjected to any wind forces, serves as a position reference.

FIG. 32 shows schematically a vertical spring system to reduce accelerations.

FIG. 33 depicts a QuakeProtect Module with integrated vertical spring system and wind load resistance.

FIG. 34 shows elastic deformations of streetlamp poles during critical oscillations.

FIG. 35 shows a Virtual Pendulum on top of a pole.

FIG. 35a shows a cross section of FIG. 35

FIG. 35b shows the view from above of FIG. 35

Figure 36A:
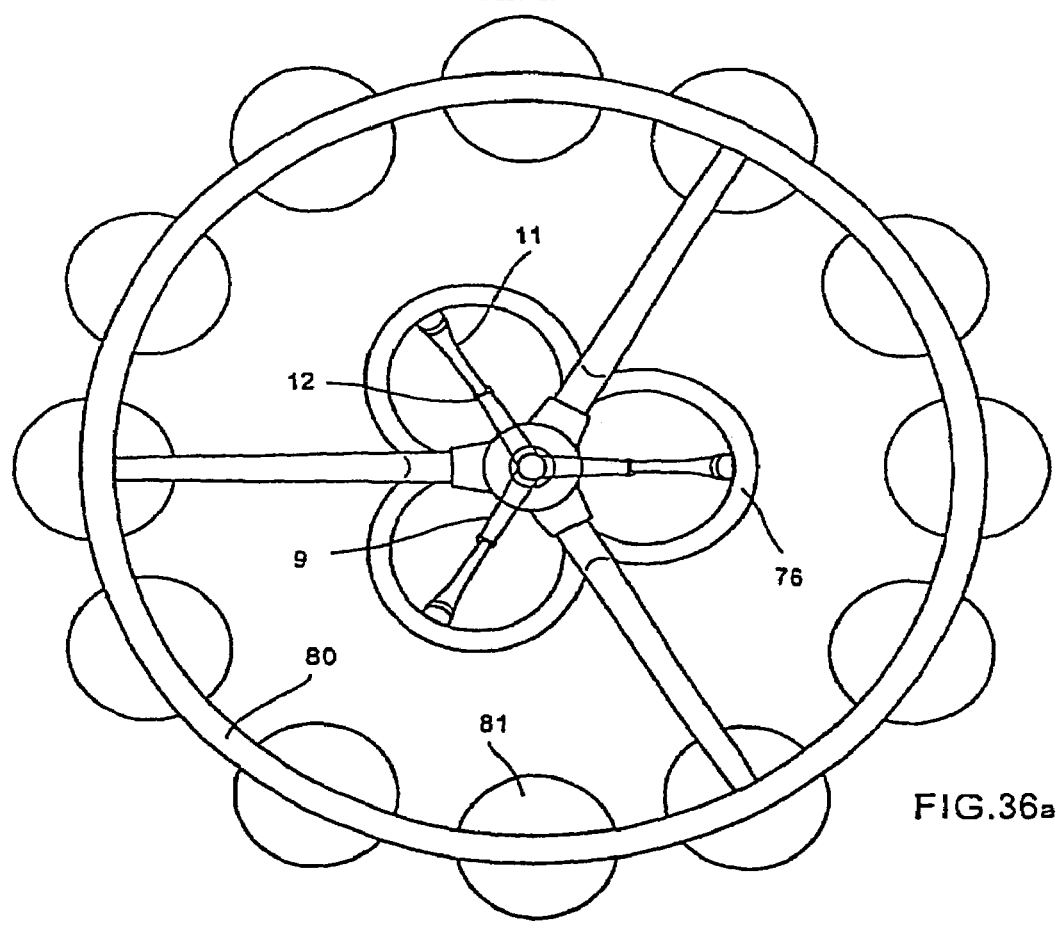

FIGS. 36, 36a, 36b show a group of lamps on top of a pole with oscillation isolating Virtual Pendulums and details.

FIG. 37–FIG. 39 show variations of oscillation isolated lamps on poles.

FIG. 40 and FIG. 41 show hanging lamps with oscillation isolating Virtual Pendulums according to the diagram of FIG. 21

FIG. 42 shows the suspension of a row of lights from Virtual Pendulums according to the diagram of FIG. 9.

FIG. 43 shows an oscillation reducer supported by Virtual Pendulums accding to the diagram of FIG. 9.

FIG. 44 shows an oscillation reducer as in FIG. 43 with a position reference mass supported by Virtual Pendulums according to the diagram of FIG. 21.

FIG. 45 shows an oscillation reducer supported by Virtual Pendulums according to the diagram of FIG. 13.

FIG. 46 shows a mass supported by a Virtual Pendulum according to the diagram of FIG. 47 shows an oscillation reducer supported by Virtual Pendulums on a tubing mast.

FIG. 48 shows an oscillation reducer supported by Virtual Pendulums on a latticed mast.

FIG. 49 shows a QuakeProtect Foundation as a foundation for Virtual Pendulums.

FIG. 50 shows a QuakeProtect Foundation with foundation piles as a foundation for Virtual Pendulums.

FIG. 51 shows the seal of a movement gap of base isolated buildings.

FIG. 52 shows movement gap seals for the horizontal and vertical base isolation of a building.

FIG. 53 shows the interface situation for the mains of a base isolated building.

FIG. 54 illustrates the impact of an opening of the ground underneath a building supported by QuakeProtect Modules during an earthquake.

Figure 55:
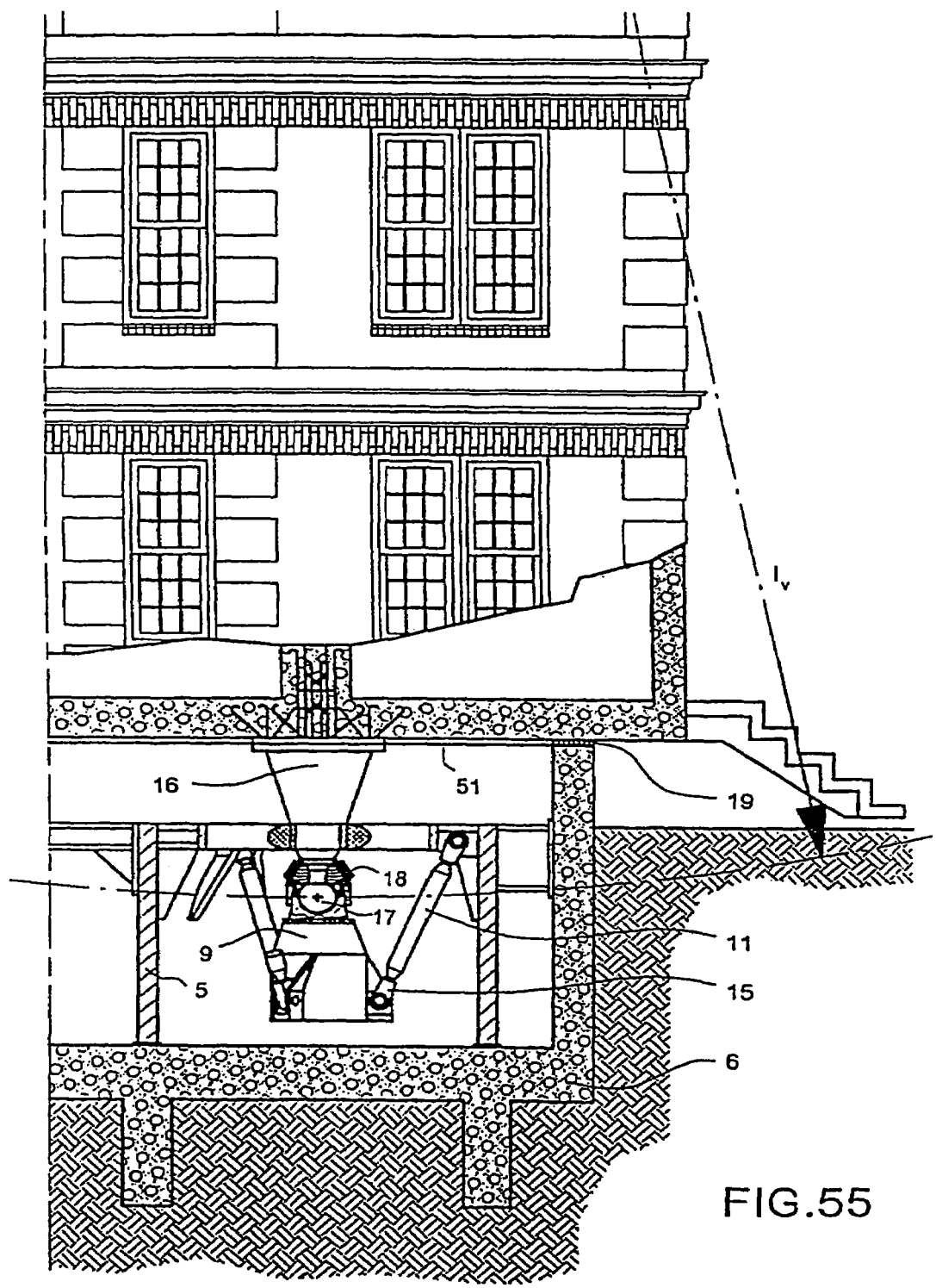

FIG. 55 shows a QuakeProtect Module as a device to support buildings and objects realizing a Virtual Pendulum, according to the design as shown in FIG. 21, installed into the basement of a building.

Figure 56:
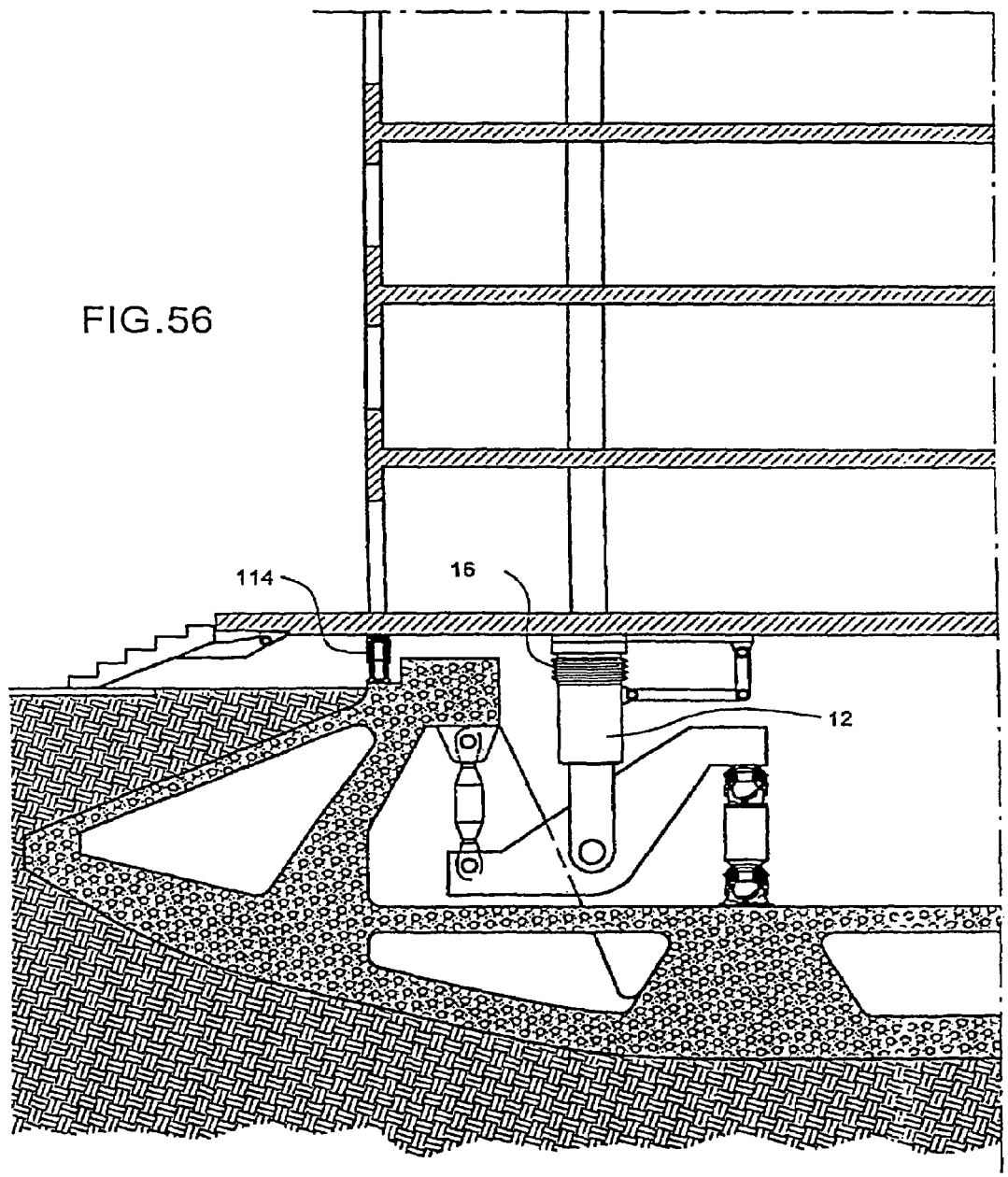

FIG. 56 shows a QuakeProtect Module with a vertical spring in the basement of a building.

Figure 57:
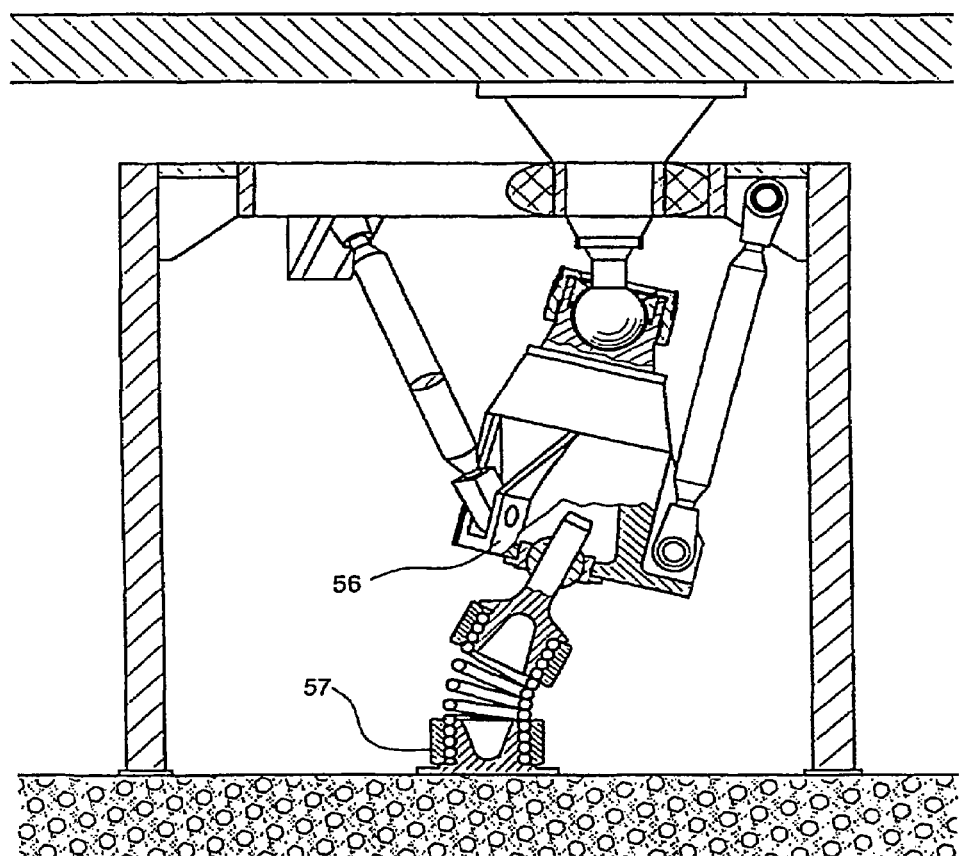

FIG. 57 is a QuakeProtect Module, as shown in FIG. 21, with the integration of a centering and wind force compensation device according to the diagram of FIG. 25.

Figure 58:
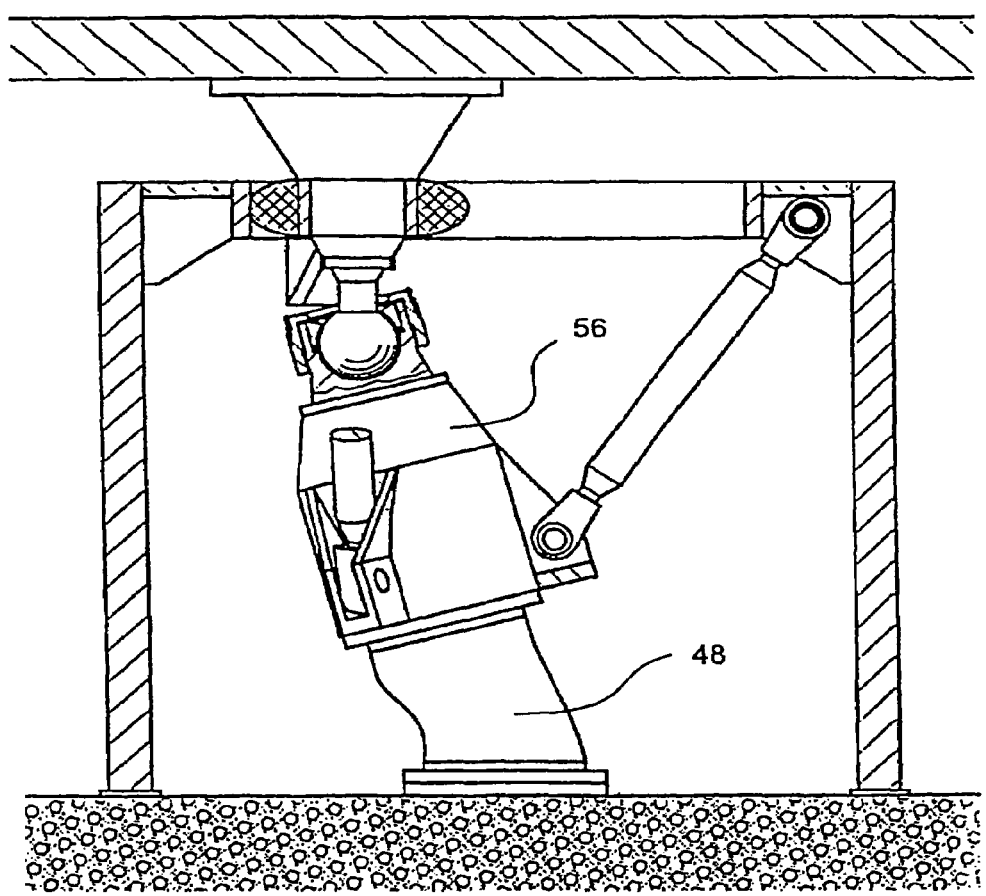

FIG. 58 is a QuakeProtect Module as shown in FIG. 55 combined with an elastomeric block as a centering spring and wind force restraint.

Figure 59:
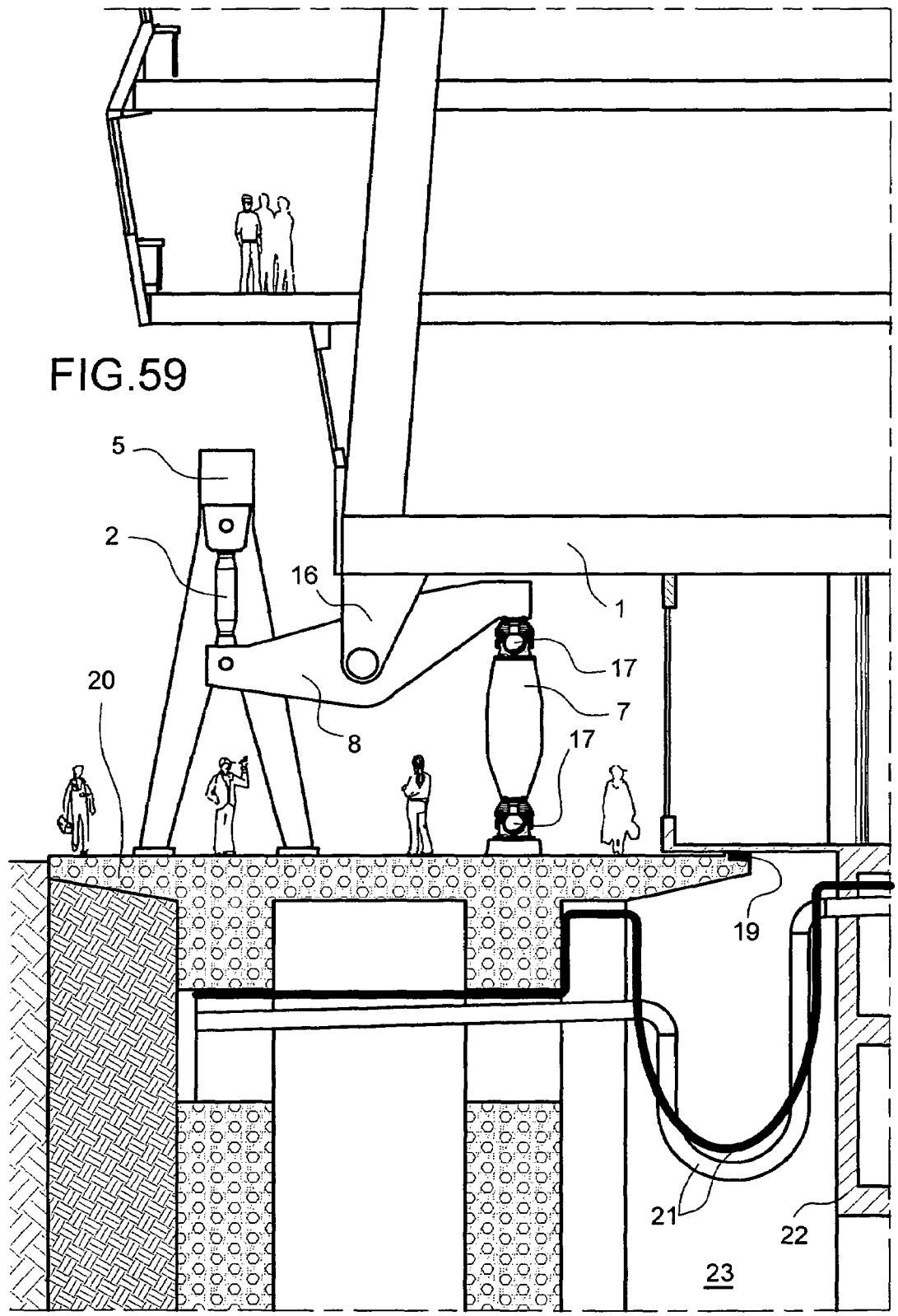

FIG. 59 shows a QuakeProtect Module installed at ground level, a device to support buildings and objects realizing a Virtual Pendulum, according to the design principle as shown in FIG. 12.

Figure 60:
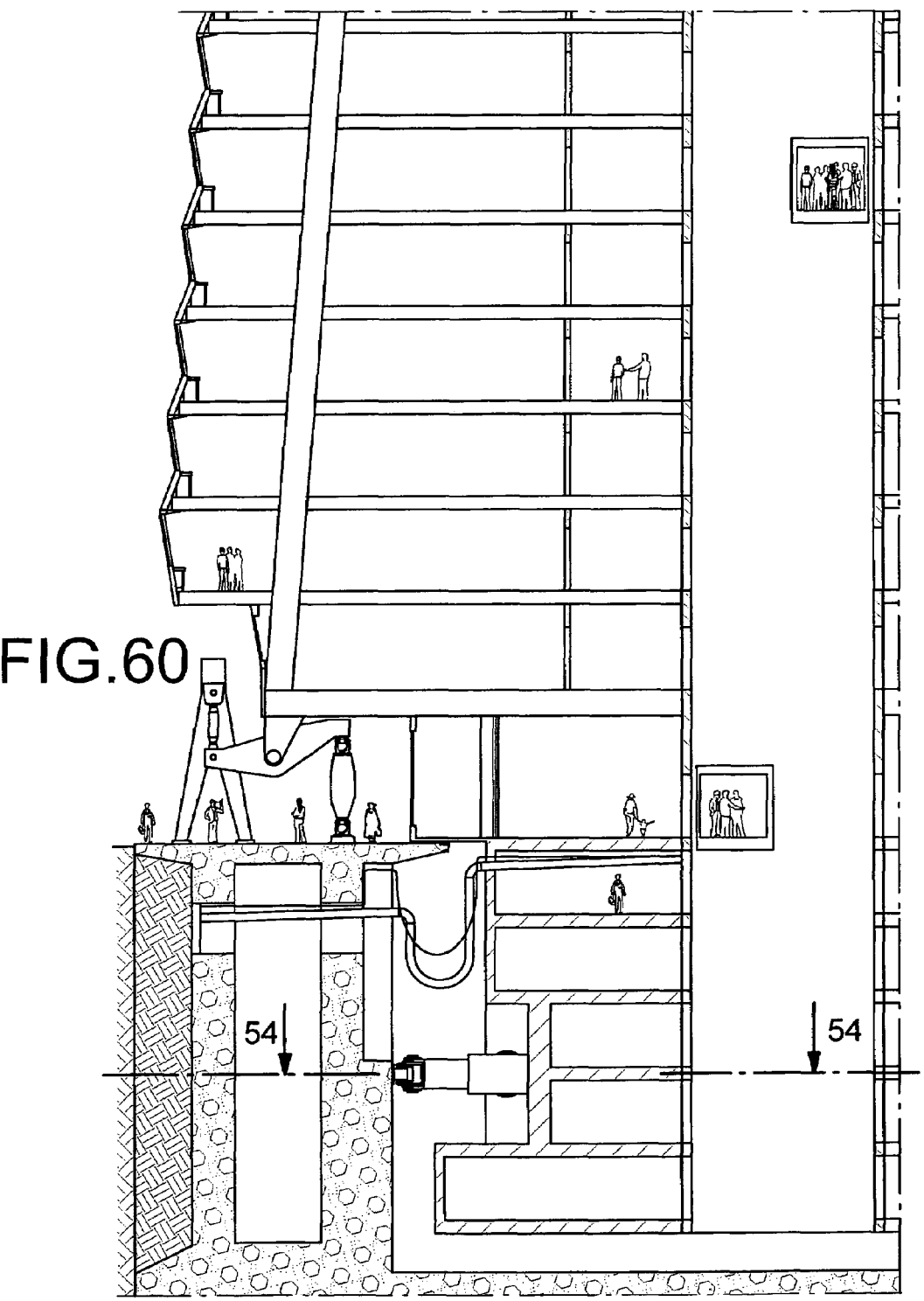

FIG. 60 shows a vertical cut of a building, supported by QuakeProtect Modules as shown in FIG. 59, with the depiction of horizontal support devices for the centering of the building and the resistance against wind forces.

Figure 61:
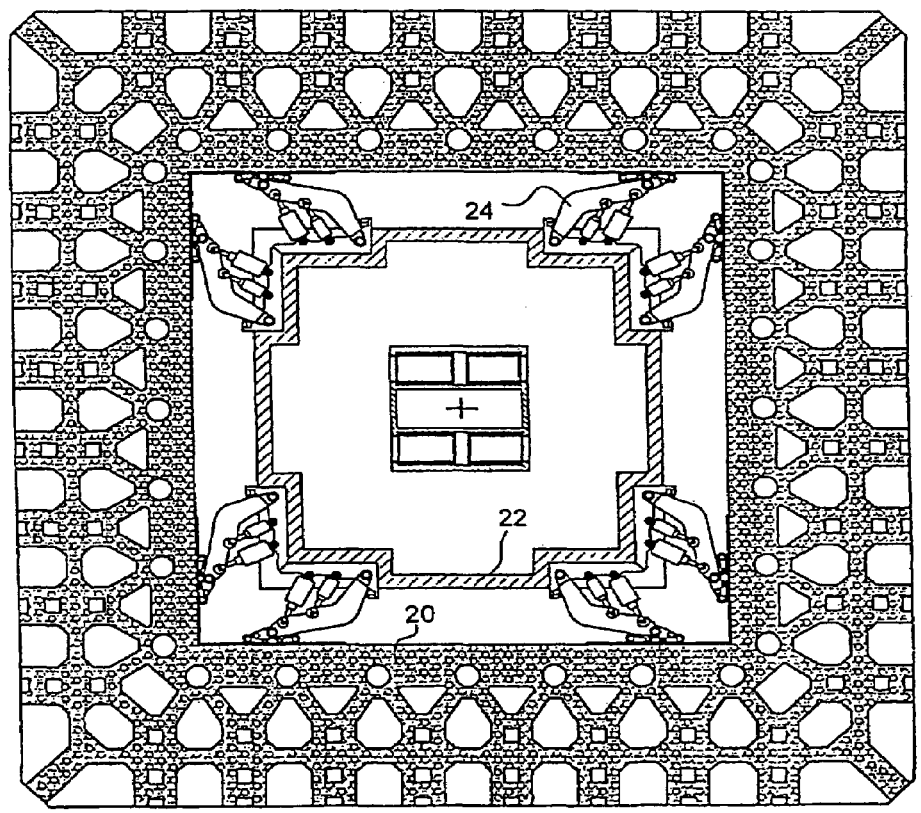

FIG. 61 is a horizontal section through the basement of a building and its frame foundation in the plane of centering devices according to the example of FIG. 30, showing the positioning of the devices.

Figure 62:
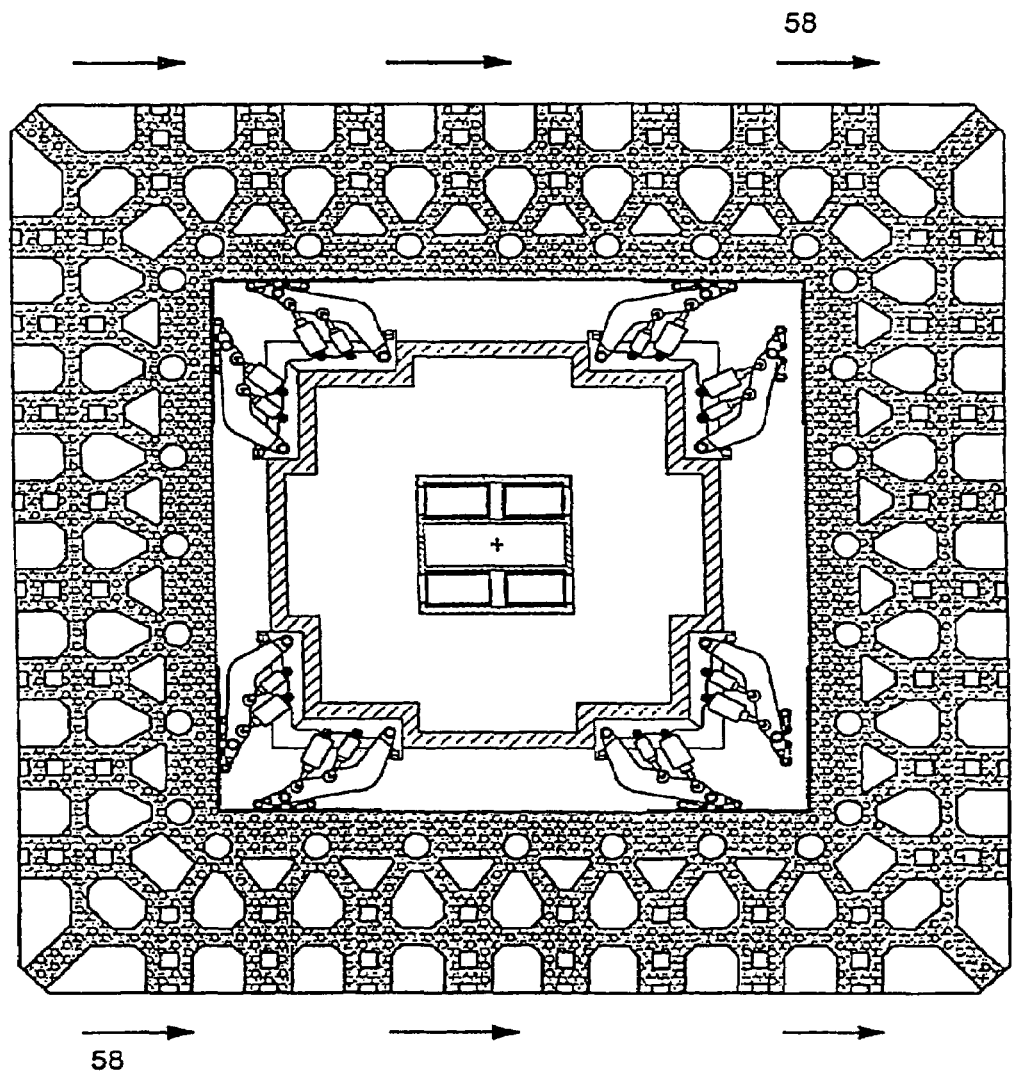

FIG. 62 shows the displacement of the base with a foundation relative to the basement of a building, which remains standing still, in one direction parallel to a building wall.

Figure 63:
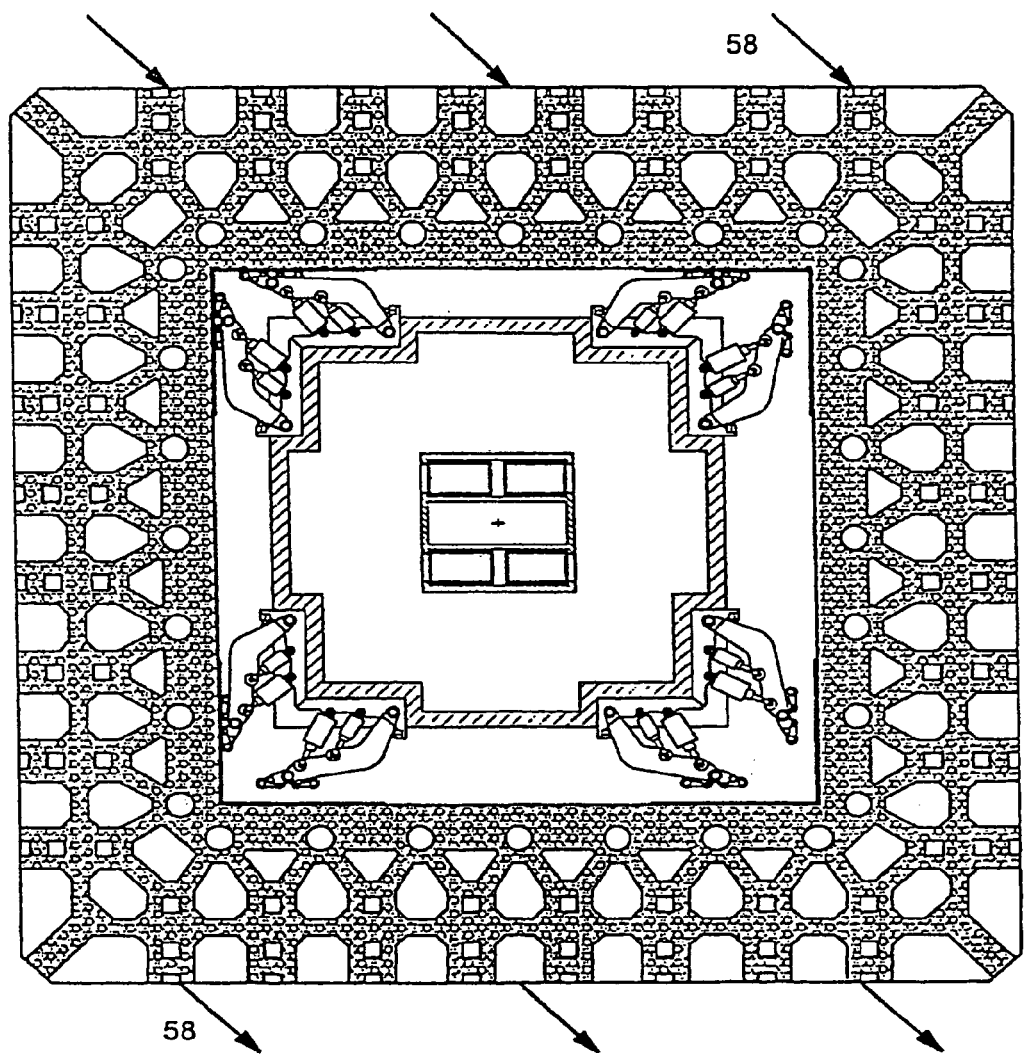

FIG. 63 shows the displacement of the base with a foundation relative to a building standing still in a direction angled to a building wall.

Figure 64:
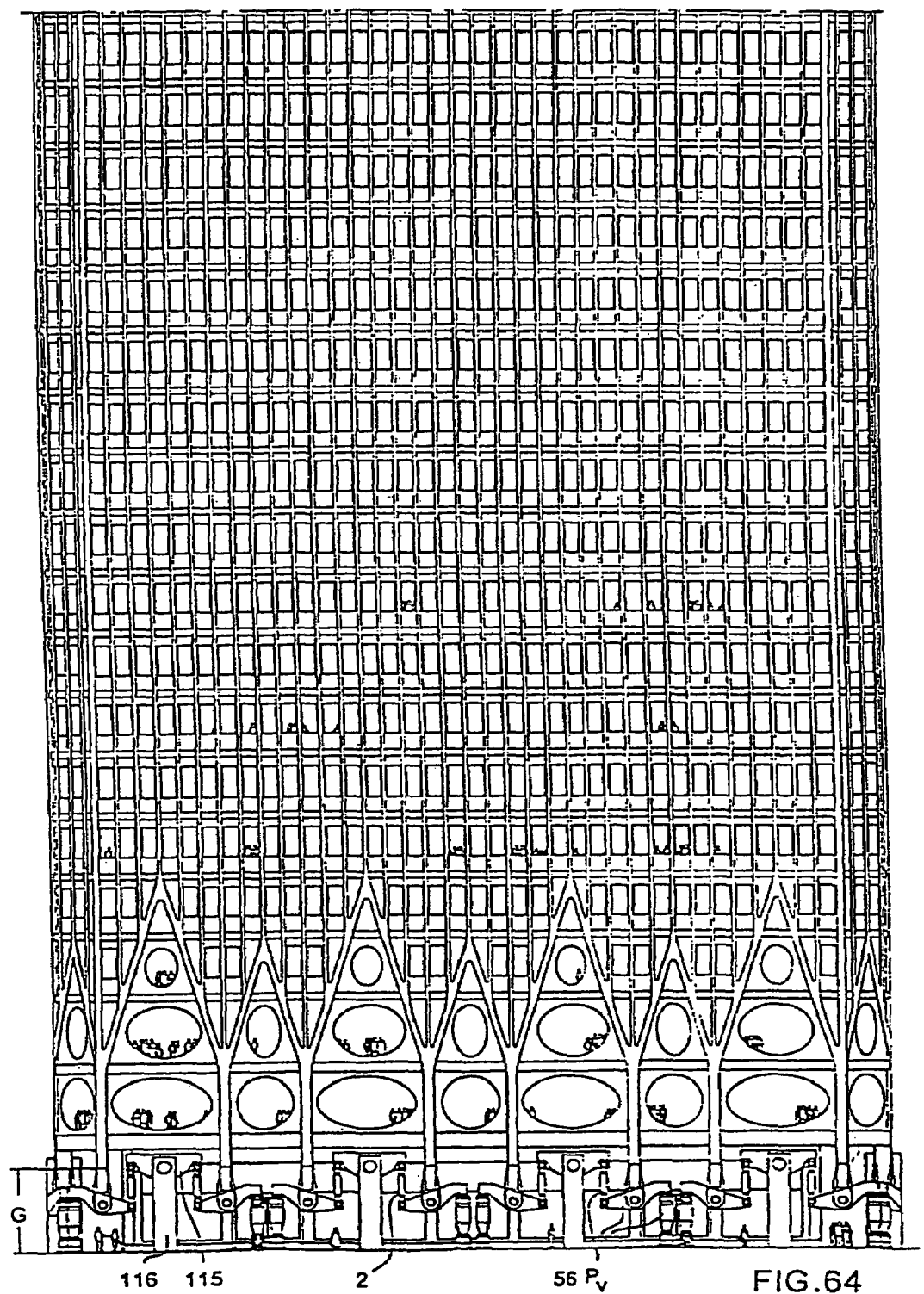
Figure 64B:
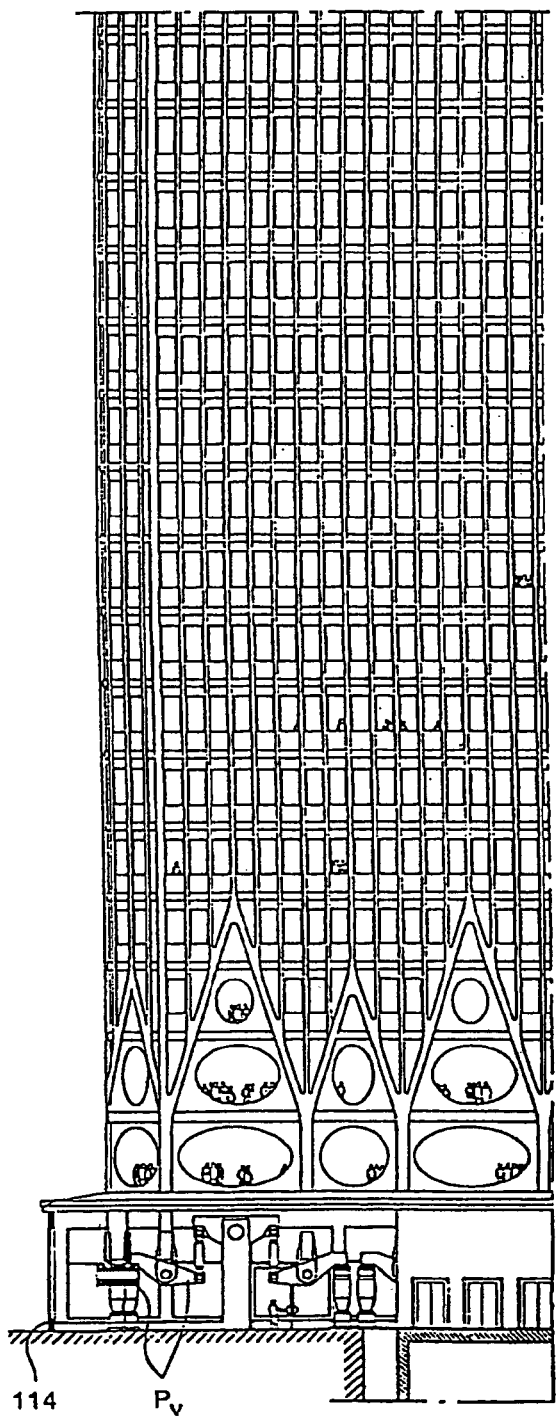
Figure 64A:
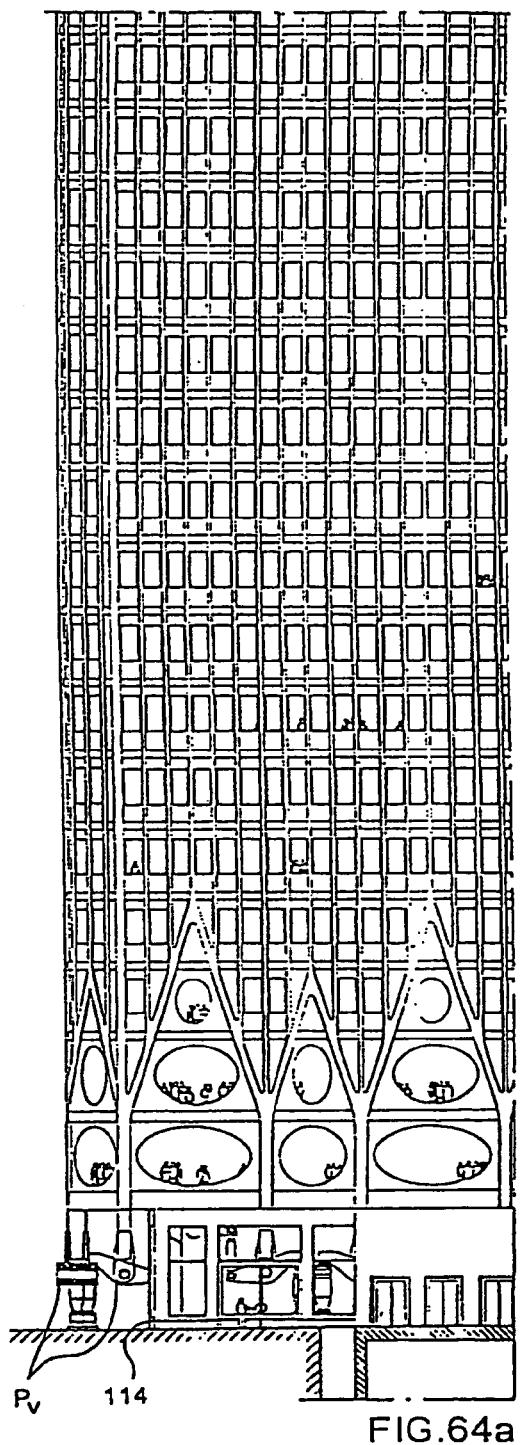

FIGS. 64, 64a, 64b depict Virtual Pendulums for the support of a high rise.

Figure 65:
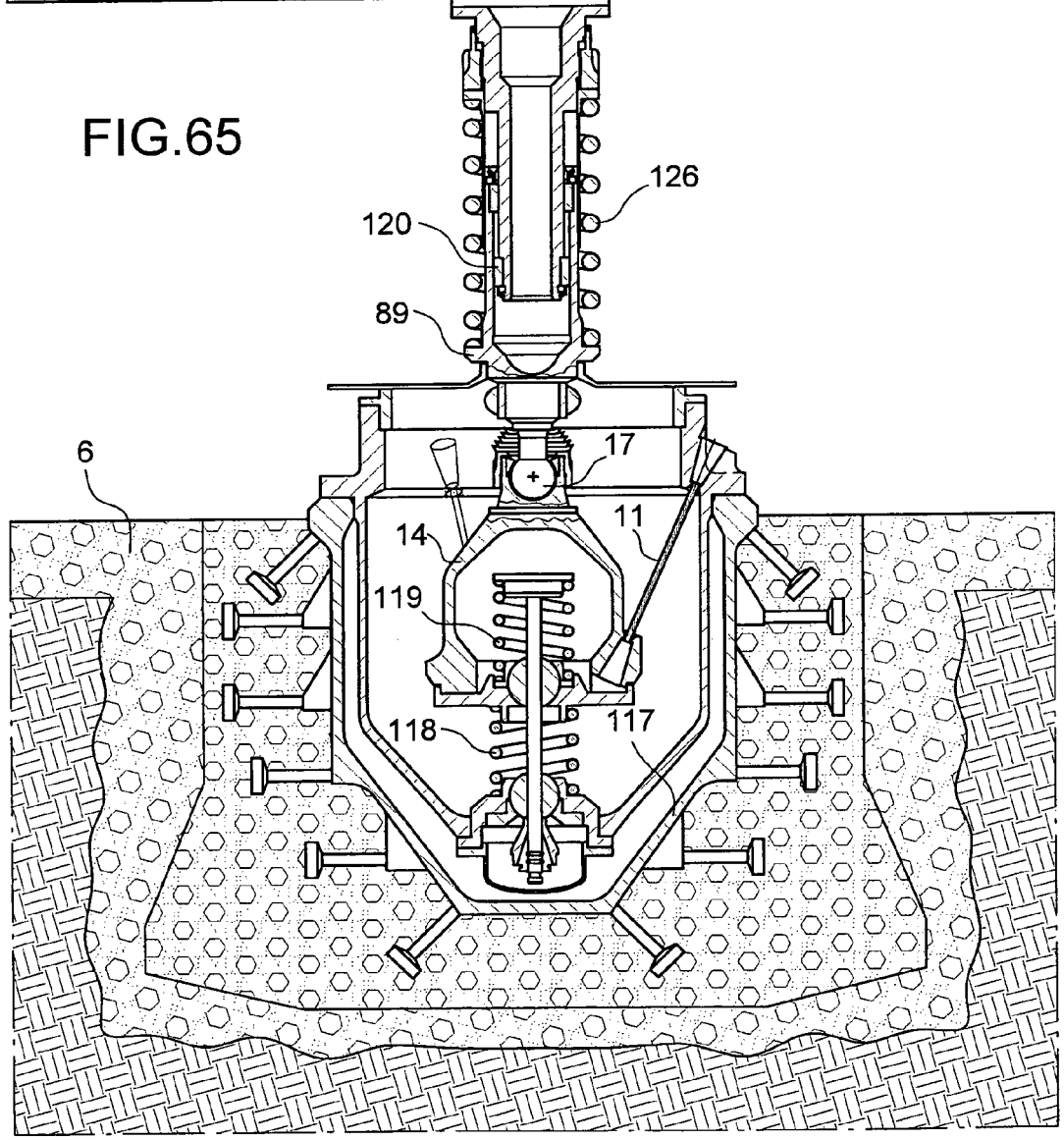

FIG. 65 shows a Virtual Pendulum according to the diagram of FIG. 21 built into a base of concrete.

Figure 66:
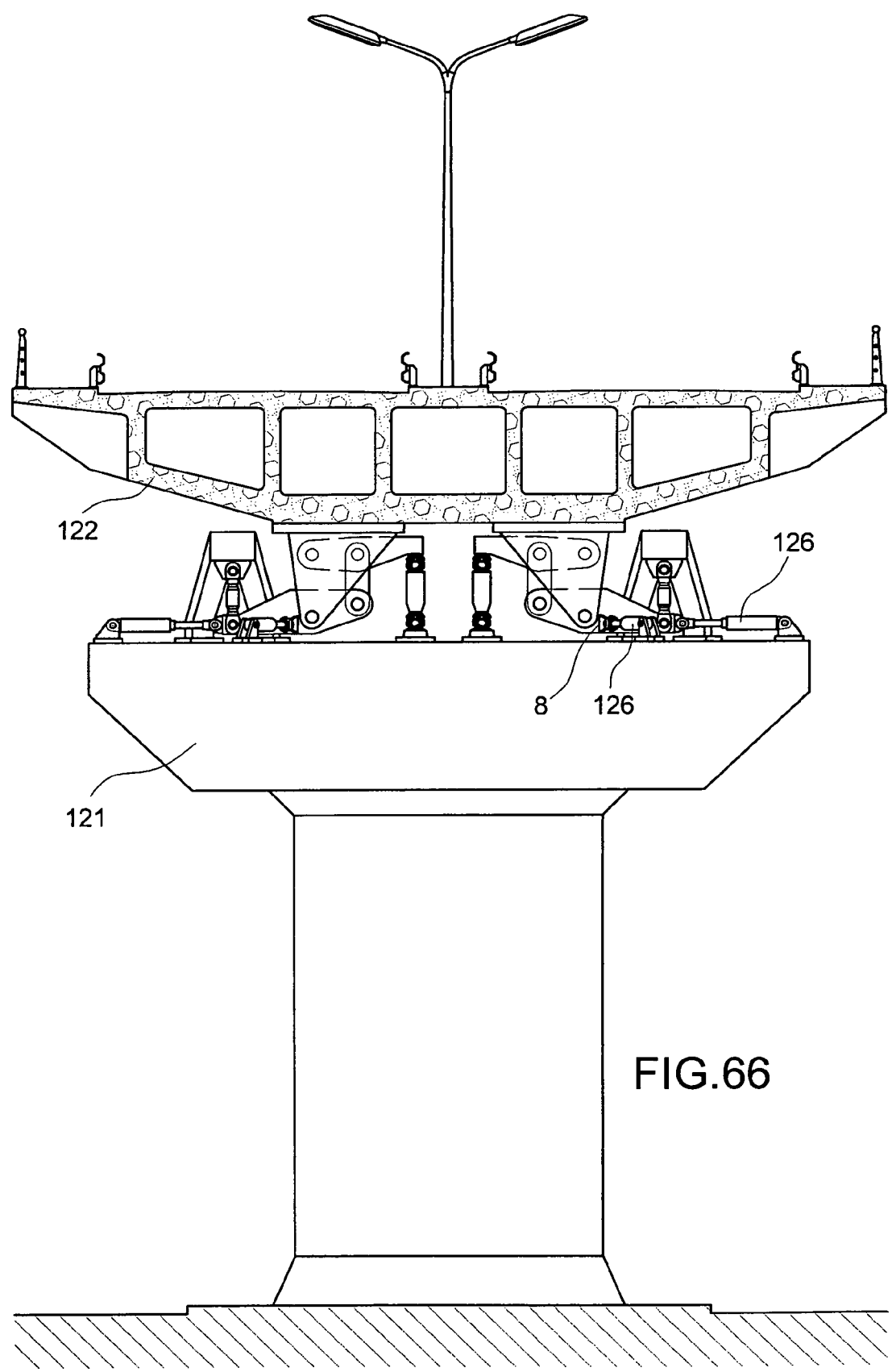

FIG. 66 shows the support of a road by Virtual Pendulums on pillars.

Figure 67:
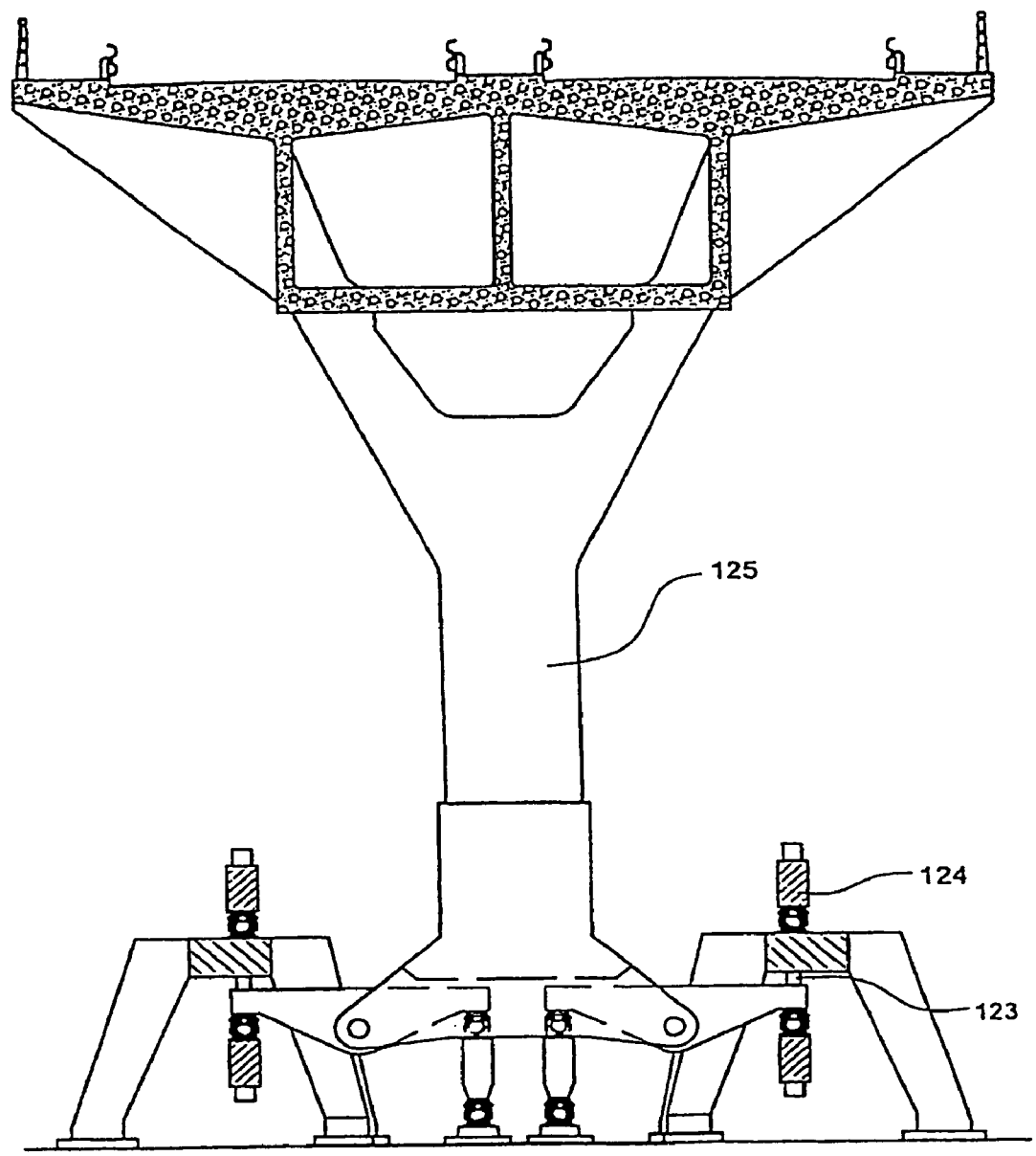

FIG. 67 shows the support of a pillar by Virtual Pendulums at its base.

Figure 68:
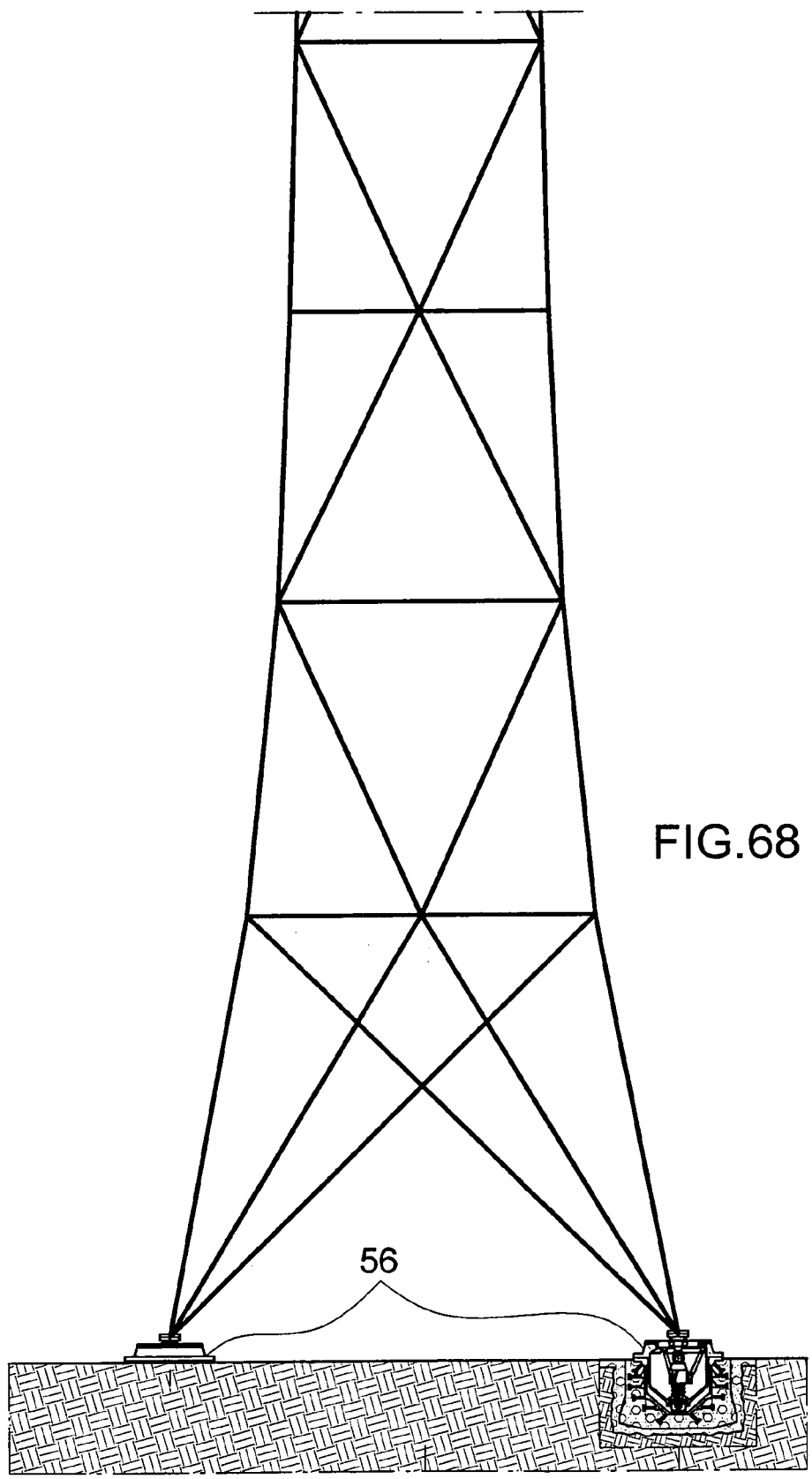

FIG. 68 shows the support of a latticed mast by Virtual Pendulums according to the diagram of FIG. 21.

Figure 69:
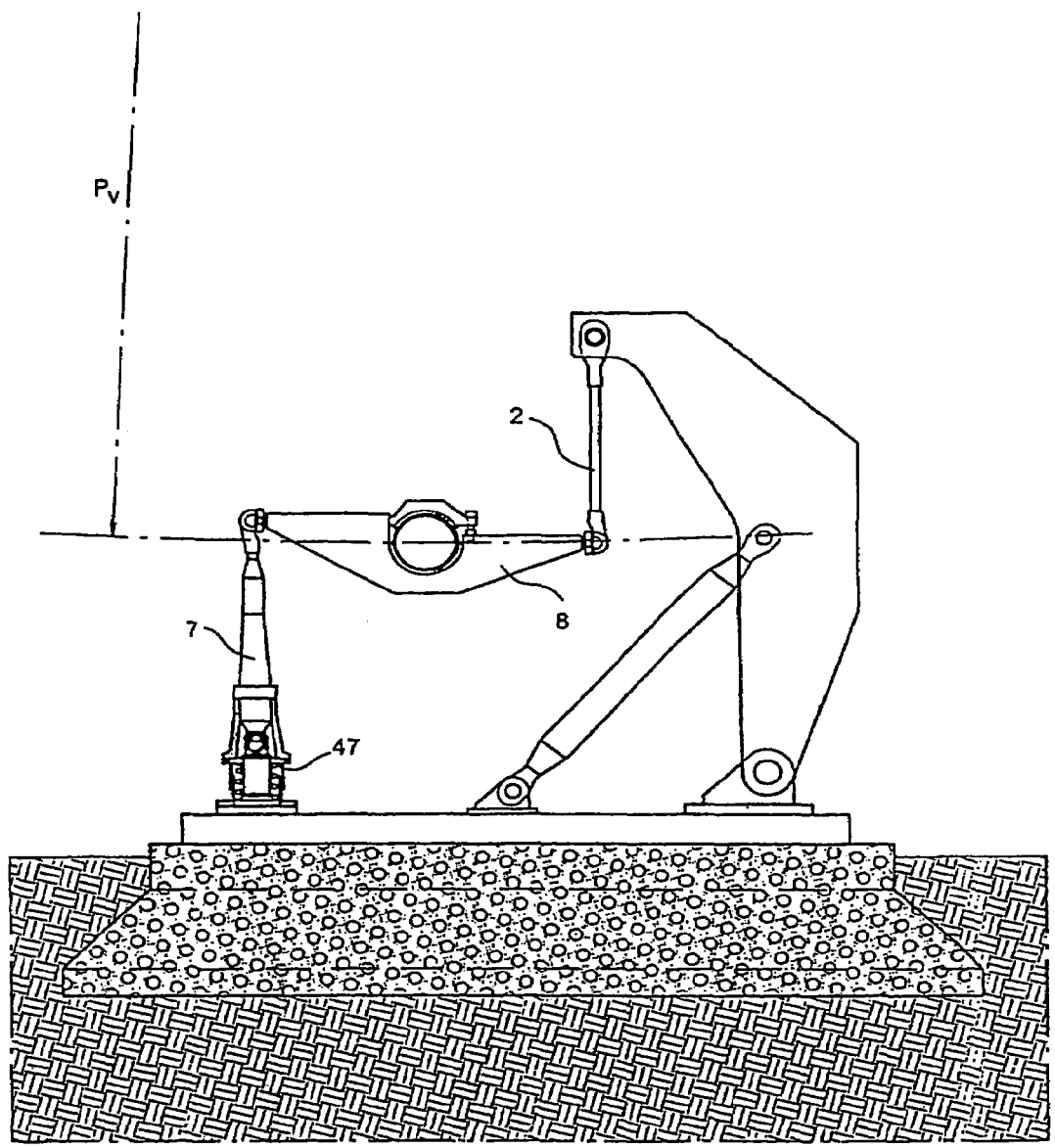

FIG. 69 shows the support of a pipeline by Virtual Pendulums.

Figure 70:
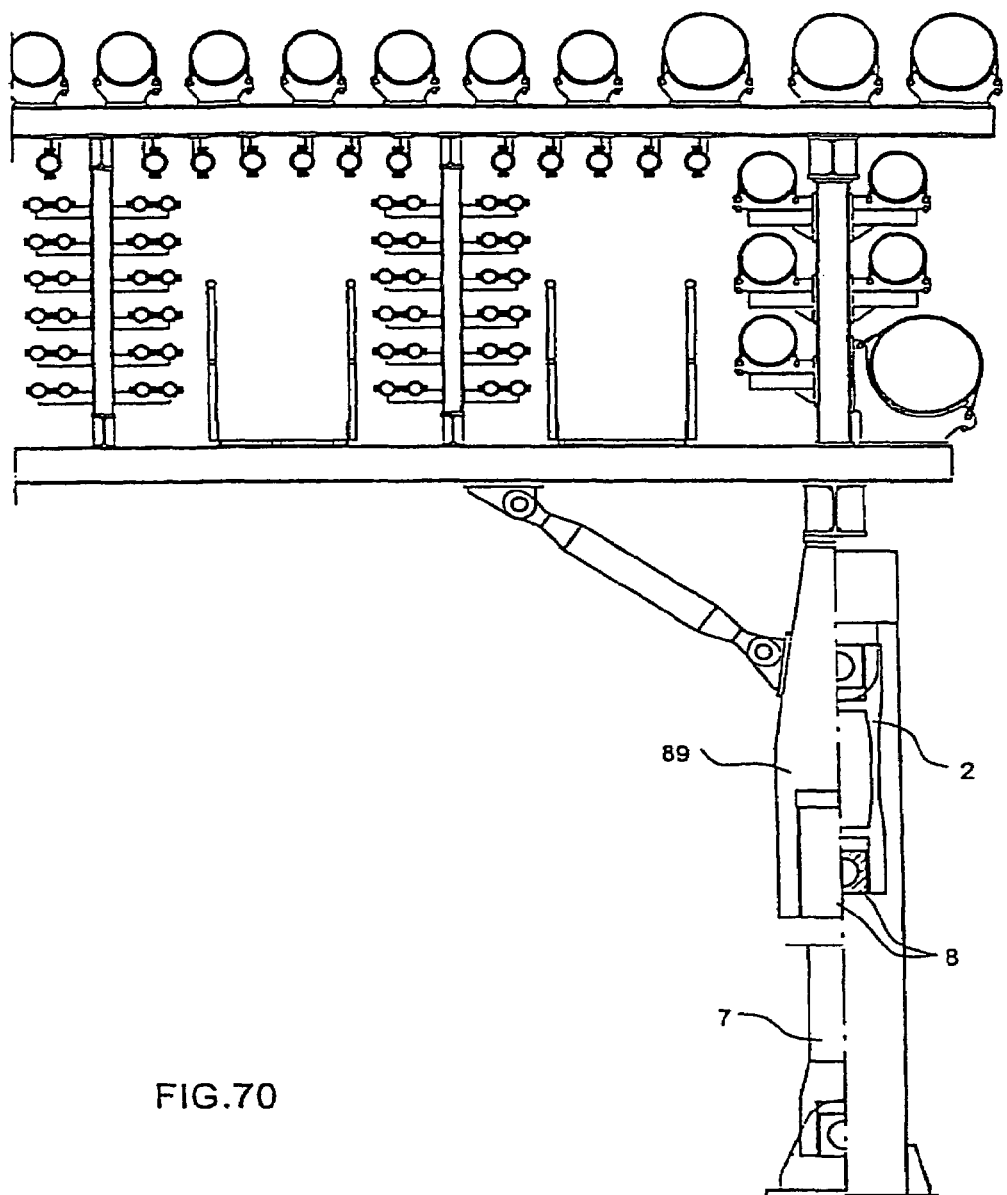

FIG. 70 shows the support of a pipeline bridge by Virtual Pendulums.

6 DESCRIPTION OF PREFERRED EMBODIMENTS

FIG. 1 shows that, according to the invention at hand, for a building, or any object, to be protected against earthquakes, it is supported through load bearing devices, here called Earthquake Protection Modules, which bear the mass of the building. The Earthquake Protection Modules are firmly connected to the ground by one common foundation or by for each module separate foundations.

The Earthquake Protection Modules 56 support the building structure and allow it at its supporting points to move in such a manner, as if the building was suspended from very long pendulums. As explained earlier the suspended object experiences only minimal accelerations, compared to the acceleration level of seismic ground motions.

Although needing only little height, the Earthquake Protection Module performs as a Virtual Pendulum $P_v$ with great virtual length $l_v$ and with a long period. These supporting devices can be designed for any desired or necessary amplitudes of earth movement, that even extreme horizontal base movements are not transferred to the supported object.

Through adequate design and dimensioning of the modules it can be realized that the natural frequency of the building supported by Earthquake Protection Modules is many times lower than the dominant frequencies of the ground shaking, as they usually occur in earthquakes.

FIG. 55 shows the installation of an Earthquake Protection Module 56, according to the design of FIG. 21, in the basement of a building. Three support elements 11 have at each end a bi-axial spherical bearing 15, or alternatively a universal joint or ball joint, which connect them at their upper end to a support structure 5 and at their lower end to the coupling element 9, which is suspended by these three support elements. At its upper end the coupling element 9 is joined through a link ball 17 to the building support 16, which is connected to the supported structure 51. A flexible bellow 18 made of elastomeric material or metal hermetically seals the link ball bearing. A sliding seal 19 seals the gap between the supported structure, which can move relative to the base 6, and the basement wall of the base 6.

FIG. 56 shows an earthquake protection module 56 according to the diagram of FIG. 12, installed in the basement of a building. The vertical oscillation isolation, according to the diagram of FIG. 32, is integrated into the building support element 16. The movement gap seal 114 between the base and the isolated building is designed according to the diagram of FIG. 52.

FIG. 57 shows an earthquake protection module 56 similar to the module in FIG. 21. Here is additionally integrated a centering and wind force compensation device 57 according to FIG. 25. This solution has the advantage to save space. The functions, to support the object and to keep it exactly centered and to produce a counterforce against wind forces, are united into one module.

FIG. 58 shows an earthquake protection module 56 with another combination of support and centering function. The centering function is realized by an elastomer spring block 48.

FIG. 59 shows an earthquake protection module design according to the diagram of FIG. 12, in a heavy load load version, for high rises, with installation above ground. The hanging, stable pendulum 2 has on both ends either a spherical bearing or a universal joint. At its upper end it is suspended from the support structure 5. At its lower part the pendulum 2 is joined with the girder 8, which is a coupling element. The other side of the coupling element 8 rests on a standing unstable pendulum 7, joined through either a link ball bearing 17 or alternatively a universal joint or spherical bearing. At its lower end the standing pendulum 7 is joined with the foundation 20 through the same bearing 17 as at its upper end. The girder 8 is joined through a single axis bearing with the building support 16, which supports the building structure 1.

The first floor and the basement 22 of the building are part of the building structure 1. The gap 23 between the basement 22 and the foundation 20 is covered by the floor of the first story and sealed towards the foundation through a sliding seal 19. The utility connections 21, for water, energy, communications, are arranged to be flexibly hanging in a U shaped form between the foundation 20 and the basement 22, that movements of the base relative to the building are possible without damaging them.

FIG. 60 shows a vertical partial section of a high rise supported by earthquake protection modules 56 as shown in FIG. 59, that are lined up along the edges of the building. In a plane 54 of a basement 22 are horizontal support devices 24 positioned and connected to the building, of the kind according to FIG. 29 or FIG. 30, with the corresponding hydraulic equipment according to FIG. 28.

FIG. 61 shows a horizontal section in the plane 54 of FIG. 60 through a basement 22 and a foundation 20, which frame around the basement serves as a support for the earthquake protection modules. To each side of the basement 22, which can move in all directions, there are two devices 24 affixed, to horizontally compensate for wind forces and to exactly center the building relative to the foundation. The horizontal support devices correspond to the design as shown in FIG. 30. If there is a build-up of wind forces towards the building, the building still remains in the same position as shown in FIG. 61. The horizontal support devices react immedeately towards any springiness and increase the restraining forces in the spring elements to balance the wind force. In the exact middle position, without external wind forces, there is a minimal gap between the rolls and the walls of the foundation. All spring cylinders are fully extended up to their hydraulically dampened stop.

FIG. 62 Should a movement of the base occur in the direction of the arrows 58 because of an earthquake, the horizontal support devices 24 are pushed in against their spring force on the side of the building where it moves closer towards the wall of the foundation. On the opposite side of the building they lift off the wall.

FIG. 63 If the base moves in a direction 58 not parallel to either edge of the building, the horizontal support devices are pushed in against their spring force on two sides of the building and lift off the wall on the two opposite sides.

FIG. 64 shows a partial view of the outside of a high rise, visibly at ground level supported by earthquake protection modules 56, according to the principle of Virtual Pendulums. The Virtual Pendulums, according to the diagram as shown in FIG. 12, are positioned in pairs mirroring each other. The hanging stable pendulums 2 are supported in pairs, to comensate for tolerances, by a balancing girder 115, which is supported in a one-axis bearing by a pillar 116.

The configuration of the earthquake protection modules shows, that it is suitable for retrofitting of existing steel frame structures. The sections G of the existing pillars are substituted by the elements of the Virtual Pendulums.

FIG. 64a und FIG. 64 b represent a vertical cross section of the view of FIG. 64 and show the interface of the building with the ground with the movement gap and the movement gap seal 114. One shows the earthquake protection modules positioned outside the building, the other shows them positioned within the building facade.

FIG. 65 shows a Virtual Pendulum as an earthquake protection module according to the principle as shown in FIG. 21. Into a casing 117, which is concreted into the base 6, the already assembled module is to be positioned and fastened to through flange connections. The support element 89 is connected to the supported object through flange connections. The stable support elements, the hanging pendulums 11, are designed as ropes. The supporting element 14 is centered and supported against wind forces by the spring 118 and pulled down by the spring 119 to compensate for negative vertical accelerations. The support element 89 is supported on the supporting element 14 by a bi-axial link ball 17 and supports through a telescopic guidance 120 and a mechanical spring 126, or alternatively pneumatic springs, the load of the supported object.

FIG. 66 depicts the oscillation isolation of the road platform 122 of an elevated highway from lateral movements of the pillar platform 121. This reduces the buckle loads to the pillar, since it does not experience anymore, if laterally accelerated, the reaction forces of the mass of the road platform, but essentially only the reacton forces of its own mass and of a small part of the module's mass. The design of the Virtual Pendulum is according to the design as shown in FIG. 13. If the road platform support point is a fixed bearing, the coupling element is kept in its middle position by horizontal spring elements 126. Only when that spring force is overcome, free movements relative between the road platform 122 and the pillar platform 121 are possible.

FIG. 67 shows the oscillation isolation of a pillar for elevated highways at the base of the pillar. The Virtual Pendulum is based on the principle as shown in FIG. 9. As depicted here the road platform pillar repesents as well a bridge floating bearing. The stable, hanging pendulum, support element 2, consists of two vertical pulling rods 123 and two cross girders 124.

FIG. 68 shows a latticed mast, supported by earthquake protection modules according to the design as shown in FIG. 21 and equipped with wind force resistance devices.

FIG. 69 shows the support of a pipeline through a stable and an unstable pendulum 2 and 7, according to the diagram of FIG. 9. The coupling element 8 itself is designed as a bearing for the pipe. The center of the pipe cross section describes, if horizontally displaced, a curve as if it were the end of a long pendulum. The pipe therefore is suspended from a Virtual Pendulum. The standing pendulum 7 is kept in its vertical position by a spring 47. Only a certain tilting moment at the pendulum 7 can compress the spring 47 and allow movement of the support system. The tilting moment is so determined, that only mass reaction forces caused by lateral accelerations corresponding the values of earthquake accelerations could cause this movement.

FIG. 70 represents a pipeline bridge, as used in chemical facilities and refineries, supported by Virtual Pendulums. The load support 89 is supported by the coupling element 8, which is supported by the stable support element, the hanging pendulum 2, and the unstable support element, the standing pendulum 7.

What is claimed is:

1. A method of protecting a building structure against dynamic forces from accelerations of a base of the building structure, comprising:

supporting the building structure with a load bearing system including a stable supporting element able to swing in any lateral direction and lift the building structure and an unstable supporting element able to swing in any lateral direction and lower the building structure, the stable supporting element and the unstable supporting element being connected to the base at base-connected support points; and displacing the base-connected support points relative an inert mass of the building structure during the accelerations of the base to cause a minimal lift of the building structure generating a small stabilizing returning force which returns the building structure to an original position at an insignificant acceleration of the building structure with a long period of a natural oscillation of the building structure.

2. A device for protecting a building structure against oscillations of a base of the building structure, the device comprising:

a coupling element;

a support point disposed on the coupling element, the building structure being supported at the support point; and a first supporting element for connecting the coupling element to the base, the first supporting element being coupled with the coupling element and capable of swinging in any direction and causing a lifting effect of the coupling element;

a second supporting element for connecting the coupling element to the base, said second supporting element being coupled with the coupling element and capable of swinging in any direction and causing a lowering effect of the coupling element at substantially the same time as the lifting effect;

wherein the first and second supporting elements are dimensioned and positioned such that the support point is able to freely move in any lateral direction as a free end of a very long bi-axially suspended virtual pendulum of any desired length traversing a path of movement of a locus of a concave sphere in response to the oscillations of the base.

3. The device of claim 2, wherein the lifting effect comprises the coupling element being lifted at a first end and wherein the lowering effect comprises the coupling element being lowered at an opposite second end, the first and second ends being connected to the first and second supporting elements, respectively, such that the support point experiences only a minimal lift and moves in a path of a flatly curved concave locus.

4. The device of claim 2, wherein:

the first supporting element comprises a hanging stable pendulum bi-axially hinged at an upper end to a hinge point fixed to the base and at a lower end to a first end of the coupling element; and the second supporting element comprises a standing unstable pendulum bi-axially hinged at a lower end to the base and at an upper end to a second end of the coupling element, the second end being opposite the first end; and wherein the coupling element comprises two bearings for connecting the coupling element to the building structure such that the coupling element is prevented from rotating around a vertical axis of the building structure.

5. The device of claim 4, wherein the coupling element comprises a first portion connected to the support point and to the hanging stable pendulum, a second portion connected at one end to the building structure and at a second end to the unstable pendulum, and a third portion connecting the first and second portions.

6. The device of claim 2, further comprising a third supporting element, each first, second, and third supporting elements respectively bi-axially hinged to three bearing points along a perimeter of the coupling element, the first, second, and third supporting elements further respectively bi-axially hinged to suspension points rigidly connected to the base, such that each of the first, second, and third supporting elements, when disposed in a resting position, are angled upwards and away from a center of the coupling element.

7. The device of claim 6, wherein the support point is located above a plane formed by the three bearing points.

8. The device of claim 2, wherein the first and second supporting elements are parallel to one another and bi-axially joined at respective lower ends to the coupling element and at respective upper ends to hinge points rigidly connected with the base, the coupling element further comprising a tilting support element disposed in a one axial bearing at a middle of the coupling element, the tilting support being tiltable in a direction of the hinge points and being positioned in a bi-axially bearing with axially movability located beneath the coupling element and in a bi-axial bearing with bi-axial movability at the support point.

9. The device of claim 8, wherein the first and second supporting elements comprise a plurality of symmetrically positioned parallel support members and wherein the tilting support element is disposed in a biaxial bearing.

10. The device of claim 2, further comprising:

a shaft positioned beneath the building structure between the building structure and the base for restraining lateral forces;

a preloaded extension spring having one end connected to a lower end of the shaft and a second end rigidly connected to either the base or the building structure;

a bi-axially movable spherical bearing connected either to the building structure or to the base;

wherein an upper end of the shaft sticks axially movable into the bi-axially movable spherical bearing;

wherein a general position of the building structure and the base is fixed and a relative movability of the building structure and base toward each other is possible when a lateral force impacts the shaft that exceeds a tension force of the preloaded extension spring.

11. The device of claim 2, further comprising:

a shaft positioned beneath the building structure, between the building structure and the base, to retain lateral forces;

an elastomeric spring block rigidly connected to the base or to the building structure and rigidly connected to a one end of the shaft; and a bi-axially spherical bearing connected either to the building structure or the base;

wherein a second end of the shaft sticks axially movable into the bi-axially movable spherical bearing;

wherein a position of the building structure and the base with respect to each other is elastically fixed.

12. The device of claim 2, further comprising:

a compensation device for compensating a wind load including a vertically guided sphere, rotatable in all directions, pressed with a predetermined force by a mechanical or hydropneumatic spring downwards into a center of a hollow cone rigidly connected to the base which has an opening angle that increases from a center to hundred-eighty degrees;

wherein a shape locked connection between the building structure and the base is formed that can transfer horizontal forces up to a limit value determined by a force of the spring and the opening angle;

wherein, when the limit value is exceeded by the horizontal force, an incline of the hollow cone lifts the sphere vertically against the spring force, and the sphere rolls into an area of lessening incline of the hollow cone, through which the horizontally transferable force decreases and becomes zero outside the area of the hollow cone, and therefore, during relative movements of the base towards and the building structure minimal horizontal forces are transferred from the base onto the building structure.

13. Device according to claim 12, wherein the vertically guided centering sphere is held in a dish with rolling balls and is pushed by a mechanical or hydropneumatic or visco elastic spring into the centering hollow cone so that no horizontal wind force impacting the building structure can cause a reaction force at a connecting point of the centering ball with the hollow cone, which vertical component could push the centering ball up in its vertical guidance against the spring force.

14. Device according to claim 12, wherein the centering hollow cone, outside of the circle that is formed by the contact line of the centering sphere with the hollow cone in its lowest position within, has an up to 180° increasing opening angle so that a horizontal component of a normal force in the contact point of the centering sphere with the centering cone decreases radially outward when a lateral displacement force which is greater than maximum horizontal wind loads compresses, through the centering sphere, the vertical spring in its vertical guidance, and the contact point of the centering sphere and the centering cone moves radially outward in the centering cone.

15. Device according to claim 12, wherein the centering sphere in a vertical guidance can move undampened if a vertical force caused by a horizontal displacement of the centering hollow cone exceeds the spring force and wherein a pushing back of the vertical guidance with the centering sphere by the spring is slowed to a very low speed by a hydraulic throttling so that a time period for a full spring return is a multiple of a maximum oscillation time period.

16. The device of claim 2, further comprising at least three pairs of mechanical or hydropheumatic springs disposed between a vertical wall of the base and the building structure and around the building structure having a low spring rate, the first pair of springs being for a vertical axis of movement, the second pair of springs being for a horizontal axis of movement, and the third pair of springs being for another horizontal axis of movement, the springs each including a sliding or rolling gear at the vertical wall of the base horizontally movable with a roll on an extendable guidance system.

17. Device according to claim 16, wherein, to maintain an equal distance between walls of the building structure and walls of the base during movement of the spring caused by a shift of the building structure relative to the base by a wind force, the spring force is automatically increased and governed by hydraulic control valves until full extension into a required position is established.

18. Device according to claim 16, wherein relative movement between the oscillating base and the building structure, supported by the virtual pendulum which decouples the supported building structure from the oscillating base, is used to power one or several pumps for auxiliary energy, the pumps being configured by themselves or in connection with centering and wind force compensating elements that respond to the relative movement.

19. The device of claim 2, wherein the building structure includes a main portion which is exposed to wind loads and a separated portion which is not exposed to the wind loads and serves as a position reference for position control of the main portion.

20. The device of claim 2, further comprising a load support element disposed between the support point and the building structure and including a mechanical, hydropneumatic, or fluid elastic vertical spring element having a very low spring rate and corresponding damping.

21. The device of claim 20, further comprising wind load compensation device for compensating wind loads and a vertical shock absorption device for absorbing vertical shocks.

22. The device of claim 2, the device further comprising a pole fixed to the base, the building structure being supported on the pole, wherein the first supporting element includes two hanging pendulums and the second supporting element includes one standing pendulum, the first and second supporting elements being angled away from a middle of the pole to compensate skewness of the pole and support point during oscillation.

23. The device of claim 4, wherein the support point is disposed at an underside of the coupling element and the supporting elements comprises rope, the building structure being building structure hanging from the rope.

24. The device of claim 8, wherein the supporting elements comprises rope.

25. The device of claim 4, wherein the hanging stable pendulum hangs from a ceiling connected to the base through the building structure and the unstable standing pendulum is supported at the lower end by rods, ropes, or chains suspended from the ceiling.

26. The device of claim 2, wherein the device comprises three virtual pendulums supporting the building structure for reducing oscillation of a mass.

27. The device of claim 4, wherein the hanging stable pendulum comprises a rope or a chain.

28. The device of claim 2, wherein the base comprises a foundation having an inclined curvature near rims of the foundation.

29. The device of claim 4, wherein the coupling element directly serves as a bearing for the building structure.

30. A device for protecting a building structure against oscillations of a base of the building structure, the device comprising:
   a coupling element;
   a support point disposed on the coupling element, the building structure being supported at the support point; and
   a supporting element for connecting the coupling element to the base, the supporting element being coupled with the coupling element and capable of swinging in any direction;
   wherein the supporting element is dimensioned and positioned such that the support point is able to freely move in any lateral direction as a free end of a very long bi-axially suspended virtual pendulum traversing a path of movement of a locus of a concave sphere in response to the oscillations of the base; and
   wherein, during the oscillation of the base, the coupling element is capable of being lifted at a first end and lowered at an opposite second end, the first and second ends being connected to the supporting element, such that the support point experiences only a minimal lift and moves in a path of a flatly curved concave locus.

* * * * *